US009771954B2

(12) United States Patent
Awa et al.

(10) Patent No.: US 9,771,954 B2
(45) Date of Patent: Sep. 26, 2017

(54) EJECTOR

(71) Applicant: DENSO CORPORATION, Kariya, Aichi-pref. (JP)

(72) Inventors: Ryoko Awa, Obu (JP); Haruyuki Nishijima, Obu (TW); Yoshiaki Takano, Kosai (JP); Etsuhisa Yamada, Kariya (JP); Satoshi Itoh, Kariya (JP); Kenta Kayano, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/443,123

(22) PCT Filed: Nov. 1, 2013

(86) PCT No.: PCT/JP2013/006484
§ 371 (c)(1),
(2) Date: May 15, 2015

(87) PCT Pub. No.: WO2014/076903
PCT Pub. Date: May 22, 2014

(65) Prior Publication Data
US 2015/0308462 A1 Oct. 29, 2015

(30) Foreign Application Priority Data

Nov. 16, 2012 (JP) .................................. 2012-252473
Jun. 18, 2013 (JP) .................................. 2013-127583

(51) Int. Cl.
*F04F 5/46* (2006.01)
*F25B 41/00* (2006.01)
(Continued)

(52) U.S. Cl.
CPC ........... *F04F 5/46* (2013.01); *B60H 1/00921* (2013.01); *F25B 41/00* (2013.01);
(Continued)

(58) Field of Classification Search
CPC .... F04F 5/46; F04F 5/461; F04F 5/463; F04F 5/50; F04F 5/462; F04F 5/20; F04F 5/48;
(Continued)

(56) References Cited

U.S. PATENT DOCUMENTS 3,670,519 A * 6/1972 Newton .................... F25B 1/06
62/116
4,166,790 A * 9/1979 Zlokarnik ............. B01F 3/0876
210/626
(Continued)

FOREIGN PATENT DOCUMENTS

JP          H382900 U      8/1991
JP          H05149652 A    6/1993
(Continued)

OTHER PUBLICATIONS

International Search Report and Written Opinion (in Japanese with English Translation) for PCT/JP2013/006484, mailed Jan. 28, 2014; ISA/JP.
(Continued)

*Primary Examiner* — Mohammad M Ali
(74) *Attorney, Agent, or Firm* — Harness, Dickey & Pierce, P.L.C.

(57) ABSTRACT

A mixing portion that mixes an injection refrigerant and a suction refrigerant is formed in a range of an internal space of a heating-side body portion of a heating-side ejector from a refrigerant injection port of a heating-side nozzle portion to an inlet of a heating-side diffuser. Further, the mixing portion is formed in a shape that gradually decreases a refrigerant passage area toward a downstream side of a refrigerant flow, and a refrigerant passage area of the inlet of the heating-side diffuser is set smaller than that of the refrigerant injection port. Thus, the flow velocity of the mixed refrigerant is decelerated to a value lower than a two phase sound velocity within the mixing portion, thereby (Continued)

suppressing occurrence of shock wave in the heating-side diffuser and stabilizing the pressure increasing performance in the heating-side diffuser.

19 Claims, 20 Drawing Sheets

(51) Int. Cl.
  *B60H 1/00* (2006.01)
  *B60H 1/32* (2006.01)
(52) U.S. Cl.
  CPC .............. *B60H 2001/3298* (2013.01); *F25B 2341/0011* (2013.01); *F25B 2341/0015* (2013.01)
(58) Field of Classification Search
  CPC ..... F04F 5/52; F25B 41/00; F25B 2341/0015; F25B 2341/0011; B60H 1/00921; B60H 2001/3298; B60H 1/32; Y02B 30/743
  USPC .................................................. 62/515, 500
  See application file for complete search history.

(56) References Cited

U.S. PATENT DOCUMENTS

| | | | | |
|---|---|---|---|---|
| 7,207,190 B2* | 4/2007 | Sugiura | ............... | B41J 2/17596 62/500 |
| 7,334,427 B2* | 2/2008 | Ozaki | ............... | F04F 5/04 62/500 |
| 8,017,275 B2* | 9/2011 | Fukuma | ............... | F04F 5/461 417/178 |
| 2001/0025499 A1* | 10/2001 | Takeuchi | ............... | F25B 9/008 62/175 |
| 2002/0000095 A1* | 1/2002 | Takeuchi | ............... | F04F 5/04 62/500 |
| 2003/0145613 A1* | 8/2003 | Sakai | ............... | F04F 5/04 62/191 |
| 2004/0007013 A1* | 1/2004 | Takeuchi | ............... | F04F 5/461 62/500 |
| 2004/0060316 A1 | 4/2004 | Ito et al. | | |
| 2005/0155374 A1* | 7/2005 | Oshitani | ............... | F25B 41/00 62/500 |
| 2005/0188719 A1 | 9/2005 | Sugiura et al. | | |
| 2007/0271942 A1* | 11/2007 | Yokoyama | ............... | F25B 41/00 62/278 |
| 2009/0229304 A1* | 9/2009 | Ogata | ............... | F25B 5/04 62/500 |
| 2009/0229305 A1 | 9/2009 | Yamada et al. | | |
| 2009/0232665 A1 | 9/2009 | Gocho et al. | | |
| 2011/0061423 A1* | 3/2011 | Ogata | ............... | F04F 5/10 62/500 |
| 2011/0219793 A1* | 9/2011 | Nakamura | ............... | F25B 41/00 62/115 |
| 2011/0259039 A1* | 10/2011 | Ma | ............... | F25B 15/02 62/495 |
| 2011/0259042 A1 | 10/2011 | Nishino et al. | | |

FOREIGN PATENT DOCUMENTS

| | | |
|---|---|---|
| JP | H1137577 A | 2/1999 |
| JP | 2003014318 A | 1/2003 |
| JP | 3486851 B2 | 1/2004 |
| JP | 3645324 B2 | 5/2005 |
| JP | 2005233026 A | 9/2005 |
| JP | 4311115 B2 | 8/2009 |
| JP | 2009222256 A | 10/2009 |
| JP | 2010116927 A | 5/2010 |
| JP | 2010276215 A | 12/2010 |
| JP | 2010284567 A | 12/2010 |
| JP | 2011058422 A | 3/2011 |
| JP | 2011220552 A | 11/2011 |
| JP | 2011247547 A | 12/2011 |
| JP | 2012149790 A | 8/2012 |
| JP | 2012220166 A | 11/2012 |
| JP | 2014077552 A | 5/2014 |
| WO | WO-2014076904 A1 | 5/2014 |

OTHER PUBLICATIONS

U.S. Appl. No. 14/443,125, filed May 15, 2015, Ryoko Awa et al.

* cited by examiner

AIR COOLING MODE / WEAK DEHUMIDIFICATION-AIR HEATING MODE

DEHUMIDIFICATION-AIR HEATING MODE

AIR HEATING MODE

AIR COOLING MODE

WEAK DEHUMIDIFICATION-AIR HEATING MODE

DEHUMIDIFICATION-AIR HEATING MODE

AIR-HEATING MODE

AIR COOLING MODE / WEAK DEHUMIDIFICATION-AIR HEATING MODE

DEHUMIDIFICATION-AIR HEATING MODE

AIR HEATING MODE

DEHUMIDIFICATION-AIR HEATING MODE

SUCTION FLOW RATE RATIO (Ge/Gnoz)

AIR HEATING MODE

EJECTOR

CROSS REFERENCE TO RELATED APPLICATIONS

This application is a U.S. National Phase Application under 35 U.S.C. 371 of International Application No. PCT/JP2013/006484 filed on Nov. 1, 2013 and published in Japanese as WO 2014/076903 A1 on May 22, 2014. This application is based on and claims the benefit of priority from Japanese Patent Applications No. 2012-252473 filed on Nov. 16, 2012, and No. 2013-127583 filed on Jun. 18, 2013. The entire disclosures of all of the above applications are incorporated herein by reference.

FIELD OF THE INVENTION

The present disclosure relates to an ejector that draws a fluid by a suction effect of an injection fluid injected at high speed, while decompressing the fluid.

BACKGROUND ART

Conventionally, some ejectors are known to be applied to a vapor compression refrigeration cycle device and to serve as a decompressor. This kind of ejector includes a nozzle portion for decompressing a refrigerant, and is designed to draw a gas-phase refrigerant flowing out of an evaporator by a suction effect of an injection refrigerant injected from the nozzle portion, and to pressurize a mixed refrigerant including the injection refrigerant and the drawn refrigerant by a pressure-increasing portion (diffuser).

Thus, the refrigerant cycle device including the ejector as the decompressor (hereinafter referred to as an "ejector refrigeration cycle") raises the pressure of the refrigerant drawn into a compressor by a refrigerant pressurizing effect by the pressure-increasing portion of the ejector, and thus can reduce the power consumption of the compressor. Thus, the ejector refrigeration cycle can improve a cycle coefficient of performance (COP) as compared to a normal refrigeration cycle device including an expansion valve or the like as the decompressor.

Further, Patent Document 1 discloses an ejector refrigeration cycle that is applied to an air conditioner to adjust the temperature of air blown into a space to be air-conditioned. The ejector refrigeration cycle disclosed in Patent Document 1 includes a refrigerant circuit switch for switching a refrigerant circuit for circulation of the refrigerant, and can perform switching among various refrigeration circuits according to an operation mode.

For example, in an air cooling mode of cooling the space to be air-conditioned by cooling air as a fluid to be heat-exchanged, switching is performed to a refrigerant circuit for dissipating heat absorbed by the refrigerant from air in an interior evaporator, into an outside air in an exterior heat exchanger. In an air heating mode of heating the space to be air-conditioned by heating air, switching is performed to a refrigerant circuit for dissipating the heat absorbed by the refrigerant from the outside air in an exterior heat exchanger, into the air in an interior condenser.

PRIOR ART LIST

Patent Document

Patent Document 1: Japanese Patent Publication No. 4311115

SUMMARY OF THE INVENTION

The studies by the inventors of the present application have shown that the refrigerant circuit structure in the air heating mode of the ejector refrigeration cycle of Patent Document 1 has to set a refrigerant evaporation temperature in the exterior heat exchanger lower than the outside air temperature so as to sufficiently absorb heat required for air heating, from the outside air in the refrigerant at the exterior heat exchanger. Thus, when the outside air temperature is low, the refrigerant evaporation temperature (refrigerant evaporation pressure) in the exterior heat exchanger has to be significantly reduced to an ultra-low temperature, e.g., in a range of −30° C. to −20° C.

However, the refrigerant applied to the general ejector refrigeration cycle decreases its density with decreasing pressure. Thus, when the refrigerant evaporation pressure in the exterior heat exchanger is drastically reduced, the density of the refrigerant drawn into the compressor is also reduced significantly, thus leading to a decrease in flow rate of the refrigerant flowing into the interior condenser. As a result, the total amount of heat dissipated into air by the refrigerant in the interior condenser is lacking as compared to the amount of heat required for appropriate heating of the space to be air-conditioned, which cannot sufficiently heat the air.

In view of the foregoing points, it is a first object of the present disclosure to suppress reduction of the pressurizing performance of an ejector that sets the dryness of the fluid flowing into a nozzle portion within a predetermined range.

Further, it is a second object of the present disclosure to suppress the reduction of the pressurizing performance of the ejector in which the dryness of the fluid flowing into the nozzle portion is adjusted such that a heating capacity of the fluid to be heat-exchanged in a heating heat exchanger of an ejector refrigeration cycle approaches the maximum value.

The present disclosure has been made to achieve the above-mentioned objects, and the ejector according to the present disclosure is applied to a vapor compression refrigeration cycle device.

An ejector according to the present disclosure includes: a nozzle portion that decompresses a refrigerant and injects the refrigerant from a refrigerant injection port; and a body portion including a refrigerant suction port drawing a refrigerant by a suction effect of the injection refrigerant injected from the nozzle portion at high velocity, and a pressure-increasing portion pressurizing a mixed refrigerant including the injection refrigerant and the suction refrigerant drawn from the refrigerant suction port.

A dryness X of the refrigerant flowing into the nozzle portion in the refrigeration cycle device is adjusted to not less than 0.5 nor more than 0.8 in the refrigeration cycle device. Furthermore, the body portion is provided with a mixing portion that mixes the injection refrigerant and the suction refrigerant, in a range of an internal space of the body portion from the refrigerant injection port of the nozzle portion to an inlet of the pressure-increasing portion.

The mixing portion is formed in a shape that gradually reduces a refrigerant passage area toward a downstream side of a refrigerant flow. A refrigerant passage area of the inlet of the pressure-increasing portion is set smaller than that of the refrigerant injection port of the nozzle portion.

According to the ejector, the mixing portion is formed in a shape that gradually reduces a refrigerant passage area toward the downstream side of the refrigerant flow. Furthermore, the refrigerant passage area of the inlet of the pressure-increasing portion is set smaller than that of the refrigerant injection port, so that the mixing portion can gradually reduce the flow velocity of the mixed refrigerant including the injection refrigerant and the suction refrigerant.

Therefore, even when the flow velocity of the injection refrigerant injected from the refrigerant injection port of the nozzle portion is equal to or more than the two phase sound velocity αh (in the ultrasonic state), the flow velocity of the mixed refrigerant in the two phase state can be reduced to a value (subsonic velocity) lower than the two phase sound velocity αh until it reaches the inlet of the pressure-increasing portion.

That is, the ejector can generate the shock wave in the mixing portion and not in the pressure-increasing portion, when the flow velocity of the two-phase refrigerant is changed from the ultrasonic velocity state to the subsonic velocity state. As a result, the ejector can prevent the pressure increasing performance from being made unstable due to the occurrence of the shock wave in the pressure-increasing portion, and thus can suppress the reduction in pressure increasing performance of the ejector that sets the dryness of the refrigerant flowing into the nozzle portion in a range of not less than 0.5 nor more than 0.8.

Alternatively, an ejector may be applied to a refrigeration cycle device including a compressor that compresses and discharges a refrigerant, and a heating heat exchanger that heats a fluid to be heat-exchanged using a high-pressure refrigerant discharged from the compressor as a heat source.

The refrigeration cycle device is adapted to adjust a dryness of the refrigerant flowing into the nozzle portion in such a manner that the heating capacity approaches a maximum value, when (i) Δicond is an enthalpy difference obtained by subtracting an enthalpy of the refrigerant on an outlet side of the heating heat exchanger from an enthalpy of the refrigerant on an inlet side of the heating heat exchanger; (ii) Gr is a flow rate of the refrigerant flowing into the heating heat exchanger; and (iii) Qc is a heating capacity of the fluid to be heat-exchanged in the heating heat exchanger that is obtained by multiplying the refrigerant flow rate by the enthalpy difference. Furthermore, the body portion is provided with a mixing portion that mixes the injection refrigerant and the suction refrigerant, in a range of an internal space of the body portion from the refrigerant injection port of the nozzle portion to an inlet of the pressure-increasing portion.

The mixing portion is formed in a shape that gradually reduces a refrigerant passage area toward a downstream side of a refrigerant flow. A refrigerant passage area of the inlet of the pressure-increasing portion is set smaller than that of the refrigerant injection port of the nozzle portion.

In the refrigeration cycle device in which the dryness of the refrigerant flowing into the nozzle portion is adjusted to make the heating capacity approach the maximum value, the dryness of the refrigerant flowing into the nozzle portion is adjusted to not less than 0.5 nor more than 0.8 as mentioned above. Thus, like the ejector to be applied to the vapor compression refrigeration cycle device, the shock wave that would occur when the flow velocity of the two-phase refrigerant changes from the ultrasonic velocity state to the subsonic velocity state is generated in the mixing portion not to occur in the pressure-increasing portion.

As a result, the pressure increasing performance of the ejector is prevented from being made unstable due to the occurrence of the shock wave in the pressure-increasing portion, which can suppress the reduction in pressure increasing performance of the ejector in which the dryness of the fluid flowing into the nozzle portion is adjusted such that the heating capacity of the fluid to be heat-exchanged in the heating heat exchanger approaches the maximum value.

Alternatively, when an ejector is applied to the evaporation compression refrigeration cycle device, the ejector of the present disclosure includes, as the refrigerant passage formed in the nozzle portion, a tapered portion whose refrigerant passage area is gradually reduced, and an injection portion that guides the refrigerant from the tapered portion to the refrigerant injection port. The nozzle portion may be formed to flexibly expand the injection refrigerant to be injected into the mixing portion by setting a spreading angle on a section of the injection portion in the axial direction to 0° or more.

In this way, the injection portion is provided on the most downstream side of the refrigerant passage formed in the nozzle portion, whereby the injection refrigerant to be injected into the mixing portion is flexibly expanded. Thus, the refrigerant can be accelerated in the mixing portion without providing a divergent part or the like that gradually enlarges the refrigerant passage area as the refrigerant passage.

Thus, the wall-surface friction between the refrigerant and the refrigerant passage can be reduced to suppress the loss of the kinetic energy included in the refrigerant flowing through the refrigerant passage, thereby preventing the reduction in flow velocity of the injection refrigerant. As a result, the ejector that has the dryness of refrigerant flowing into the nozzle portion in a range of not less than 0.5 nor more than 0.8 can be prevented from reducing its pressure increasing performance.

Alternatively, an ejector of the present disclosure may be applied to a refrigeration cycle device, which includes as the refrigerant flow passage formed in the nozzle portion, a compressor that compresses and discharges a refrigerant, and a heating heat exchanger that heats a fluid to be heat-exchanged using a high-pressure refrigerant discharged from the compressor as a heat source. In this case, the ejector may include a tapered portion in which a refrigerant passage area gradually decreases, and an injection portion that guides the refrigerant from the tapered portion to the refrigerant injection port. The nozzle portion is formed to flexibly expand the injection refrigerant to be injected into the mixing portion by setting a spreading angle on a section of the injection portion in the axial direction to 0° or more.

In the refrigeration cycle device in which the dryness of the refrigerant flowing into the nozzle portion is adjusted to make the heating capacity approach the maximum value, the dryness of the refrigerant flowing into the nozzle portion is adjusted to not less than 0.5 nor more than 0.8 as mentioned above. Thus, the wall-surface friction between the refrigerant and the refrigerant passage can be reduced to suppress the loss of the kinetic energy included in the refrigerant flowing through the refrigerant passage.

As a result, the refrigeration cycle device of the present disclosure can suppress the reduction of the pressure increasing performance of the ejector in which the dryness of the fluid flowing into the nozzle portion is adjusted such that a heating capacity of the fluid to be heat-exchanged in a heating heat exchanger approaches the maximum value.

DESCRIPTION OF EMBODIMENTS (First Embodiment)

A first embodiment of the present disclosure will be described below with reference to FIGS. 1 to 9. In this embodiment, an ejector of the present disclosure is applied to a refrigeration cycle device 10 that is used in a vehicle air conditioner 1 to be mounted on an electric vehicle, which is designed to obtain a driving force for traveling from an electric motor for traveling. Thus, the refrigeration cycle device 10 is configured as the ejector refrigeration cycle. Further, air is a fluid to be heat-exchanged.

Figure 1:
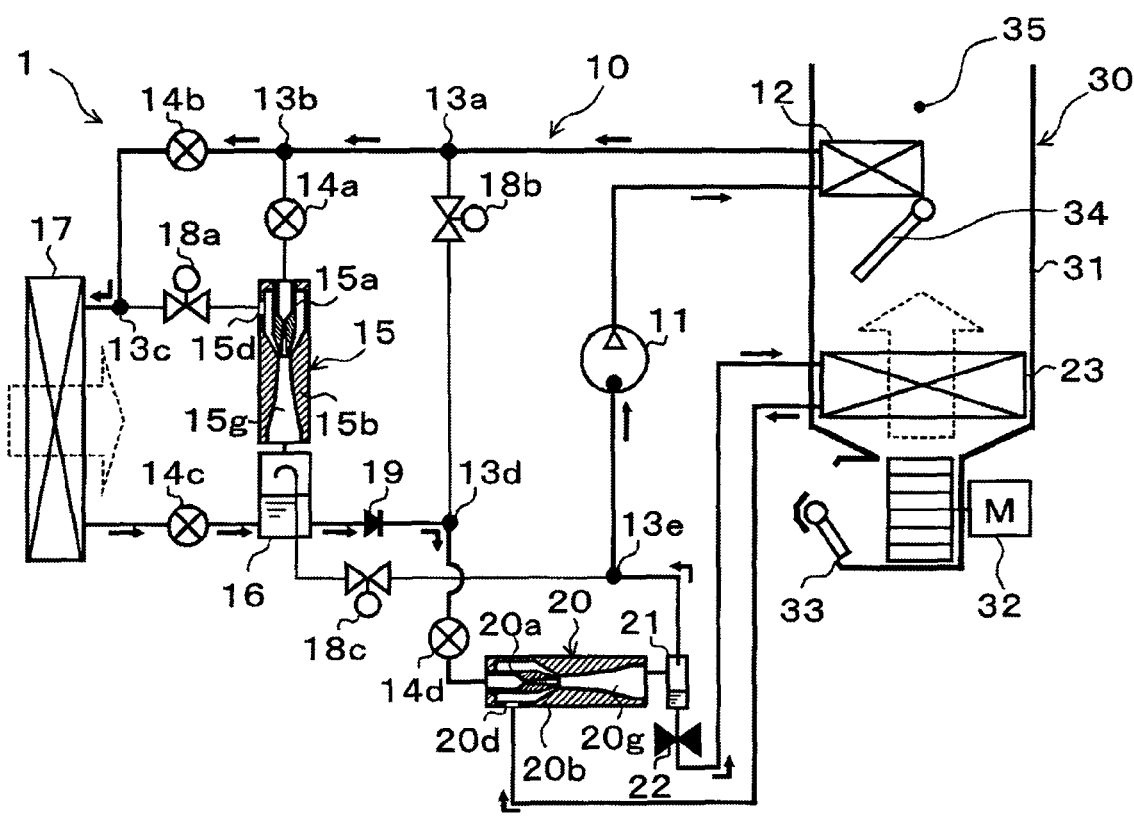
FIG. 1 is an entire configuration diagram showing a refrigerant circuit in an air cooling mode and a weak dehumidification-air heating mode of a refrigeration cycle device according to a first embodiment.
Figure 2:
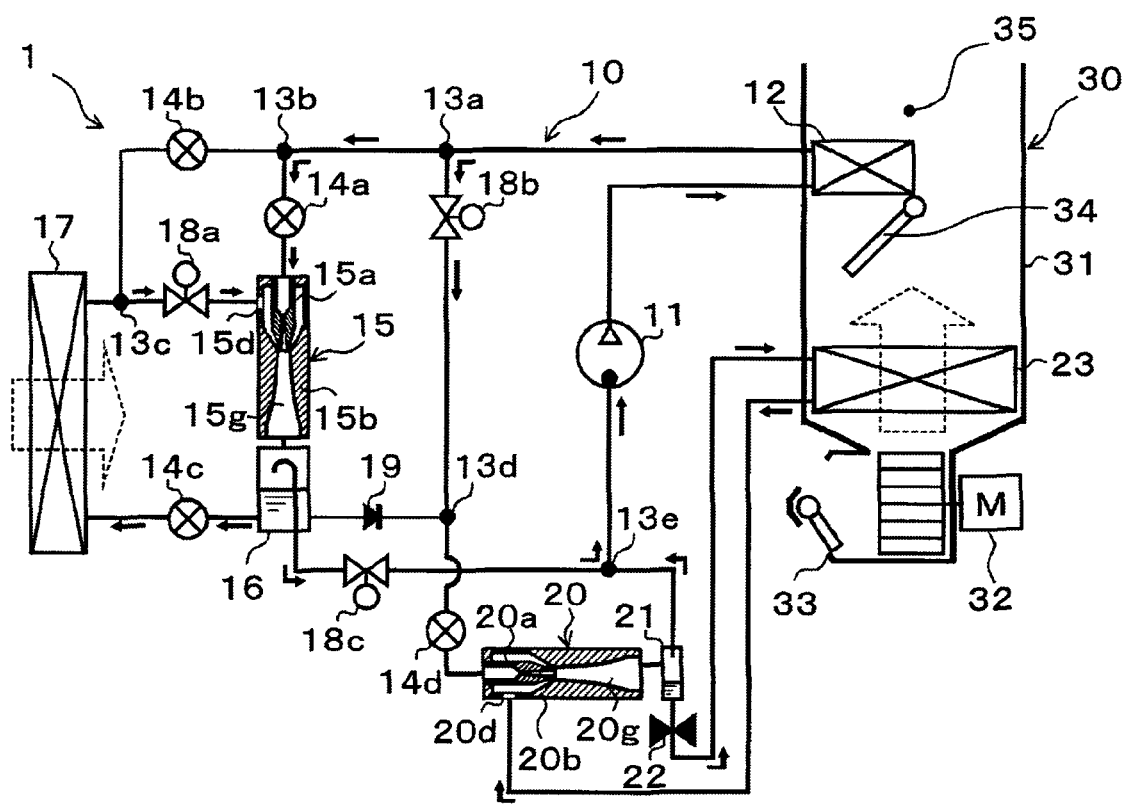
FIG. 2 is an entire configuration diagram showing a refrigerant circuit in a dehumidification-air heating mode of the refrigeration cycle device in the first embodiment.
Figure 3:
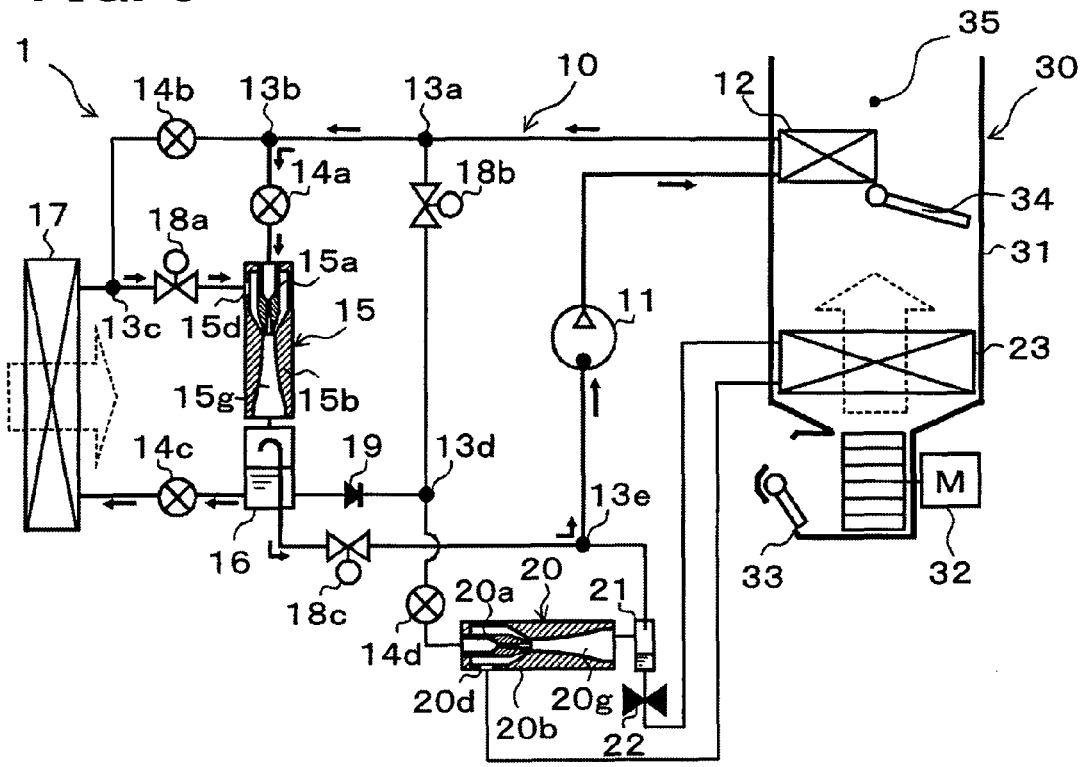
FIG. 3 is an entire configuration diagram showing a refrigerant circuit in an air heating mode of the refrigeration cycle device in the first embodiment.

As shown in FIGS. 1 to 3, the refrigeration cycle device 10 can be configured to perform switching among a refrigerant circuit in an air cooling mode of cooling the vehicle interior by cooling the air (see FIG. 1); a refrigerant circuit in a weak dehumidification-air heating mode of dehumidifying and heating the vehicle interior by re-heating the air cooled and dehumidified (see FIG. 1); a refrigerant circuit in a dehumidification-air heating mode of dehumidifying and heating the vehicle interior by re-heating the air with a higher heating capacity than that in the weak dehumidification-air heating mode (see FIG. 2); and a refrigerant circuit in a heating mode of heating the vehicle interior by heating the air (see FIG. 3). FIGS. 1 and 3 show the flows of the refrigerant in the respective operation modes by solid arrows.

The refrigeration cycle device 10 employs a hydrofluorocarbon (HFC) refrigerant (e.g., R134a) as the refrigerant, and forms an vapor compression subcritical refrigeration cycle whose high-pressure side refrigerant pressure does not exceed the critical pressure of the refrigerant. Obviously, a hydrofluoro-olefin (HFO) refrigerant (e.g., R1234yf) or the like may be used as the refrigerant. Refrigerating machine oil for lubricating the compressor 11 is mixed into the refrigerant, and a part of the refrigerating machine oil circulates through the cycle together with the refrigerant.

A compressor 11 among components of the refrigeration cycle device 10 is positioned in a bonnet of the vehicle, and is to suck, compress, and discharge the refrigerant in the refrigeration cycle device 10. The compressor is an electric compressor which rotatably drives a fixed displacement compression mechanism with a fixed discharge capacity by use of an electric motor. The electric motor of the compressor 11 has its operation (the number of revolutions) controlled by a control signal output from a controller to be described later.

The discharge port side of the compressor 11 is connected to a refrigerant inlet side of an interior condenser 12. The interior condenser 12 is disposed in a casing 31 that forms an air passage for air to be blown into the vehicle interior in an interior air conditioning unit 30 to be described later. The interior condenser 12 is a heating heat exchanger that exchanges heat between the high-pressure refrigerant discharged from the compressor 11 and the air having passed through an interior evaporator 23 to be described later, thereby heating the air. The details of the interior air conditioning unit 30 will be described later.

A refrigerant outlet side of the interior condenser 12 is connected to a first three-way joint 13a. In the first three-way joint 13a, one of three inflow/outflow ports is used as a refrigerant inflow port, and the two remaining inflow/outflow ports are used as a refrigerant outflow port. Thus, the first three-way joint 13a serves as a branch portion for branching the flow of refrigerant flowing out of the interior condenser 12.

One of the refrigerant outflow ports of the first three-way joint 13a is connected to a second three-way joint 13b having the same structure as that of the first three-way joint 13a. One of the refrigerant outflow ports of the second three-way joint 13b is connected to an inlet side of a first flow rate adjustment valve 14a, and the other of the refrigerant outflow ports is connected to an inlet side of a second flow rate adjustment valve 14b.

Each of the first and second flow rate adjustment valves 14a and 14b is an electric variable throttle mechanism including a valve body for changing an opening degree of a refrigerant passage, and an electric actuator including a stepping motor for changing an opening degree of the valve body. The first and second flow rate adjustment valves are adapted to adjust the flow rate of the refrigerant as the expansion valve to thereby decompress and expand the refrigerant.

Further, the first and second flow rate adjustment valves 14a and 14b have a fully opening function of serving as a simple refrigerant passage by fully opening a valve opening without exhibiting a flow rate adjustment effect and refrigerant decompression effect, as well as a completely closing function of closing the refrigerant flow path by completely closing the valve opening.

By these fully opening function and completely closing function, the first and second flow rate adjustment valves 14a and 14b can switch the refrigerant flowing out of the interior condenser 12 between a refrigerant circuit for allowing the refrigerant to flow into the first flow rate adjustment valve 14a side, and a refrigerant circuit for allowing the refrigerant to flow into the second flow rate adjustment valve 14b.

Therefore, the first and second flow rate adjustment valves 14a and 14b configure a refrigerant circuit switch for switching the refrigerant circuit among the air cooling mode, the weak dehumidification-air heating mode, the dehumidification-air heating mode, and the air-heating mode. Each of the first and second flow rate adjustment valves 14a and 14b has its operation controlled by a control signal output from the air conditioning controller.

An outlet side of the first flow rate adjustment valve 14a is connected to an inlet side of a heating side nozzle portion 15a (by way of example of the nozzle portion) of the heating side ejector 15. The heating side ejector 15 serves as a decompressor for decompressing the refrigerant flowing out of the interior condenser 12 in the dehumidification heating mode and the air-heating mode. Further, the heating side ejector 15 serves as a refrigerant circulator (refrigerant carrier) that draws (transports) the refrigerant by the suction effect of the injection refrigerant injected at high velocity so as to allow the refrigerant to circulate through the cycle.

The detailed structure of the heating side ejector 15 will be described below using FIG. 4. The heating side ejector 15 includes a heating side nozzle portion 15a and a heating side body 15b. First, the heating side nozzle portion 15a is formed of metal (e.g., stainless alloy) in a substantially cylindrical shape that is gradually elongated toward the flow direction of the refrigerant. The heating side nozzle portion 15a serves to isentropically decompress and expand the refrigerant in a refrigerant passage (throttle passage) formed therein.

The refrigerant passage formed in the heating side nozzle portion 15a has a throat portion (portion with the minimum passage area) whose refrigerant passage area is minimized. The refrigerant passage further has a divergent part whose refrigerant passage area is gradually increased toward a refrigerant injection port 15c for injecting the refrigerant from the throat portion. That is, the heating side nozzle portion 15a is configured as a Laval nozzle.

In this embodiment, the heating side nozzle portion 15a is used to set the flow rate of the injection refrigerant injected from the refrigerant injection port 15c to a two-phase sound speed ah or more (supersonic speed state) when performing an operation with a high heating capacity at least in the air heating mode to be described later.

Then, the heating side body 15b is formed of metal (e.g., aluminum) in a substantially cylindrical shape. The heating side body 15b serves as a fixing member that supports and fixes the heating side nozzle portion 15a therein, while forming an outer envelope of the heating side ejector 15. More specifically, the heating side nozzle portion 15a is fixed by a press fitting method or the like to the heating side body 15b so as to be accommodated in the body 15b on one end side thereof in the longitudinal direction of the body 15b.

A heating side refrigerant suction port 15d is formed as one example of the refrigerant suction port to penetrate the part of the outer peripheral side surface of the heating side body 15b corresponding to the outer periphery side of the heating side nozzle portion 15a so as to communicate with the refrigerant injection port 15c of the heating side nozzle portion 15a. The heating side refrigerant suction port 15d is a through hole that draws the refrigerant flowing out of one of the refrigerant inlet and outlet of the exterior heat exchanger 17, into the heating side ejector 15 by a suction effect of the injection refrigerant injected from the refrigerant injection port 15c of the heating side nozzle portion 15a in the dehumidification-air heating mode and the air heating mode.

A mixing portion 15e, a suction passage 15f, and a heating side diffuser 15g are formed in the heating side body 15b. The mixing portion 15e mixes the injection refrigerant injected from the refrigerant injection port 15c, with the suction refrigerant drawn from the heating side refrigerant suction port 15d. The suction passage 15f guides the suction refrigerant drawn from the heating side refrigerant suction port 15d to the mixing portion 15e. The heating side diffuser 15g serves as a heating side pressure-increasing portion for raising the pressure of the mixed refrigerant mixed by the mixing portion 15e.

The suction passage 15f is formed in a space between the outer peripheral side of the tapered tip end of the heating side nozzle portion 15a and the inner peripheral side of the heating side body 15b. The refrigerant passage area of the suction passage 15f gradually reduces toward the refrigerant flow direction. Thus, the flow velocity of the drawn refrigerant circulating through the suction passage 15f is gradually increased, which decreases the energy loss (mixing loss) when mixing the suction refrigerant with the injection refrigerant by the mixing portion 15e.

The mixing portion 15e is formed by a space ranging from the refrigerant injection port 15c of the heating side nozzle portion 15a to an inlet 15h of the heating side diffuser 15g within an internal space of the heating side body 15b.

Further, the mixing portion 15e is formed in a truncated conical shape that gradually reduces its refrigerant passage area in the refrigerant flow direction, whereby the refrigerant passage area of the inlet 15h of the heating side diffuser 15g is smaller than that of the refrigerant injection portion 15c.

Thus, the mixing portion 15e gradually decreases the flow velocity of the mixed refrigerant such that the flow velocity of the mixed refrigerant is lower than the two phase sound velocity αh until the mixed refrigerant reaches the inlet 15h of the heating side diffuser 15g. In other words, the refrigerant flowing into the heating side diffuser 15g becomes a subsonic state.

The heating side diffuser 15g is disposed to continuously lead to an outlet of the mixing portion 15e, and is formed such that the refrigerant passage area is gradually increased in the refrigerant flow direction. Thus, the diffuser converts the velocity energy of the mixed refrigerant flowing out of the mixing portion 15e to the pressure energy, that is, increases the pressure of the mixed refrigerant by decelerating the flow velocity of the mixed refrigerant.

Figure 4:
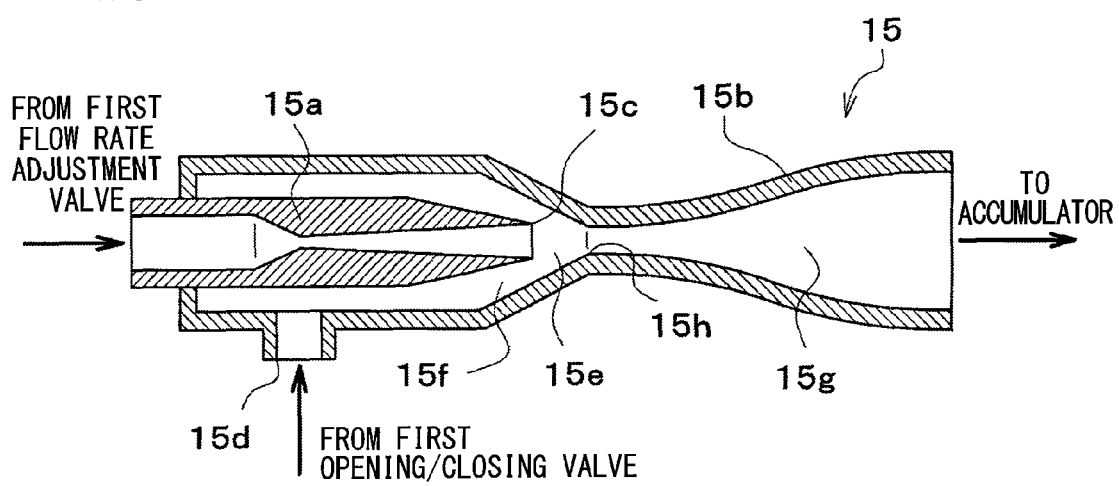
FIG. 4 is a cross-sectional view in an axial direction of a heating side ejector in the first embodiment.

More specifically, the shape of the inner peripheral wall surface of the heating side body 15b forming the heating side diffuser 15g is formed by a combination of a plurality of curved lines as shown in FIG. 4. The expanding degree of the refrigerant passage sectional area of the heating side diffuser 15g is gradually increased and then decreased again along the refrigerant flow direction, which can isentropically increase the pressure of the refrigerant.

The refrigerant outlet side of the heating side diffuser 15g of the heating side ejector 15 is connected to the refrigerant inflow port of the accumulator 16. The accumulator 16 is a gas-liquid separator that separates the refrigerant flowing thereinto into liquid and gas refrigerant phases. Further, the accumulator 16 serves as a liquid storage portion for storing therein the excessive liquid-phase refrigerant in the cycle. Note that the accumulator 16 is disposed inside a bonnet of the vehicle, that is, in an external space exposed to the outside air.

The accumulator 16 includes two liquid-phase refrigerant inflow and outflow ports disposed so as to be capable of flowing out the separated liquid-phase refrigerant to the outside, and one gas-phase refrigerant outflow port for flowing out the separated gas-phase refrigerant.

On the other hand, one liquid-phase refrigerant inflow and outlet ports of the accumulator 16 is connected to the other of the refrigerant inflow and outflow ports of the exterior heat exchanger 17 via a third flow rate adjustment valve 14c. The third flow rate adjustment valve 14c has the same basic structure as that of each of the first and second flow rate adjustment valves 14a and 14b. The third flow rate adjustment valve 14c does not serve as the refrigerant circuit switch, and thus may not have the completely closing function.

The exterior heat exchanger 17 is disposed in the bonnet of the vehicle, and serves to exchange heat between the refrigerant flowing therethrough and outside air blown from a blower fan (not shown). More specifically, the exterior heat exchanger 17 of this embodiment serves as a radiator for dissipating heat from a high-pressure refrigerant in the air cooling mode and the weak dehumidification-air heating mode, and as an evaporator for evaporating a low-pressure refrigerant in the dehumidification-air heating mode and the air heating mode.

The blower fan is an electric blower whose operating ratio, that is, whose number of revolutions (volume of air) is controlled by a control voltage output from the air conditioning controller. Further, as mentioned above, one of the refrigerant inflow and outflow ports of the exterior heat exchanger 17 is connected to the heating side refrigerant suction port 15d of the heating side ejector 15 via a first opening/closing valve 18a.

The first opening/closing valve 18a is an electromagnetic valve for opening and closing a refrigerant passage leading from one of the refrigerant inflow and outflow ports of the exterior heat exchanger 17 to the heating side refrigerant suction port 15d of the heating side ejector 15. The first opening/closing valve 18a configures the refrigerant circuit switch, together with the first and second flow rate adjustment valves 14a and 14b. The first opening/closing valve 18a has its operation controlled by a control voltage output from the air conditioning controller.

A third three-way joint 13c is disposed in a refrigerant passage that connects one of the refrigerant inflow and outflow ports of the exterior heat exchanger 17 with the first opening/closing valve 18a. The third three-way joint 13c is connected to the outlet side of the second flow rate adjustment valve 14b. In other words, the outlet side of the second flow rate adjustment valve 14b is connected to the one of the refrigerant inflow and outflow ports of the exterior heat exchanger 17.

The other of the liquid-phase refrigerant inflow and outflow ports of the accumulator 16 is connected to the inlet side of the fourth flow rate adjustment valve 14d via a check valve 19. The check valve 19 allows only the refrigerant to flow out of the other of the liquid-phase refrigerant inflow and outflow ports of the accumulator 16 to the fourth flow rate adjustment valve 14d side. Note that the fourth flow rate adjustment valve 14d has the same basic structure as that of the third flow rate adjustment valves 14c.

A refrigerant passage for connecting the check valve 19 with the fourth flow rate adjustment valve 14d is provided with a fourth three-way joint 13d. The fourth three-way joint 13d is connected to the other refrigerant outflow port of the first three-way joint 13a described above. Further, a refrigerant passage leading from the other refrigerant outflow port of the first three-way joint 13a to the fourth three-way joint 13d is provided with a second opening/closing valve 18b for opening and closing the refrigerant passage.

The gas-phase refrigerant outflow port of the accumulator 16 is connected to a suction port of the compressor 11 via the third opening/closing valve 18c and the fifth three-way joint 13e. The second and third opening/closing valves 18b and 18c has the same basic structure as that of the first opening/closing valve 18a. The third to fifth three-way joints 13c to 13e have the same basic structure as that of the first three-way joint 13a. Further, the second and third opening/closing valves 18b and 18c constitutes the refrigerant circuit switch together with the first opening/losing valve 18a and the like described above.

An outlet side of the fourth flow rate adjustment valve 14d is connected to an inlet side of a cooling side nozzle portion 20a of the cooling side ejector 20. The cooling side ejector 20 is a cooling side decompressor for decompressing the other refrigerant branched by the first three-way joint 13a at least in the dehumidification-air heating mode. The cooling side ejector 20 has the same basic structure as that of the heating side ejector 15.

Therefore, like the heating side ejector 15, the cooling side ejector 20 includes a cooling side nozzle portion 20a for decompressing the refrigerant, and a cooling side body 20b provided with a cooling side refrigerant suction port 20d for drawing the refrigerant flowing out of the interior evaporator 23 and a cooling side diffuser (cooling side pressure-increasing portion) 20g for increasing the pressure of the mixed refrigerant.

Further, the cooling side nozzle portion 20a and the cooling side body 20b of the cooling side ejector 20 in use are set so as to be capable of exhibiting the high coefficient of performance (COP) in the entire refrigeration cycle device 10, for example, by flowing the saturated liquid-phase refrigerant thereinto in the air cooling mode. The refrigerant outlet side of the cooling side diffuser 20g of the cooling side ejector 20 is connected to the refrigerant inflow port of the cooling side gas-liquid separator 21.

The cooling side gas-liquid separator 21 separates the refrigerant flowing out of the cooling side diffuser 20g into the gas and liquid phases, and allows the separated liquid-phase refrigerant and the gas-phase refrigerant to flow out to the outside without retaining therein the separated liquid-phase refrigerant. That is, the cooling side gas-liquid separator 21 hardly has the function of a liquid storage portion.

Such a cooling side gas-liquid separator 21 is of, for example, a centrifugal separation type that separates the refrigerant into the liquid and gas phases by the action of centrifugal force. The cooling side gas-liquid separator 21 for use may be a small-sized one whose internal capacity is too small to substantially retain the excessive refrigerant therein. At a liquid-phase refrigerant outflow port of the cooling side gas-liquid separator 21, a fixed throttle 22 made of an orifice or a capillary tube is disposed.

The outlet side of the fixed throttle 22 is connected to a refrigerant inlet side of an interior evaporator 23. The interior evaporator 23 is disposed on the upstream side of air flow with respect to the above-mentioned interior condenser 12 within the casing 31 of the interior air conditioning unit 30. The interior evaporator 23 is a cooling heat exchanger that cools the air by exchanging heat between the air and the low-pressure liquid-phase refrigerant flowed from the cooling side gas-liquid separator 21.

The refrigerant outlet side of the interior evaporator 23 is connected to the cooling side refrigerant suction port 20d of the cooling side ejector 20. The gas-phase refrigerant outflow port of the cooling side gas-liquid separator 21 is connected to a suction port of the compressor 11 via the fifth three-way joint 13e described above.

Now, the interior air conditioning unit 30 will be described below. The interior air conditioning unit 30 serves to blow out the air whose temperature is adjusted by the refrigeration cycle device 10 into the vehicle compartment. The interior air conditioning unit 30 is disposed inside (inside the vehicle compartment) a dashboard (instrument panel) at the foremost part of the vehicle compartment. Further, the interior air conditioning unit 30 is configured to accommodate a blower 32, the interior evaporator 23, the interior condenser 12, an air mix door 34, and the like in the casing 31 forming its outer envelope.

The casing 31 forms an air passage for air to be blown into the vehicle interior. The casing 31 has some elasticity, and is formed of resin (for example, polypropylene) having excellent strength. On the most upstream side of the air flow in the casing 31, an inside/outside air switch 33 is provided to serve as an inside/outside air switching portion for switching between inside air (air in the vehicle interior) and outside air (air outside the vehicle interior) and introducing the air into the casing 31.

The inside/outside air switch 33 continuously adjusts opening areas of an inside air inlet for introducing the inside air into the casing 31 and an outside air inlet for introducing the outside air into the casing 31 by use of an inside/outside air switching door, thereby continuously changing a ratio of the volume of the inside air to the outside air. The inside/outside air switching door is driven by an electric actuator for the inside/outside air switching door. The electric actuator has its operation controlled by a control signal output from the air conditioning controller.

On the downstream side of air flow of the inside/outside air switch 33, the blowing device (blower) 32 is disposed as a blowing equipment for blowing air drawn thereinto via the inside/outside air switch 33, toward the vehicle interior. The blower 32 is an electric blower that drives a centrifugal multi-blade fan (sirrocco fan) by an electric motor. The blower 32 has the number of revolutions (i.e., air blowing volume) controlled by a control voltage output from the air conditioning controller.

The interior evaporator 23 and the interior condenser 12 are disposed on the downstream side of the air flow of the blower 32 in this order with respect to the air flow. In short, the interior evaporator 23 is disposed on the upstream side of the air flow with respect to the interior condenser 12. The air mix door 34 is disposed on the downstream side of the air flow of the interior evaporator 23 and on the upstream side of the air flow of the interior condenser 12. The air mix door 34 adjusts the rate of the volume of the air passing through the interior condenser 12 among the air having passed through the interior evaporator 23.

A mixing space 35 is provided on the downstream side of the air flow of the interior condenser 12 so as to mix the air heated by exchanging heat with the refrigerant in the interior condenser 12, with the air not heated while bypassing the interior condenser 12. Further, openings for blowing out the air (conditioned air) mixed in the mixing space 35, into the vehicle interior as a space to be air conditioned are disposed on the most downstream side of the air flow in the casing 31.

Specifically, the openings include a face opening for blowing the conditioned air toward the upper body of a passenger in the vehicle compartment, a foot opening for blowing the conditioned air toward the foot of the passenger, and a defroster opening for blowing the conditioned air toward the inner side surface of a front glass of the vehicle (which openings are not shown). A face air outlet, a foot air outlet, and a defroster air outlet (not shown) provided in the vehicle interior are connected to the downstream sides of the air flows of these face opening, foot opening, and defroster opening, respectively, via ducts forming air passages.

Thus, the air mix door 34 adjusts the rate of the volume of air passing through the interior condenser 12 to thereby adjust the temperature of conditioned air mixed in the mixing space 35, thus controlling the temperature of the conditioned air blown from each opening. That is, the air mix door 34 serves as a temperature adjustment unit for adjusting the temperature of the conditioned air to be blown into the vehicle interior.

Note that the air mix door 34 is driven by an electric actuator for driving the air mix door. The electric actuator for driving the air mix door has its operation controlled by the control signal output from the air conditioning controller.

A face door for adjusting an opening area of the face opening is positioned on the upstream side of the air flow of the face opening; a foot door for adjusting an opening area of the foot opening is positioned on the upstream side of the air flow of the foot opening; and a defroster door for adjusting an opening area of the defroster opening is positioned on the upstream side of the air flow of the defroster opening (these doors being not shown).

These face door, foot door, and defroster door serve as air outlet mode switch for switching among air outlet modes.

These doors are coupled to and rotated with the electric actuator for driving the air outlet mode door via a link mechanism or the like. The electric actuator for driving the air outlet mode door has its operation controlled by a control signal output from the air conditioning controller.

Air outlet modes to be switched by an air outlet mode switch include, specifically, a face mode, a bi-level mode, a foot mode, and a foot-defroster mode. In the face mode, a face air outlet is fully opened to blow the air from the face air outlet toward the upper body of a passenger in the vehicle compartment. In the bi-level mode, both the face air outlet and a foot air outlet are opened to blow air toward the upper body and feet of the passenger in the vehicle compartment. In the foot mode, the foot air outlet is fully opened with a defroster air outlet opened only by a small opening degree to blow the air mainly from the foot air outlet. In the foot/defroster mode, the foot air outlet and the defroster air outlet are opened by the same degree to blow the air from both the foot air outlet and the defroster air outlet.

Further, a blow-out mode selector switch provided on the operation panel is manually operated by the passenger, so that the defroster air outlet is also fully opened to thereby enable setting of a defroster mode of blowing air from the defroster air outlet toward the inner face of the front windowpane of the vehicle.

Next, an electric controller will be described below. The air conditioning controller includes a well-known microcomputer, including a CPU, a ROM, a RAM, and the like, and its peripheral circuit. The air conditioning controller performs various computations and processing based on control programs stored in the ROM, and controls the operations of various devices 11, 14a to 14d, 18a to 18c, and 32 to be controlled that are connected to an output side thereof.

The input side of the air conditioning controller is connected to a group of sensors for air conditioning control, which includes an inside air sensor, an outside air sensor, a solar radiation sensor, a discharge temperature sensor, a discharge pressure sensor, an evaporator temperature sensor, an air temperature sensor, and an exterior heat exchanger temperature sensor. Detection signals from the sensor group are input to the input side of the air conditioning controller. The inside air sensor is an inside air temperature detector that detects a vehicle interior temperature (inside air temperature) Tr. The outside air sensor is an outside air temperature detector that detects a vehicle exterior temperature (outside air temperature) Tam. The solar radiation sensor is a solar radiation amount detector that detects the amount of solar radiation As onto the vehicle interior. The discharge temperature sensor detects a discharge refrigerant temperature Td of the refrigerant discharged from the compressor 11. The discharge pressure sensor detects a discharge refrigerant pressure (high-pressure side refrigerant pressure) Pd of the refrigerant discharged from the compressor 11. The evaporator temperature sensor detects a refrigerant evaporation temperature (evaporator temperature) Tefin in the interior evaporator 23. The air temperature sensor detects an air temperature TAV to be blown from the mixing space into the vehicle interior. The exterior heat exchanger temperature sensor detects an exterior temperature Ts of the exterior heat exchanger 17.

The evaporator temperature sensor is adapted to detect the temperature of a heat exchanging fin of the interior evaporator 23, but may adopt a temperature detector for detecting the temperature of another part of the interior evaporator 23.

The exterior heat exchanger temperature sensor is adapted to detect the temperature of a refrigerant outflow port of the exterior heat exchanger 17, but may adopt a temperature detector for detecting the temperature of another part of the interior evaporator 23.

In this embodiment, the air temperature sensor for detecting the air temperature TAV is provided. As the air temperature TAV, a value calculated based on the evaporator temperature Tefin, the high-pressure side refrigerant temperature Td, and the like may be used.

An operation panel (not shown) is disposed near an instrument board at the front of the vehicle compartment, and connected to the input side of the air conditioning controller. Operation signals are input from various types of operation switches provided on the operation panel.

Various types of operation switches provided in the operation panel include, specifically, an automatic switch, an air cooler switch (A/C switch), an air volume setting switch, a temperature setting switch, a blow-out mode selector switch, and the like. The automatic switch sets or resets an automatic control operation of the vehicle air conditioner 1. The A/C switch performs cooling of the vehicle interior. The air volume setting switch manually sets the volume of air from the blower 32. The temperature setting switch is a target temperature setting portion that sets a target temperature Tset of the vehicle interior. The blow-out mode selector switch manually sets a blow-out mode.

The air conditioning controller incorporates therein a control unit for controlling various types of devices to be controlled, which are connected to the output side thereof. The structure (hardware and software) for controlling the operation of each of the devices to be controlled configures the control unit for controlling the operation of the corresponding device to be controlled.

For example, the structure (hardware and software) for controlling the operation (refrigerant discharge capacity) of the compressor 11 in the air conditioning controller serves as a compressor control unit, and the structure (hardware and software) for controlling the operation of each of the opening/closing valves 18a to 18c which configure the refrigerant circuit switch serves as a refrigerant circuit control unit. The compressor control unit, the refrigerant circuit control unit, and the like may be configured as another separate air conditioning controller with respect to the air conditioning controller.

Now, the operation of the above-mentioned structure will be described. As described above, the vehicle air conditioner 1 can switch its operation among the air cooling mode, the air heating mode, the weak dehumidification-air heating mode, and the dehumidification-air heating mode. Switching among these operation modes is performed by executing an air conditioning control program. The air conditioning control program is executed when the automatic switch on the operation panel is turned on (ON).

More specifically, the main routine of the air conditioning control program involves reading the detection signals from the above-mentioned sensor group for the air conditioning control, and the operation signals from the various air conditioning operation switches. A target air temperature TAO which is a target temperature of air to be blown into the vehicle interior is calculated based on the following formula F6, based on the values of the detection signals and the operation signals read.

$$TAO = Kset \times Tset - Kr \times Tr - Kam \times Tam - Ks \times As + C \tag{F6}$$

where Tset is a vehicle interior preset temperature set by the temperature setting switch, Tr is a vehicle interior temperature (inside air temperature) detected by the inside air sensor, Tam is an outside air temperature detected by the outside air sensor, and As is an amount of solar radiation detected by the solar radiation sensor. The Kset, Kr, Kam, and Ks are control gains, and C is a constant for correction.

The operation in the air cooling mode is performed when the air cooler switch on the operation panel is turned on, and the target air temperature TAO is lower than a predetermined air-cooling reference temperature α. The operation in the weak dehumidification-air heating mode is performed when the target air temperature TAO is equal to or higher than the air-cooling reference temperature α with the air cooler switch turned on, and the outside air temperature Tam is higher than a predetermined dehumidification-air heating reference temperature β.

On the other hand, the operation in the dehumidification-air heating mode is performed when the target air temperature TAO is equal to or higher than the air-cooling reference temperature α with the air cooler switch turned on, and the outside air temperature Tam is equal to or lower than the predetermined dehumidification-air heating reference temperature β. When the air cooler switch is not turned on, the operation in the air heating mode is performed.

Thus, in this embodiment, the air cooling mode is performed when the outside air temperature is relatively high, mainly, in summer or the like. The weak dehumidification-air heating mode is performed mainly in spring or autumn. The dehumidification-air heating mode is performed mainly in early spring or early winter, specifically, when the total heat amount required for sufficiently heating the air is larger than the sum of the compression working amount of the compressor 11 and the total heat absorption amount by the interior evaporator 23, or when the frost formation (frost) of the interior evaporator 23 needs to be more highly suppressed than in the weak dehumidification-air heating mode.

Further, the air heating mode is performed when the absolute humidity of the outside air is decreased at a low outside air temperature in winter (for example, when the outside air temperature is −10° C. or less), and the outside air is introduced from an inside/outside air switch 33, thereby eliminating the need for dehumidification of the air. Now, a description will be given of the operation of each of the operation modes.

(a) Air Cooling Mode

In the air cooling mode, the air conditioning controller completely closes the first flow rate adjustment valve 14a, fully opens the second flow rate adjustment valve 14b, fully opens the third flow rate adjustment valve 14c, and fully opens the fourth flow rate adjustment valve 14d. Further, the air conditioning controller closes the first opening/closing valve 18a, closes the second opening/closing valve 18b, and closes the third opening/closing valve 18c.

Thus, in the air cooling mode, the refrigeration cycle using the ejector (ejector refrigeration cycle) is configured in the following manner as indicated by solid arrows of FIG. 1. The refrigerant circulates through the compressor 11, the interior condenser 12, (the second flow rate adjustment valve 14b), the exterior heat exchanger 17, (the third flow rate adjustment valve 14c), the accumulator 16, (the check valve 19, the fourth flow rate adjustment valve 14d), the cooling side ejector 20, the cooling side gas-liquid separator 21, and the compressor 11 in this order. At the same time, the refrigerant circulates through the cooling side gas-liquid separator 21, the fixed throttle 22, the interior evaporator 23, and the cooling side refrigerant suction port 20d of the cooling side ejector 20 in this order.

The air conditioning controller with the structure of this refrigerant circuit determines the operation states of the respective various devices to be controlled (control signals output to the respective devices to be controlled) based on the target air temperature TAO, the detection signals from the sensor group, and the like.

For example, the refrigerant discharge capacity of the compressor 11, that is, the control signal to be output to the electric motor of the compressor 11 is determined in the following way. First, a target evaporator outlet air temperature TEO of the interior evaporator 23 is determined based on the target air temperature TAO with reference to the control map pre-stored in the air conditioning controller. The target evaporator outlet air temperature TEO is determined to be equal to or higher than a reference frost-formation preventing temperature (e.g., 1° C.), which is determined to be capable of suppressing the frost formation in the interior evaporator 23.

Then, a control signal to be output to the electric motor of the compressor 11 is determined based on a deviation between the target evaporator outlet air temperature TEO and the evaporator temperature Tefin detected by the evaporator temperature sensor such that the evaporator temperature Tefin approaches the target evaporator outlet air temperature TEO by the feedback control.

The control signal output to the electric actuator for driving the air mix door 34 is determined such that the air mix door 34 closes an air passage on the side of the interior condenser 12, and that the whole air having passed through the interior evaporator 23 flows, while bypassing the interior condenser 12. In the air cooling mode, the opening degree of the air mix door 34 may be controlled such that the air temperature TAV approaches the target air temperature TAO.

The control signals or the like determined as mentioned above are output to the respective various devices to be controlled. Then, a control routine is repeated until the operation of the vehicle air conditioner is requested to stop. The control routine involves reading the above-mentioned detection signal and operation signal, calculating the target air temperature TAO, determining the operation state of each of various devices to be controlled, and outputting a control voltage and the control signal, every predetermined control cycle. The repetition of such a control routine is also performed in other operation modes in the same way.

Figure 5:
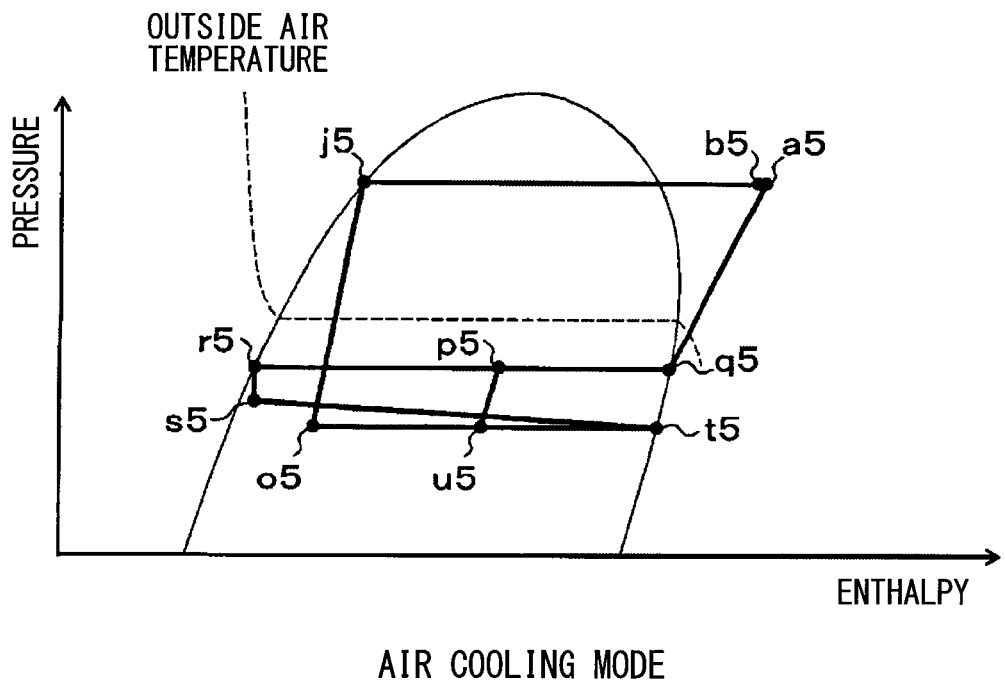
FIG. 5 is a Mollier chart showing the state of refrigerant in the air cooling mode of the refrigeration cycle device in the first embodiment.

Thus, the refrigeration cycle device 10 in the air cooling mode changes the state of the refrigerant as illustrated in a Mollier chart of FIG. 5. Specifically, the high-pressure refrigerant discharged from the compressor 11 (indicated by a point a5 in FIG. 5) flows into the interior condenser 12. At this time, the air mix door 34 closes an air passage on the side of the interior condenser 12, so that the refrigerant flowing into the interior condenser 12 flows out of the interior condenser 12 without almost exchanging heat with the air.

The first and second opening/closing valves 18a and 18b are closed, the first flow rate adjustment valve 14a is completely closed, and the second flow rate adjustment valve 14b is fully opened. Thus, the refrigerant flowing out of the interior condenser 12 (as indicated by a point b5 in FIG. 5) flows into one of the refrigerant inflow and outflow ports of the exterior heat exchanger 17 via the first three-way joint 13a, the second three-way joint 13b, the second flow rate adjustment valve 14b, and the third three-way joint 13c. The refrigerant flowing into the exterior heat exchanger 17 dissipates heat into the outside air blown from the blower fan in the exterior heat exchanger 17 (as indicated from the point b5 to a point j5 in FIG. 5).

The refrigerant flowing out of the other of the refrigerant inflow and outflow ports of the exterior heat exchanger 17 flows into the accumulator 16 via the third flow rate adjustment valve 14c fully opened, and then is separated into liquid and gas phase refrigerants. Since the third opening/closing valve 18c is closed and the fourth flow rate adjustment valve 14d is fully opened, the liquid-phase refrigerant separated by the accumulator 16 flows into the cooling side nozzle portion 20a of the cooling side ejector 20 via the check valve 19, the fourth three-way joint 13d, and the fourth flow rate adjustment valve 14d.

The refrigerant flowing into the cooling side nozzle portion 20a is isentropically decompressed and injected (as indicated from a point j5 to a point o5 in FIG. 5). The refrigerant flowing out of the interior evaporator 23 is drawn into the cooling side refrigerant suction port 20d of the cooling side ejector 20 by a suction effect of the injection refrigerant. The injection refrigerant injected from the cooling side nozzle portion 20a, and the suction refrigerant drawn from the cooling side refrigerant suction port 20d flow into the cooling side diffuser 20g (as indicated from the point o5 to a point u5, and from a point t5 to the point u5 in FIG. 5, respectively).

The cooling side diffuser 20g converts the velocity energy of the refrigerant into the pressure energy thereof by increasing the refrigerant passage area. Thus, the pressure of the mixed refrigerant including the injection refrigerant and the suction refrigerant rises (as indicated from the point u5 to a point p5 in FIG. 5). The refrigerant flowing out of the cooling side diffuser 20g flows into the cooling side gas-liquid separator 21 to be separated into gas and liquid phase refrigerants (as indicated from the point p5 to a point q5, and from the point p5 to a point r5 in FIG. 5, respectively).

The liquid-phase refrigerant separated by the cooling side gas-liquid separator 21 is isentropically decompressed by the fixed throttle 22 (as indicated from the point r5 to a point s5 in FIG. 5). The refrigerant decompressed by the fixed throttle 22 flows into the interior evaporator 23, and exchanges heat with air blown from the blower 32 to evaporate itself (as indicated from the point s5 to a point t5 in FIG. 5). In this way, the air is cooled, thereby achieving the air cooling of the vehicle interior.

The refrigerant flowing out of the interior evaporator 23 is drawn from the cooling side refrigerant suction port 20d of the cooling side ejector 20. The gas-phase refrigerant separated by the cooling side gas-liquid separator 21 (as indicated at a point q5 in FIG. 5) is drawn into the compressor 11 via the fifth three-way joint 13e, and then compressed again (as indicated from the point q5 to a point a5 in FIG. 5).

Thus, in the air cooling mode, the air cooled by the interior evaporator 23 is blown into the vehicle interior, thereby enabling the air cooling of the vehicle interior. In the air cooling mode, the fourth flow rate adjustment valve 14d is fully opened. However, the valve opening degree of the fourth flow rate adjustment valve 14d may be adjusted according to a flow rate of the refrigerant circulating through the cycle.

(b) Weak Dehumidification-air Heating Mode

In the weak dehumidification-air heating mode, the air conditioning controller completely closes the first flow rate adjustment valve 14a, puts the second flow rate adjustment valve 14b into a throttled state that exhibits the decompression effect, fully opens the third flow rate adjustment valve 14c, and fully opens the fourth flow rate adjustment valve 14d. Further, the air conditioning controller closes the first opening/closing valve 18a, closes the second opening/closing valve 18b, and closes the third opening/closing valve 18c.

Thus, in the weak dehumidification-air heating mode, as indicated by the solid arrows of FIG. 1, the ejector refrigeration cycle is configured to allow the refrigerant to circulate therethrough in the same manner as the air cooling mode. With the refrigerant circuit structure, the air conditioning controller determines the operation states of the respective various devices to be controlled based on the target air temperature TAO, the detection signals from the sensor group, and the like.

For example, the refrigerant discharge capacity of the compressor 11 is determined in the same way as the air cooling mode. A control signal to be output to the electric actuator for driving the air mix door 34 is determined such that the air temperature TAV approaches the target air temperature TAO. The valve opening degree of the second flow rate adjustment valve 14b is determined to be a predetermined valve opening degree.

Figure 6:
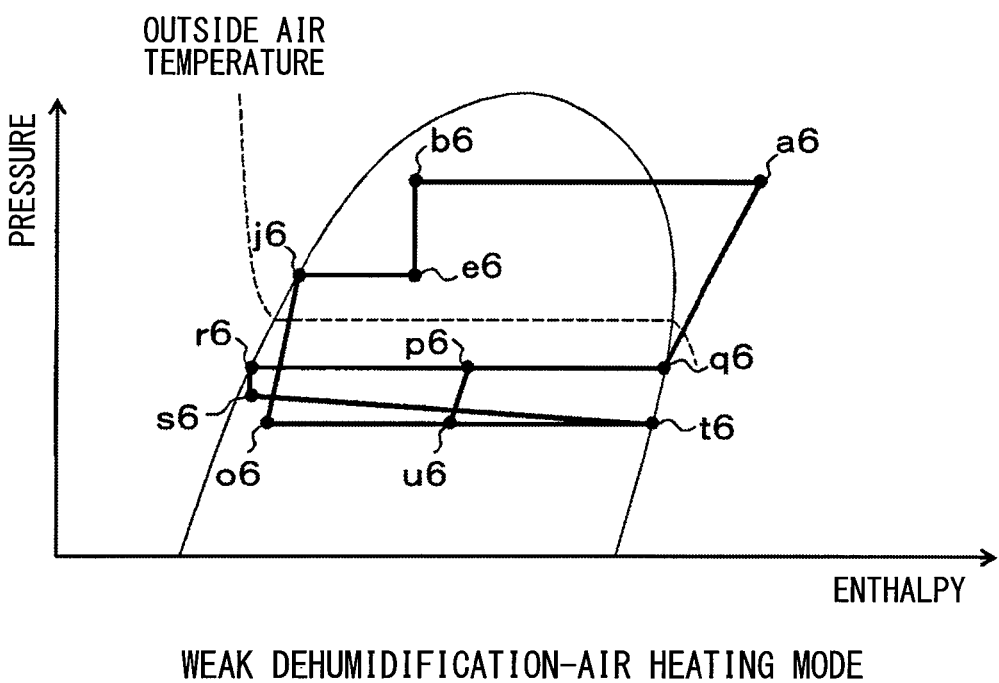
FIG. 6 is a Mollier chart showing the state of refrigerant in the weak dehumidification-air heating mode of the refrigeration cycle device in the first embodiment.

Thus, the refrigeration cycle device 10 in the weak dehumidification-air heating mode changes the state of the refrigerant as illustrated in a Mollier chart of FIG. 6. Each reference numeral indicative of the state of refrigerant in the Mollier chart of FIG. 6 is represented by using the same letter of alphabet as that in the state of refrigerant in an equivalent position in terms of cycle structure in the Mollier chart of FIG. 5, but also using a different number. The same goes for the Mollier charts below.

In the weak dehumidification-air heating mode, since the air mix door 34 opens the air passage on the side of the interior condenser 12, the high-pressure refrigerant discharged from the compressor 11 (as indicated by a point a6 in FIG. 6) flows into the interior condenser 12 to exchange heat with a part of air cooled and dehumidified by the interior evaporator 23, thereby dissipating heat therefrom (as indicated from the point a6 to a point b6 in FIG. 6). In this way, the part of the air is heated.

The second opening/closing valve 18b is closed, the first flow rate adjustment valve 14a is completely closed, and the second flow rate adjustment valve 14b is brought into a throttled state. Thus, the refrigerant flowing out of the interior condenser 12 flows into the second flow rate adjustment valve 14b to be isentropically decompressed (as indicated from a point b6 to a point e6 in FIG. 6). Since the first opening/closing valve 18a is closed, the refrigerant flowing out of the second flow rate adjustment valve 14b flows into one of the refrigerant inflow and outflow ports of the exterior heat exchanger 17 via the third three-way joint 13c.

The refrigerant flowing into the exterior heat exchanger 17 dissipates heat into the outside air blown from the blower fan in the exterior heat exchanger 17 (as indicated from the point e6 to a point j6 in FIG. 5). The refrigerant flowing out of the other of the refrigerant inflow and outflow ports of the exterior heat exchanger 17 flows into the accumulator 16 via the third flow rate adjustment valve 14c fully opened, and then is separated into liquid and gas phase refrigerants. The operations following this step will be the same as those in the air cooling mode.

Thus, in the weak dehumidification-air heating mode, the air cooled and dehumidified by the interior evaporator 23 is heated again in the interior condenser 12 and blown into the vehicle interior to achieve the dehumidification-air heating of the vehicle interior.

Note that in the weak dehumidification-air heating mode, the second flow rate adjustment valve 14b is brought into the throttled state, which reduces the temperature of the refrigerant flowing into the exterior heat exchanger 17 as compared to in the air cooling mode. Thus, a difference between the refrigerant temperature in the exterior heat exchanger 17 and the outside air temperature can be decreased to reduce the amount of dissipation of heat in the exterior heat exchanger 17 as compared to the air cooling mode.

As a result, the refrigerant pressure in the interior condenser 12 can be increased to thereby improve the heating capacity of air in the interior condenser 12 without increasing the flow rate of the circulation refrigerant circulating through the cycle, as compared to the case where the operation of the air mix door 34 is controlled such that the air temperature TAV simply approaches the target air temperature TAO in the air cooling mode.

(c) Dehumidification-air Heating Mode

In the dehumidification-air heating mode, the air conditioning controller puts the first flow rate adjustment valve 14a into the throttled state, completely closes the second flow rate adjustment valve 14b, puts the third flow rate adjustment valve 14c into the throttled state, and fully opens the fourth flow rate adjustment valve 14d. Further, the air conditioning controller opens the first opening/closing valve 18a, opens the second opening/closing valve 18b, and opens the third opening/closing valve 18c.

Thus, in the dehumidification-air heating mode, the ejector refrigeration cycle is configured as indicated by solid arrows in FIG. 2 in the following way. Specifically, the refrigerant circulates through the compressor 11, the interior condenser 12, the first flow rate adjustment valve 14a, the heating side ejector 15, the accumulator 16, (third opening/closing valve 18c), and the compressor 11 in this order, while the refrigerant circulates through the accumulator 16, the third flow rate adjustment valve 14c, the exterior heat exchanger 17, (first opening/closing valve 18a), and the heating side refrigerant suction port 15d of the heating side ejector 15 in this order.

Simultaneously, the ejector refrigeration cycle is configured in the following way. Specifically, the refrigerant circulates through the compressor 11, the interior condenser 12, (the second opening/closing valve 18b, the fourth flow rate adjustment valve 14d), the cooling side ejector 20, the cooling side gas-liquid separator 21, and the compressor 11 in this order, and also circulates through the cooling side gas-liquid separator 21, the fixed throttle 22, the interior evaporator 23, and the cooling side refrigerant suction port 20d of the cooling side ejector 20 in this order.

That is, in the dehumidification-air heating mode, a refrigerant circuit is configured such that the refrigerant flow out of the interior condenser 12 is branched by the first three-way joint 13a, and one of the branched refrigerants flows into the heating side nozzle portion 15a of the heating side ejector 15, while the other refrigerant flows into the cooling side nozzle portion 20a of the cooling side ejector 20.

In this refrigerant circuit, the heating side ejector 15 and the cooling side ejector 20 are connected in parallel with respect to the refrigerant flow in the whole cycle, so that the exterior heat exchanger 17 connected to the heating side ejector 15 and the interior evaporator 23 connected to the cooling side ejector 20 are connected in parallel with respect to the refrigerant flow in the whole cycle.

The air conditioning controller with this refrigerant circuit structure determines the operating states of the respective various devices to be controlled based on the target air temperature TAO, the detection signals from the sensor group, and the like, in the same way as in the weak dehumidification-air heating mode.

The valve opening degree of the first flow rate adjustment valve 14a is determined such that the refrigerant evaporation temperature of the interior evaporator 23 is equal to or higher than the reference frost-formation preventing temperature (for example 1° C.) that can prevent the frost in the interior evaporator 23. The valve opening degree of the third flow rate adjustment valve 14c is determined such that the refrigerant evaporation temperature in the exterior heat exchanger 17 is an outside air temperature Tam or less (further, in this embodiment, 0° C. or less).

A general ejector draws the refrigerant from a refrigerant suction port by a suction effect of an injection refrigerant, thereby recovering the loss of the kinetic energy when the refrigerant is decompressed by a nozzle portion. The diffuser converts the recovered kinetic energy into pressure energy. Thus, the flow rate of refrigerant flowing into the nozzle portion is increased to thereby increase the amount of recovered energy, which can increase the pressure increasing amount by the diffuser.

In this embodiment, the valve opening degree of the first flow rate adjustment valve 14a is changed to thereby change a ratio of the flow rate of the refrigerant flowing from the first three-way joint 13a into the heating side nozzle portion 15a of the heating side ejector 15 to that of the refrigerant flowing from the first three-way joint 13a into the cooling side nozzle portion 20a of the cooling side ejector 20, thus adjusting the refrigerant evaporation temperature in the interior evaporator 23.

More specifically, for example, when the evaporation temperature Tefin is equal to or lower than the reference frost-formation preventing temperature, the valve opening degree of the first flow rate adjustment valve 14a is increased, thereby increasing the flow rate of the refrigerant flowing into the heating side nozzle portion 15a. Thus, the pressure increasing amount in the heating side diffuser 15g is increased to raise the refrigerant evaporation pressure (refrigerant evaporation temperature) of the interior evaporator 23.

Figure 7:
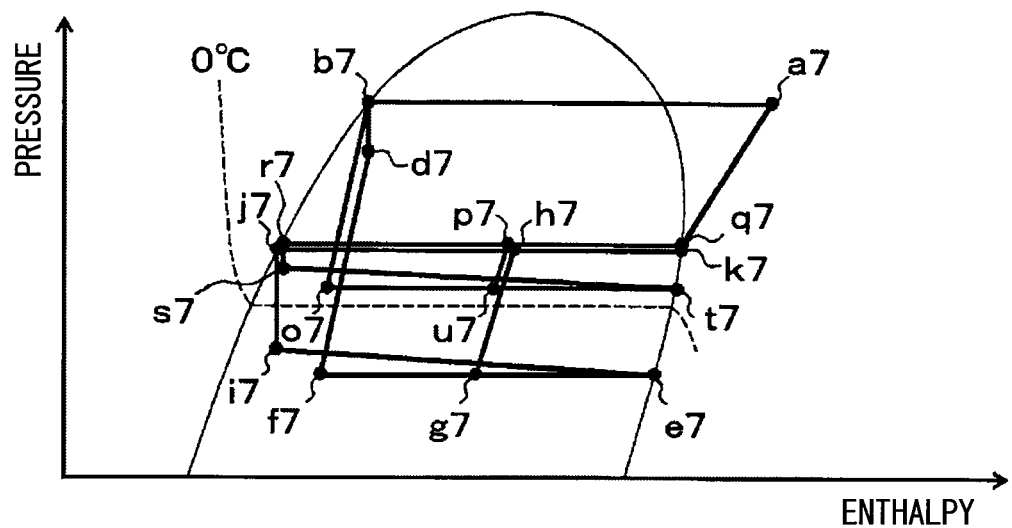
FIG. 7 is a Mollier chart showing the state of refrigerant in the dehumidification-air heating mode of the refrigeration cycle device in the first embodiment.

Therefore, in the refrigeration cycle device 10 in the dehumidification-air heating mode, as shown in the Mollier chart of FIG. 7, the high-pressure refrigerant (as indicated by a point a7 in FIG. 7) discharged from the compressor 11 flows into the interior condenser 12, and then cooled by the interior evaporator 23 to exchange heat with the air dehumidified, thereby dissipating heat therefrom (as indicated from the point a7 to a point b7 in FIG. 7). Thus, the air is heated. The flow of the refrigerant flowing out of the interior condenser 12 is branched by the first three-way joint 13a because the second opening/closing valve 18b is opened.

One of the refrigerants branched by the first three-way joint 13a flows into the first flow rate adjustment valve 14a via the second three-way joint 13b to be isentropically expanded (as indicated from the point b7 to a point d7 in FIG. 7). The refrigerant decompressed by the first flow rate adjustment valve 14a flows into the heating side nozzle portion 15a of the heating side ejector 15. The refrigerant flowing into the heating side nozzle portion 15a is isentropically decompressed and injected (as indicated from the point d7 to a point f7 in FIG. 7).

By the suction effect of the injection refrigerant, the refrigerant flowing out of the exterior heat exchanger 17 is drawn into the heating side refrigerant suction port 15d of the heating side ejector 15 via the third three-way joint 13c and the first opening/closing valve 18a. The injection refrigerant injected from the heating side nozzle portion 15a and the suction refrigerant drawn from the heating side refrigerant suction port 15d flow into the heating side diffuser 15g (as indicated from a point e7 to a point g7, and from the point f7 to the point g7 in FIG. 7, respectively).

The heating side diffuser 15g converts the velocity energy of the refrigerant into the pressure energy thereof by increasing the refrigerant passage area. Thus, the pressure of the mixed refrigerant including the injection refrigerant and the suction refrigerant rises (as indicated from the point g7 to a point h7 in FIG. 7). The refrigerant flowing out of the heating side diffuser 15g flows into the accumulator 16 to be separated into gas and liquid phases (as indicated from the point h7 to a point k7, and from the point h7 to a point j7 in FIG. 7, respectively).

The liquid-phase refrigerant separated by the accumulator 16 is isentropically decompressed by the third flow rate adjustment valve 14c in the throttled state (as indicated from the point j7 to a point i7 in FIG. 7). At this time, the third flow rate adjustment valve 14c decompresses the refrigerant until the refrigerant evaporation temperature in the exterior heat exchanger 17 is equal to or less than the outside air temperature Tam (further, 0° C. or less in this embodiment).

The refrigerant decompressed by the third flow rate adjustment valve 14c flows from the other of the refrigerant inflow and outflow ports of the exterior heat exchanger 17, and absorbs heat from the outside air blown from the blower fan to evaporate itself (as indicated from the point i7 to the point e7 in FIG. 7). That is, the flow direction of the refrigerant in the exterior heat exchanger 17 in the dehumidification-air heating mode is reversed to the flow direction of the refrigerant in the air cooling mode and the weak dehumidification-air heating mode.

Since the second flow rate adjustment valve 14b is completely closed, the refrigerant flowing out of one of the refrigerant inflow and outflow ports of the exterior heat exchanger 17 is drawn from the heating side refrigerant suction port 15d of the heating side ejector 15 via the third three-way joint 13c and the first opening/closing valve 18a. The gas-phase refrigerant separated by the accumulator 16 (as indicated by the point k7 in FIG. 7) is drawn into the compression 11 via the third opening/closing valve 18c.

The other refrigerant branched by the first three-way joint 13a flows into the cooling side nozzle portion 20a of the cooling side ejector 20 via the second opening/closing valve 18b, the fourth three-way joint 13d, and the fourth flow rate adjustment valve 14d. The refrigerant flowing into the cooling side nozzle portion 20a of the cooling side ejector 20 is isentropically decompressed and injected (as indicated from the point b7 to a point o7 in FIG. 7). The operations following this step will be the same as those in the air cooling mode and in the weak dehumidification-air heating mode.

In the dehumidification-air heating mode, since the third opening/closing valve 18c is opened, the gas-phase refrigerant flowing out of the cooling side gas-liquid separator 21 (as indicated by a point q7 in FIG. 7) and the gas-phase refrigerant flowing out of the accumulator 16 (as indicated by a point k7 in FIG. 7) are merged at the fifth three-way joint 13e to be drawn into the compressor 11.

Thus, in the dehumidification-air heating mode, like the weak dehumidification-air heating mode, the air cooled and dehumidified by the interior evaporator 23 can be re-heated by the interior condenser 12 and blown into the vehicle interior to thereby perform the dehumidification and air-heating of the vehicle interior.

Note that in the dehumidification-air heating mode, the exterior heat exchanger 17 and the interior evaporator 23 are connected in parallel with respect to the refrigerant flow as the whole cycle, and the exterior heat exchanger 17 serves as the evaporator. Thus, the air can be heated by using heat absorbed from the outside air as the heat source, so that the amount of heat dissipation in the interior condenser 12 is increased to improve the heating capacity of air in the interior condenser 12, as compared to the weak dehumidification-air heating mode.

(d) Air Heating Mode

In the air heating mode, the air conditioning controller puts the first flow rate adjustment valve 14a into the throttled state, completely closes the second flow rate adjustment valve 14b, puts the third flow rate adjustment valve 14c into the throttled state, and completely closes the fourth flow rate adjustment valve 14d. Further, the air conditioning controller opens the first opening/closing valve 18a, closes the second opening/closing valve 18b, and opens the third opening/closing valve 18c.

Thus, in the air heating mode, the ejector refrigeration cycle is configured as indicated by solid arrows in FIG. 3. Specifically, the refrigerant circulates through the compressor 11, the interior condenser 12, the first flow rate adjustment valve 14a, the heating side ejector 15, the accumulator 16, (the third opening/closing valve 18c), and the compressor 11 in this order, while the refrigerant circulates through the accumulator 16, the third flow rate adjustment valve 14c, the exterior heat exchanger 17, (the first opening/closing valve 18a), and the heating side refrigerant suction port 15d of the heating side ejector 15 in this order.

The air heating mode includes a normal operation in which the air is heated while exhibiting the high COP in the cycle, and a high heating-capacity operation in which the air is heated while exhibiting the high heating capacity Qc in the cycle.

First, the normal operation will be described below. During the normal operation in the air heating mode, the air conditioning controller with the refrigerant circuit structure shown in FIG. 3 determines the operation states of the respective various devices to be controlled based on the target air temperature TAO, the detection signals from the sensor group, and the like. For example, the refrigerant discharge capacity of the compressor 11 is determined in the following way. First, a target condenser temperature TCO of the interior condenser 12 is determined based on the target air temperature TAO with reference to the control map pre-stored in the air conditioning controller.

Then, the control signal output to the electric motor of the compressor 11 is determined such that the discharge refrigerant temperature Td approaches the target condenser temperature TCO using the feedback control method based on a deviation between the target condenser temperature TCO and the discharge refrigerant temperature Td detected by the discharge temperature sensor.

The control signal output to the electric actuator for driving the air mix door 34 is determined such that the whole air having passed through the interior evaporator 23 flows through the air passage on the side of the interior condenser 12.

The control signal output to the first flow rate adjustment valve 14a is determined such that the supercool degree of the refrigerant flowing into the first flow rate adjustment valve 14a approaches a target supercool degree that is previously determined so as to substantially maximize a COP. The valve opening degree of the third flow rate adjustment valve 14c is determined such that the refrigerant evaporation temperature in the exterior heat exchanger 17 is the outside air temperature Tam or less.

Figure 8:
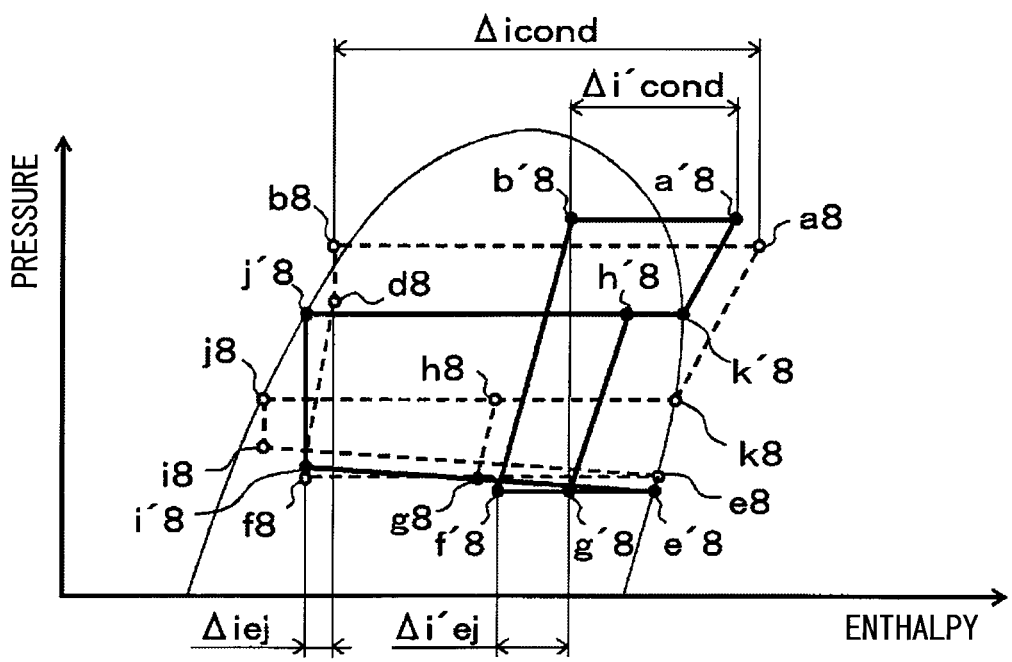
FIG. 8 is a Mollier chart showing the state of refrigerant in the air heating mode of the refrigeration cycle device in the first embodiment.

Therefore, in the refrigeration cycle device 10 in the air heating mode, as indicated by dashed lines in the Mollier chart of FIG. 8, the high-pressure refrigerant (as indicated by a point a8 in FIG. 8) discharged from the compressor 11 flows into the interior condenser 12, and exchanges heat with the air to dissipate heat (as indicated from the point a8 to a point b8 in FIG. 8). Thus, the air is heated. Since the second flow rate adjustment valve 14b is completely closed and the second opening/closing valve 18b is closed, the refrigerant flowing out of the interior condenser 12 flows into the first flow rate adjustment valve 14a.

The refrigerant flowing into the first flow rate adjustment valve 14a is isentropically decompressed and expanded (as indicated from the point b8 to a point d8 in FIG. 8). At this time, the valve opening degree of the first flow rate adjustment valve 14a is adjusted such that the supercool degree of the refrigerant flowing into the first flow rate adjustment valve 14a approaches a target supercool degree. The refrigerant decompressed by the first flow rate adjustment valve 14a flows into the heating side nozzle portion 15a of the heating side ejector 15, and is isentropically decompressed and injected (as indicated from the point d8 to a point f8 in FIG. 8).

The operations following this step will be the same as those on the side of the heating side ejector 15 in the dehumidification-air heating mode. That is, the liquid-phase refrigerant separated by the accumulator 16 is decompressed by the third flow rate adjustment valve 14c. The refrigerant decompressed by the third flow rate adjustment valve 14c absorbs heat from outside air in the exterior heat exchanger 17 to evaporate itself. The refrigerant flowing out of one of the refrigerant inflow and outflow ports of the exterior heat exchanger 17 is drawn from the heating side refrigerant suction port 15d of the heating side ejector (as indicated from the point h8 to a point j8, a point i8, a point e8, and a point g8 in FIG. 8).

The gas-phase refrigerant separated by the accumulator 16 is drawn into the compressor 11 via the third opening/closing valve 18c and the fifth three-way joint 13e, and then compressed again (as indicated from a point k8 to the point a8 in FIG. 8). In the air heating mode, the fourth flow rate adjustment valve 14d is completely closed, and the second opening/closing valve 18b is closed. Thus, the refrigerant does not flow into the side of the cooling side ejector 20, and the gas-phase refrigerant flowing out of the cooling side gas-liquid separator 21 is not drawn into the compressor 11.

Thus, during the normal operation in the air heating mode, the air heated by the interior condenser 12 is blown into the vehicle interior, thereby enabling the air heating of the vehicle interior. Further, in the normal operation, the air conditioning controller can adjust the valve opening degree of the first flow rate adjustment valve 14a, thereby improving the COP.

Next, the high heating-capacity operation will be described. The high heating-capacity operation is performed, for example, at a low outside air temperature or the like, that is, when a difference in temperature obtained by subtracting the inside air temperature Tr from the vehicle interior preset temperature Tset is larger than a reference temperature difference (for example, the temperature difference is 20° C. or more) or the like. In this case, the high heating-capacity operation is performed in such a manner that the refrigeration cycle device 10 exhibits the high heating capacity (air heating capacity) Qc whereby the inside air temperature Tr quickly approaches the vehicle interior preset temperature Tset.

The heating capacity Qc is defined by the above-mentioned formula F1. During the high heating-capacity operation, the air conditioning controller adjusts the valve opening degree of the first flow rate adjustment valve 14a such that the heating capacity Qc approaches the maximum value (peak value).

More specifically, the air conditioning controller adjusts the valve opening degree of the first flow rate adjustment valve 14a based on the refrigerant discharge capacity of the compressor 11 (for example, control signal output to the electric motor of the compressor 11) with reference to a control map previously stored in the air conditioning controller such that the dryness x of the refrigerant flowing into the heating side nozzle portion 15a satisfies the above-mentioned formula F2. Thus, during the high heating-capacity operation, the first flow rate adjustment valve 14a serves as a dryness adjustment portion for adjusting the dryness x of the refrigerant flowing into the heating side nozzle portion 15a.

Thus, during the high heating-capacity operation, the state of the refrigerant changes as illustrated by thick solid lines in a Mollier chart of FIG. 8. That is, as compared to in the normal operation, a difference $\Delta i cond$ in enthalpy is reduced to $\Delta i' cond$. On the other hand, an adiabatic heat drop $\Delta i ej$ can be increased to $\Delta i' ej$ to thereby raise the pressure of refrigerant drawn by the compressor 11 from the point k8 to the point k'8 in FIG. 8. As a result, the flow rate Gr of the refrigerant is increased as compared to the normal operation, so that the heating capacity Qc can approach the maximum value.

Thus, during the high heating-capacity operation in the air heating mode, the air heated by the interior condenser 12 is blown into the vehicle interior, thereby enabling the air heating of the vehicle interior. Further, in the high heating-capacity operation, the air conditioning controller can exhibit the high heating capacity Qc by adjusting the valve opening degree of the first flow rate adjustment valve 14a.

In the high heating-capacity operation, the refrigerant discharge capacity of the compressor 11 is increased, and the valve opening degree of the first flow rate adjustment valve 14a is also increased in many cases, as compared to the normal operation. The Mollier chart indicated by thick solid lines in FIG. 8 shows the state of the refrigerant when the valve opening degree of the first flow rate adjustment valve 14a is fully opened during the high heating-capacity operation.

As described above, the vehicle air conditioner 1 can switch its operation among the air cooling mode, the air heating mode, the weak dehumidification-air heating mode, and the dehumidification-air heating mode, thereby achieving the appropriate air conditioning of the vehicle interior. Further, the refrigeration cycle device 10 can obtain the following excellent effects.

(A) In the refrigeration cycle device including the accumulator 16 serving as the liquid storage portion and disposed in the external space, a large difference between the outside air temperature and the temperature of refrigerant stored in the accumulator 16 might lead to transfer of heat between the refrigerant in the accumulator and the outside air.

For example, when the temperature of the refrigerant in the accumulator 16 is lower than the outside air temperature in the air cooling mode, which is to be performed at a relatively high outside air temperature, the refrigerant in the accumulator 16 might absorb heat from the outside air. Such heat absorption in the refrigerant from the outside air reduces the amount of heat absorption from the ventilation air, which might cause the reduction in cooling performance of the refrigeration cycle device 10.

Thus, the refrigeration cycle device, which includes the accumulator 16 serving as the liquid storage portion and disposed in the external space, needs to suppress the reduction in performance due to the unnecessary transfer of heat between the refrigerant in the accumulator 16 and the outside air.

In this embodiment, in the air cooling mode and weak dehumidification-air heating mode, the refrigerant flowing out of the exterior heat exchanger 17 flows into the accumulator 16, so that the temperature of the refrigerant in the accumulator 16 is set equal to the outside air temperature, thereby effectively suppress the unnecessary heat transfer between the refrigerant in the accumulator 16 and the outside air.

In the dehumidification-air heating mode or the air heating mode, which is to be performed at a relatively low outside air temperature, the refrigerant decompressed by the heating side ejector 15 flows into the accumulator 16, so that the difference in temperature between the refrigerant in the accumulator 16 and the outside air temperature can be reduced to suppress the unnecessary heat transfer between the refrigerant in the accumulator 16 and the outside air.

Therefore, the refrigeration cycle device 10 can suppress the increase in difference between the temperature of the refrigerant in the accumulator 16 disposed in the external space and the outside air temperature, thereby suppressing reduction in performance of the refrigeration cycle device 10 due to the unnecessary heat transfer between the refrigerant in the accumulator 16 and the outside air.

(B) Like the refrigerant circuit in the dehumidification-air heating mode, a refrigeration circuit structure is configured to include the exterior heat exchanger 17 and the interior evaporator 23, which serve as the evaporator for evaporating the refrigerant and which are connected in parallel with respect to the refrigerant flow. In the refrigeration circuit structure, once the refrigerant evaporation temperatures of both heat exchangers are equal to each other, the exterior heat exchanger 17 cannot absorb the sufficient heat, resulting in insufficient heating capacity of the air.

For example, the exterior heat exchanger 17 and the interior evaporator 23 are connected in parallel with respect to the refrigerant flow. When the refrigerant evaporation temperature in the interior evaporator 23 is adjusted to the temperature that can suppress the frost formation in the interior evaporator 23, the refrigerant evaporation temperature in the exterior heat exchanger 17 might also be adjusted to the substantially same temperature. Thus, a difference between the outside air temperature and the refrigerant evaporation temperature in the exterior heat exchanger 17 is reduced when the outside air temperature is low, so that the refrigerant cannot absorb the sufficient heat from the outside air in the exterior heat exchanger 17.

Thus, in the refrigeration cycle device having the refrigerant circuit structure with the exterior heat exchanger 17 and the interior evaporator 23, which serve as the evaporator and are connected in parallel, the amount of heat absorption in the refrigerant at the exterior heat exchanger 17 needs to be increased to sufficiently improve the heating capacity of the air in the dehumidification-air heating mode.

On the other hand, the dehumidification-air heating mode takes the refrigerant circuit structure in which the refrigerant outlet side of the exterior heat exchanger 17 communicates with the heating side refrigerant suction port 15d of the heating side ejector 15, while the refrigerant inlet side or refrigerant outlet side of the interior evaporator 23 communicates with the outlet side of the heating side diffuser 15g of the heating side ejector 15.

Therefore, in the dehumidification-air heating mode, the refrigerant evaporation pressure in the exterior heat exchanger 17 can approach the lowest refrigerant pressure obtained directly after the decompression by the heating side nozzle portion 15a, and the refrigerant evaporation pressure in the interior evaporator 23 can approach the refrigerant pressure pressurized by the heating side diffuser 15g.

That is, the refrigerant evaporation pressure in the exterior heat exchanger 17 can be set lower than that in the interior evaporator 23. Even though the refrigerant evaporation temperature in the interior evaporator 23 is adjusted to the temperature that can suppress the frost formation in the interior evaporator 23, the refrigerant evaporation temperature in the exterior heat exchanger 17 can be set lower than the outside air temperature.

As a result, in the dehumidification-air heating mode, the refrigerant can absorb sufficient heat from the outside air in the exterior heat exchanger 17, so that the heat can be adequately dissipated into the air by the interior condenser 12. That is, the heating capacity of the air in the dehumidification-air heating mode can be sufficiently improved.

(C) Like the refrigerant circuit in the air heating mode, a refrigeration circuit structure is configured to allow heat absorbed by the refrigerant from the outside air in the exterior heat exchanger 17 to be dissipated into the air in the interior condenser 12. In the refrigeration circuit structure, the refrigeration evaporation temperature in the exterior heat exchanger 17 has to be lowered as compared to the outside air temperature such that the refrigerant can surely absorb heat from the outside air in the exterior heat exchanger 17. Thus, in some cases, the refrigerant evaporation temperature (refrigerant evaporation pressure) in the exterior heat exchanger 17 has to be significantly reduced when the outside air temperature is low or the like.

The refrigerant to be applied to a general refrigeration cycle device has its density decreased with decreasing pressure. Once the refrigerant evaporation pressure of the exterior heat exchanger 17 is significantly decreased while the outside air temperature or the like is low, the density of the refrigerant drawn into the compressor 11 is reduced, so that the flow rate of the refrigerant discharged from the compressor 11 might be decreased.

As a result, the total amount of heat dissipated into air by the refrigerant in the interior condenser 12 is lacking as compared to the amount of heat required for air heating of the vehicle interior, which cannot sufficiently heat the air. Thus, in the air heating mode, the refrigeration cycle device that heats the air using heat absorbed in the refrigerant from the outside air in the exterior heat exchanger 17 as a heat source needs to sufficiently improve the heating capacity of the air in the air heating mode.

From this aspect, the air heating mode performs not only the normal operation for causing the cycle to exhibit the high COP, but also the high heating-capacity operation. The high heating-capacity operation involves maximizing the heating capacity Qc by adjusting the enthalpy of the refrigerant on the outlet side of the interior condenser 12 (the dryness x of the refrigerant flowing into the heating side nozzle portion 15a of the heating side ejector 15) at the low outside air temperature or the like. Therefore, the heating capacity of the air in the air heating mode can be sufficiently improved.

In the dehumidification-air heating mode and the air heating mode, the power consumption of the compressor 11 can be reduced by the pressurizing effect of the heating side ejector 15. Further, in the air cooling mode, the weak dehumidification-air heating mode, and the dehumidification-air heating mode, the cooling side ejector 20 is employed as the cooling side decompressor, so that the power consumption of the compressor 11 can be reduced by the pressurizing effect of the cooling side ejector.

That is, the refrigeration cycle device can improve the COP of the refrigeration cycle device 10 in any operation mode by the pressurizing effect of the heating side ejector 15 and the cooling side ejector 20.

In the high heating-capacity operation of the air heating mode, the dryness x of the refrigerant flowing into the heating side nozzle portion 15a is controlled to satisfy the above-mentioned formula F2, that is, to be not less than 0.5 nor more than 0.8.

Figure 29:
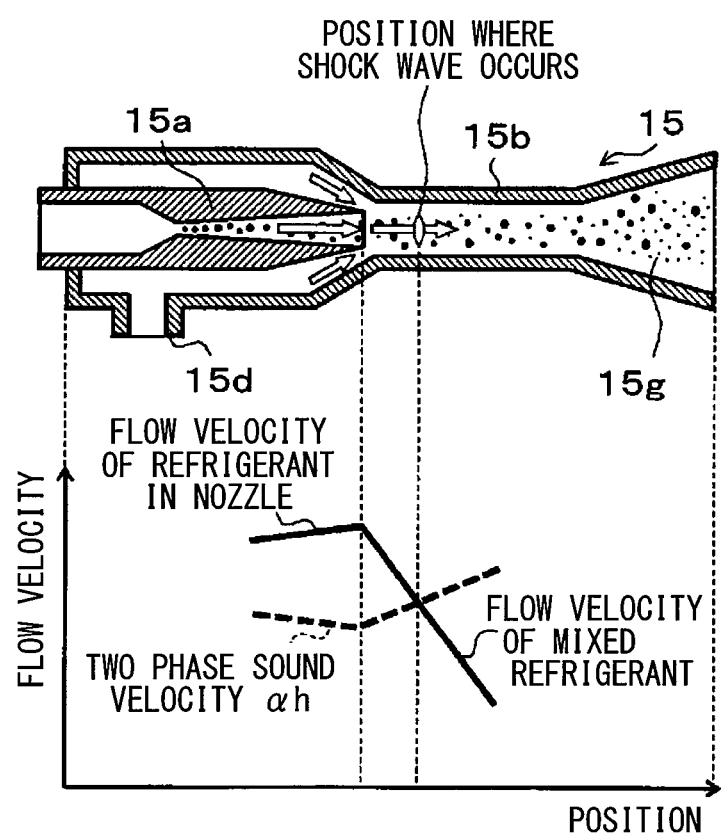
FIG. 29 is an explanatory diagram for explaining a position where a shock wave occurs within the ejector in an operation when the dryness of the refrigerant flowing into the nozzle portion becomes relatively high.

Thus, as described with reference to FIG. 29, the position in which the flow velocity of the two-phase refrigerant in the heating side ejector 15 is lower than the two phase sound velocity $\alpha h$ (the position in which the shock wave occurs when the flow velocity of the two-phase refrigerant changes from the supersonic velocity state to the subsonic velocity state) tends to be shifted to the inside of the heating side diffuser 15g as compared to the normal operation in the air heating mode.

When the position of occurrence of the shock wave is shifted to the inside of the heating side diffuser 15g, the flow velocity of the refrigerant flowing through the heating side diffuser 15g might become unstable due to the action of the shock wave. Thus, the pressure increasing performance of the heating side diffuser 15g might also become unstable.

In contrast, in the heating side ejector 15, the flow velocity of the mixed refrigerant including the injection refrigerant and the suction refrigerant is gradually decelerated in the mixing portion 15e, and the flow velocity of the mixed refrigerant can be lower than the two phase sound velocity $\alpha h$ until the mixed refrigerant reaches the inlet 15h of the heating side diffuser 15g.

Figure 9:
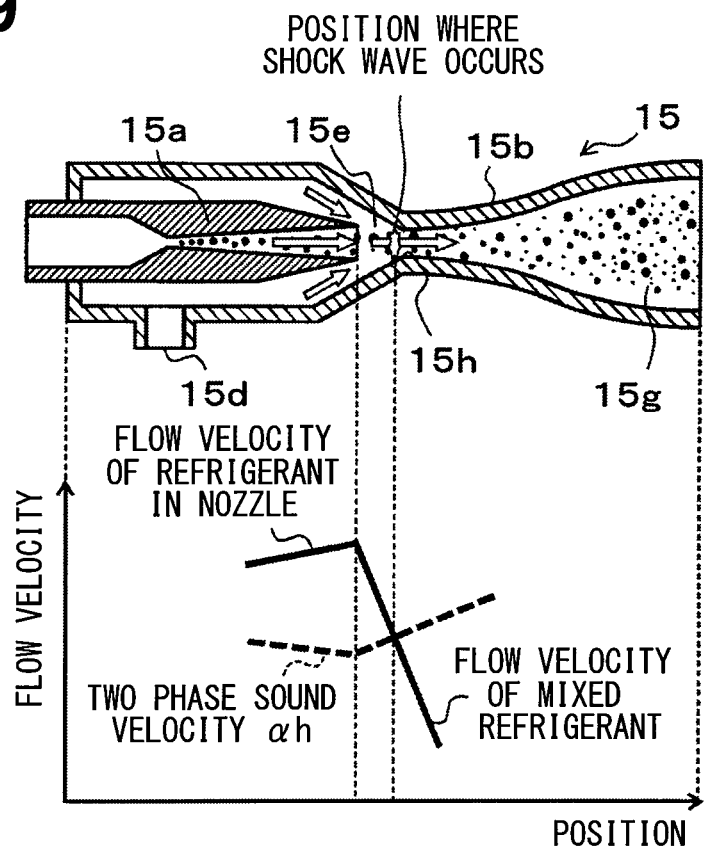
FIG. 9 is an explanatory diagram for explaining a position where a shock wave occurs inside the heating side ejector.

Thus, as shown in FIG. 9, the shock wave due to the change of the flow velocity of the two-phase refrigerant from the ultrasonic state to the subsonic state can be generated within the mixing portion 15e without being caused within the heating side diffuser 15g.

As a result, the pressure increasing performance of the heating side diffuser 15g can be preventing from becoming unstable. FIG. 9 corresponds to FIGS. 28 and 29.

In order to obtain such a pressure increasing performance stabilizing effect, the flow velocity of refrigerant reaching the inlet 15h has only to be set to the two phase sound velocity $\alpha h$ or less.

When the flow velocity of the two-phase refrigerant becomes the two phase sound velocity $\alpha h$, a slip ratio (that is, a ratio of the flow velocity of the gas-phase refrigerant to that of the liquid-phase refrigerant) is 1. Thus, in the heating side ejector 15, the flow velocity of the liquid-phase refrigerant is identical to the flow velocity of the gas-phase refrigerant in the mixed refrigerant within the mixing portion 15e, so that the mixed refrigerant can be brought into the two-phase state with the liquid-phase refrigerant and the gas-phase refrigerant homogeneously mixed therein.

Thus, the mixed refrigerant can be prevented from flowing into the heating side diffuser 15g with some velocity distribution. Immediately after the mixed refrigerant flows into the heating side diffuser 15g, the velocity energy of the refrigerant can be effectively converted to the pressure energy thereof. As a result, the pressure increasing performance of the heating side diffuser 15g can be improved.

(Second Embodiment)

Figure 10:
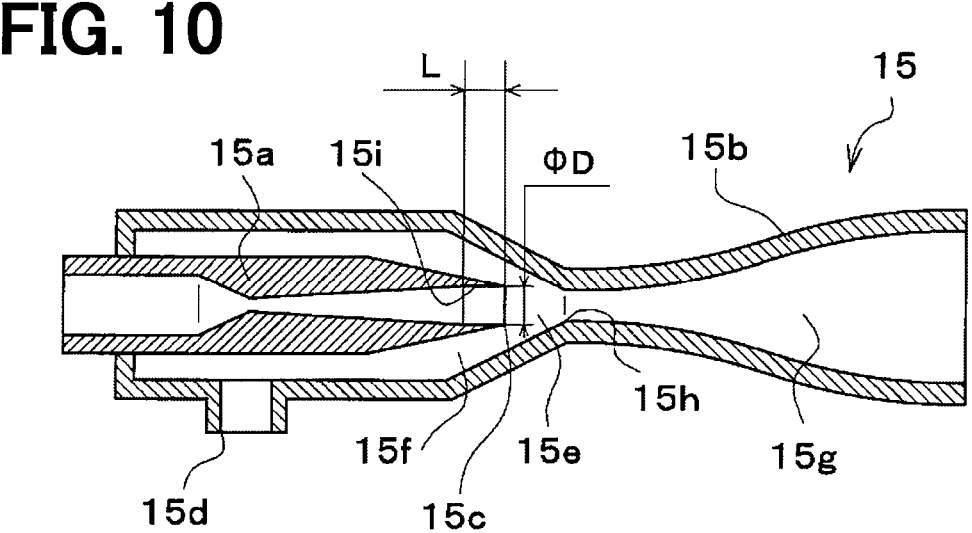
FIG. 10 is a cross-sectional view in an axial direction of the heating side ejector in a second embodiment.

In this embodiment, as shown in FIG. 10, the structure of the heating side ejector 15 is changed by way of example, as compared to the first embodiment. Specifically, the heating side ejector 15 includes a straight portion 15i having a certain refrigerant passage area on a side of a refrigerant injection port 15c located on the most downstream side in the refrigerant passage formed in a heating side nozzle portion 15a. Referring to FIG. 10, the same or equivalent parts as those described in the first embodiment are designated by the same reference numerals. The same goes for the following figures.

A length L in the refrigerant flow direction of a part provided with the straight portion 15i is equal to an equivalent diameter $\phi D$ of the refrigerant injection port 15c. The term "equivalent diameter $\phi D$ of the refrigerant injection port 15c" as used herein means a diameter of the refrigerant injection port 15c determined by converting its passage cross-sectional shape into a circle. The structures and operations of other components of the refrigeration cycle device 10 and the heating side ejector 15 are the same as those of the first embodiment.

Thus, the refrigeration cycle device 10 and the heating side ejector 15 can also obtain the same effects as those of the first embodiment. Since the straight portion 15i is provided in the heating side nozzle portion 15a, the heating side ejector 15 can suppress the reduction in pressure increasing performance of the heating side diffuser 15g due to the overexpansion of refrigerant in the heating side nozzle portion 15a in the dehumidification-air heating mode.

More specifically, the high heating-capacity operation in the air heating mode involves operating the refrigeration cycle device 10 in such a manner that the heating capacity Qc approaches the maximum value. Thus, the high heating-capacity operation can increase the valve opening degree of the first flow rate adjustment valve 14a, and can also increase the refrigerant discharge capacity of the compressor 11, as compared to the dehumidification-air heating mode. Further, in the dehumidification-air heating mode, the refrigerant is supplied not only to the heating side ejector 15, but also the cooling side ejector 20.

Thus, in the high heating-capacity operation, the flow rate of refrigerant flowing into the heating side nozzle portion 15a becomes more than that in the dehumidification-air heating mode. Further, in the high heating-capacity operation, the dryness x of the refrigerant flowing into the heating side nozzle portion 15a becomes higher than that in the dehumidification-air heating mode. As a result, the density of the refrigerant injected from the refrigerant injection port 15c of the heating side nozzle portion 15a in the high heating-capacity operation tends to be lower than that in the dehumidification-air heating mode.

Thus, when the refrigerant passage shape of the heating side nozzle portion 15a is determined according to the change in density of the refrigerant in the high heating-capacity operation, the refrigerant passage area on the most downstream side of the heating side nozzle portion 15a might be unnecessarily expanded in the dehumidification-air heating mode, which tends to cause the overexpansion of the refrigerant. Such overexpansion generates the so-called oblique shock wave to decrease the flow velocity of the injection refrigerant injected from the refrigerant injection port 15c of the heating side nozzle portion 15a.

The reason for this is that the occurrence of the oblique shock wave due to the overexpansion takes the refrigerant away from the wall surface of the refrigerant passage in the heating side nozzle portion 15a, which leads to a substantial decrease in refrigerant passage area of a divergent part of the heating side nozzle portion 15a forming a Laval nozzle portion. Further, when the flow velocity of the injection refrigerant is decreased, the kinetic energy to be converted into the pressure energy by the heating side diffuser 15g is reduced, resulting in a decrease in the pressure increasing amount of the heating side diffuser 15g.

In contrast, the heating side ejector 15 includes the straight portion 15i on the most downstream side of the refrigerant passage in the heating side nozzle portion 15a, which can suppress the overexpansion of the refrigerant to prevent the occurrence of the oblique shock wave. Thus, this embodiment can prevent the refrigerant from departing from the refrigerant passage wall surface of the heating side nozzle portion 15a due to the oblique shock wave, thereby suppressing the decrease in the pressure increasing amount of the heating side diffuser 15g.

The studies of the inventors of the present disclosure have shown that the length L in the refrigerant flow direction of the part with the straight portion 15i is set equal to the equivalent diameter $\phi D$ of the refrigerant injection port 15c, so that the refrigeration cycle device can sufficiently obtain the effect of suppressing the decrease in the pressure increasing amount of the heating side diffuser 15g without inhibiting the appropriate acceleration of the refrigerant in the heating side nozzle portion 15a.

(Third Embodiment)

Figure 11:
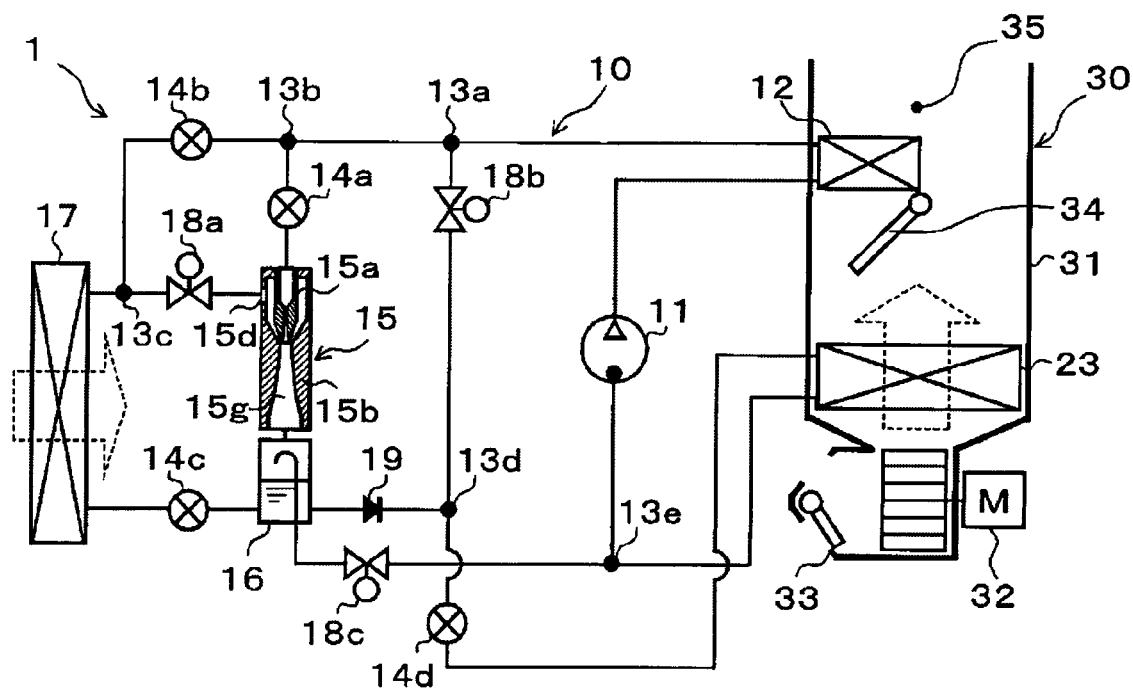
FIG. 11 is an entire configuration diagram of a refrigeration cycle device according to a third embodiment of the invention.

In this embodiment, as shown in the entire configuration diagram of FIG. 11, the cooling side ejector 20, cooling side gas-liquid separator 21, and fixed throttle 22 of the refrigeration cycle device 10 are removed from the structure of the first embodiment. On the other hand, the outlet side of the fourth flow rate adjustment valve 14d is connected to the refrigerant inlet side of the interior evaporator 23, and the refrigerant outlet side of the interior evaporator 23 is connected to the fifth three-way joint 13e by way of example, which will be described below.

That is, in the refrigeration cycle device 10, the fourth flow rate adjustment valve 14d configures the cooling side decompressor. The structures of other components of the refrigeration cycle device 10 except for the above points are the same as those of the first embodiment. Now, the operation of the above-mentioned structure will be described. In this embodiment, like the first embodiment, switching is performed among the respective operation modes.

(a) Air Cooling Mode

In the air cooling mode, the air conditioning controller completely closes the first flow rate adjustment valve 14a, fully opens the second flow rate adjustment valve 14b, fully opens the third flow rate adjustment valve 14c, and puts the fourth flow rate adjustment valve 14d into the throttled state. Further, the air conditioning controller closes the first opening/closing valve 18a, closes the second opening/closing valve 18b, and closes the third opening/closing valve 18c.

Thus, in the air cooling mode, the normal ejector refrigeration cycle is configured such that the refrigerant circulates through the compressor 11, the interior condenser 12, (the second flow rate adjustment valve 14b), the exterior heat exchanger 17, (the third flow rate adjustment valve 14c), the accumulator 16, (the check valve 19), the fourth flow rate adjustment valve 14d, the interior evaporator 23, and the compressor 11 in this order.

The valve opening degree of the fourth flow rate adjustment valve 14d in the air cooling mode is determined such that the superheat degree of the refrigerant flowing out of the interior evaporator 23 is within a predetermined range. The operations except for those described above are the same as those in the air cooling mode of the first embodiment. Thus, in the air cooling mode, the air cooled by the interior evaporator 23 is blown into the vehicle interior, thereby enabling the air cooling of the vehicle interior.

(b) Weak Dehumidification-air Heating Mode

In the weak dehumidification-air heating mode, the air conditioning controller completely closes the first flow rate adjustment valve 14a, puts the second flow rate adjustment valve 14b into the throttled state, fully opens the third flow rate adjustment valve 14c, and puts the fourth flow rate adjustment valve 14d into the throttled state. Further, the air conditioning controller closes the first opening/closing valve 18a, closes the second opening/closing valve 18b, and closes the third opening/closing valve 18c. Thus, in the weak dehumidification-air heating mode, the normal refrigeration cycle is configured to allow the refrigerant to circulate therethrough in the same order as in the air cooling mode.

The valve opening degree of the fourth flow rate adjustment valve 14d in the weak dehumidification-air heating mode is determined in the same manner as in the air cooling mode. The operations except for those described above are the same as those in the weak dehumidification-air heating mode of the first embodiment. Thus, in the weak dehumidification-air heating mode, the air cooled by the interior evaporator 23 is heated again in the interior condenser 12 and blown into the vehicle interior to achieve the dehumidification-air heating of the vehicle interior.

(c) Dehumidification-air Heating Mode

In the dehumidification-air heating mode, the air conditioning controller puts the first flow rate adjustment valve 14a into the throttled state, completely closes the second flow rate adjustment valve 14b, puts the third flow rate adjustment valve 14c into the throttled state, and puts the fourth flow rate adjustment valve 14d into the throttled state. Further, the air conditioning controller opens the first opening/closing valve 18a, opens the second opening/closing valve 18b, and opens the third opening/closing valve 18c.

Thus, in the dehumidification-air heating mode, the ejector refrigeration cycle is configured such that the refrigerant circulates through the compressor 11, the interior condenser 12, the first flow rate adjustment valve 14a, the heating side ejector 15, the accumulator 16, (the third opening/closing valve 18c), and the compressor 11 in this order, while the refrigerant circulates through the accumulator 16, the third flow rate adjustment valve 14c, the exterior heat exchanger 17, (the first opening/closing valve 18a), and the heating side refrigerant suction port 15d of the heating side ejector 15 in this order.

Simultaneously, the normal refrigeration cycle is configured such that the refrigerant circulates through the compressor 11, the interior condenser 12, (the second opening/closing valve 18b), the fourth flow rate adjustment valve 14d, the interior evaporator 23, and the compressor 11 in this order.

The valve opening degree of the fourth flow rate adjustment valve 14d in the dehumidification-air heating mode is determined in the same manner as in the air cooling mode. The other operations except for those described above are the same as those in the dehumidification-air heating mode of the first embodiment. Thus, in the dehumidification-air heating mode, the air cooled by the interior evaporator 23 is heated again in the interior condenser 12 and blown into the vehicle interior to enable the dehumidification-air heating of the vehicle interior.

(d) Air Heating Mode

In the air heating mode, the air conditioning controller puts the first flow rate adjustment valve 14a into the throttled state, completely closes the second flow rate adjustment valve 14b, puts the third flow rate adjustment valve 14c into the throttled state, and completely closes the fourth flow rate adjustment valve 14d. Further, the air conditioning controller opens the first opening/closing valve 18a, closes the second opening/closing valve 18b, and opens the third opening/closing valve 18c. Thus, in the air heating mode, the same ejector refrigeration cycle as that of the first embodiment is configured, so that the air heating of the vehicle interior can be performed in the same way as the first embodiment.

As mentioned above, the vehicle air conditioner 1 can achieve the appropriate air conditioning of the vehicle interior in the same way as the first embodiment. The refrigeration cycle device 10 can obtain the excellent effects described in the paragraphs (A) to (C) of the first embodiment. The structure of the refrigeration cycle device 10 can also obtain the pressure increasing performance stabilizing effect and the pressure increasing performance improving effect of the heating side ejector 15 during the high heating-capacity operation in the air heating mode, like the first embodiment.

(Fourth Embodiment)

Figure 12:
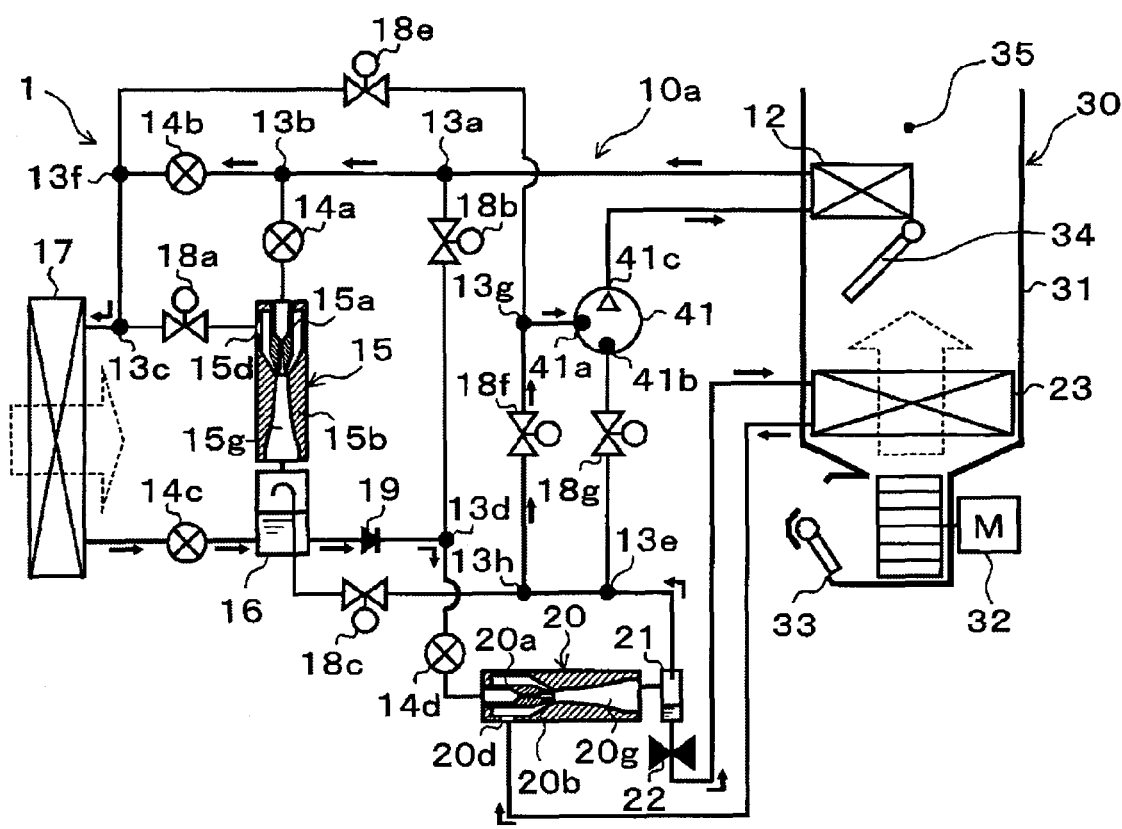
FIG. 12 is an entire configuration diagram showing a refrigerant circuit in an air cooling mode and a weak dehumidification-air heating mode of a refrigeration cycle device according to a fourth embodiment.
Figure 13:
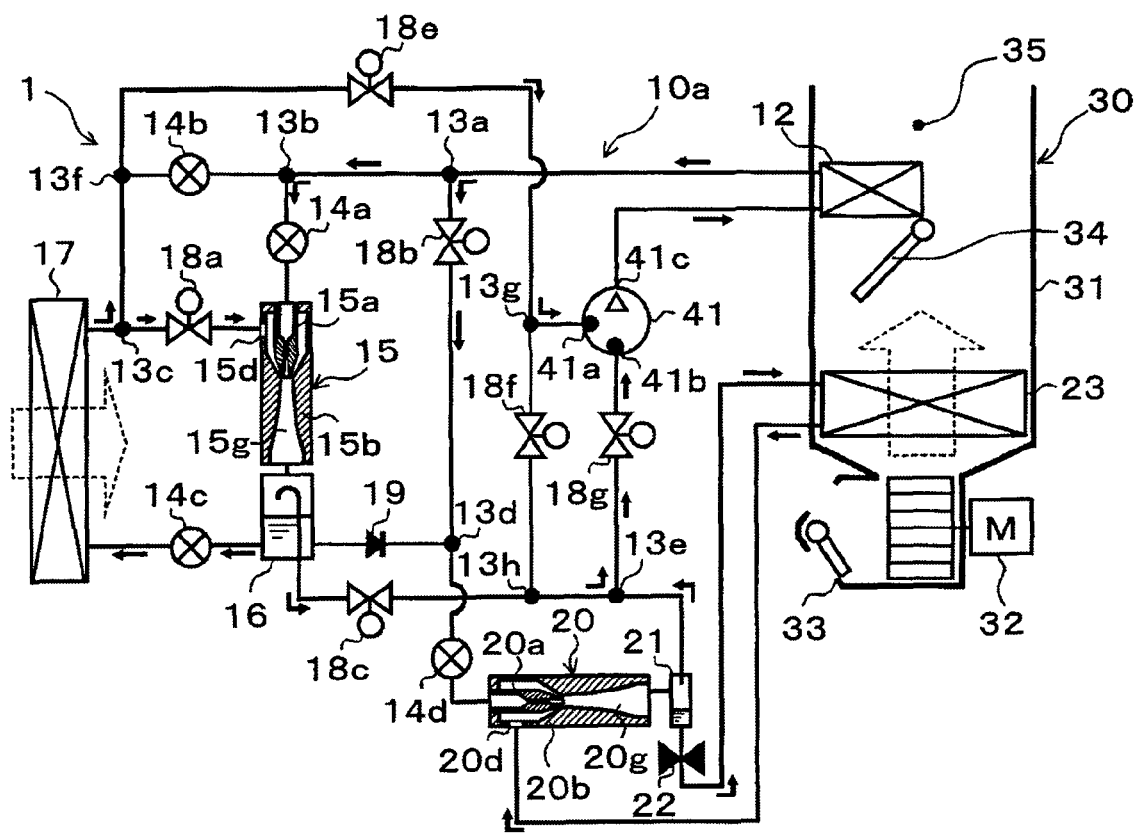
FIG. 13 is an entire configuration diagram showing a refrigerant circuit in a dehumidification-air heating mode of the refrigeration cycle device in the fourth embodiment.
Figure 14:
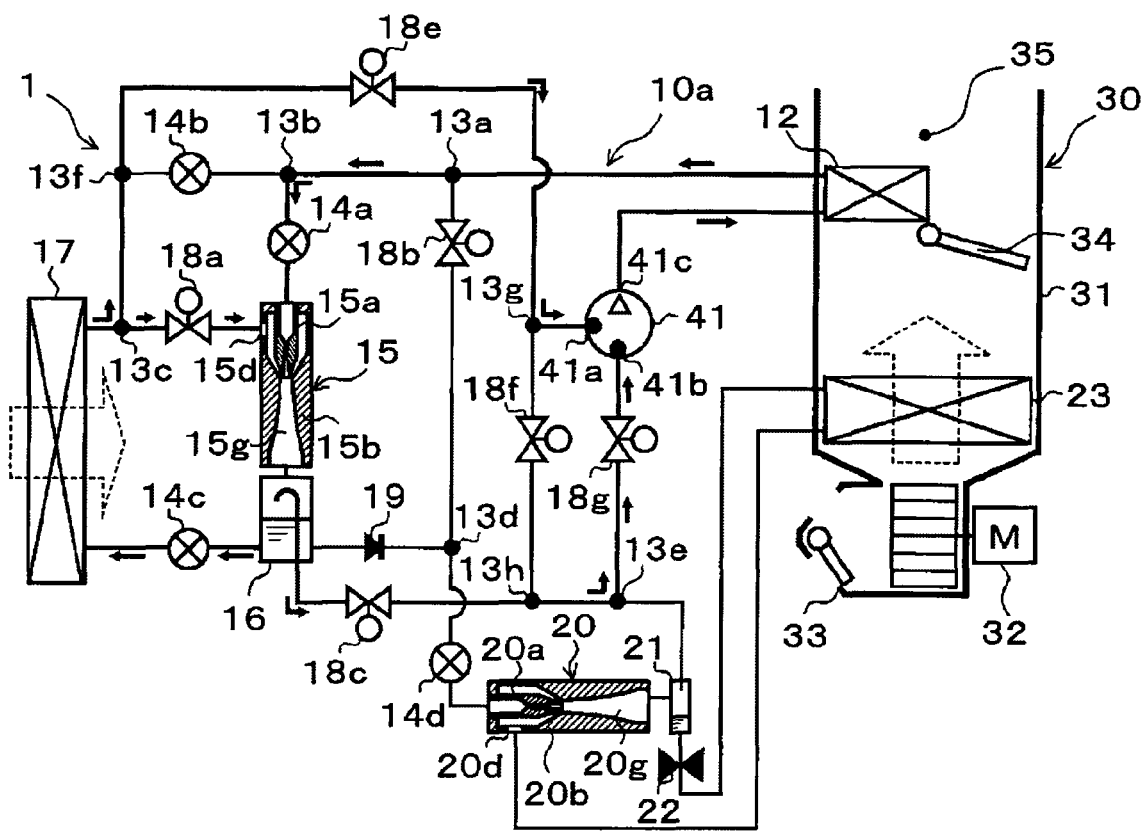
FIG. 14 is an entire configuration diagram showing a refrigerant circuit in an air heating mode of the refrigeration cycle device in the fourth embodiment.

This embodiment employs a two-stage pressurizing compressor 41 to constitute the refrigeration cycle device 10a by way of example. The refrigeration cycle device 10a is also configured to being capable of switch among refrigerant circuits in the air cooling mode and the weak dehumidification-air heating mode (see FIG. 12), a refrigerant circuit in the dehumidification-air heating mode (see FIG. 13), and a refrigerant circuit in the air heating mode (see FIG. 14). FIGS. 12 and 14 show the flows of the refrigerant in the respective operation modes by solid arrows.

More specifically, the compressor 41 is configured as the two-stage pressurizing electric compressor that accommodates in a housing forming an outer envelope, two compression mechanisms including a low-stage side compression mechanism and a high-stage side compression mechanism, each being formed of a fixed displacement compression mechanism, and an electric motor rotatably driving both the compression mechanisms.

The housing of the compressor 41 includes a suction port 41a, an intermediate pressure port 41b, and a discharge port 41c. The suction port 41a draws a low-pressure refrigerant from the outside of the housing into the low-stage side compression mechanism. The intermediate pressure port 41b allows the intermediate-pressure refrigerant within the cycle to flow into the housing, and to be merged with refrigerant being compressed from a low to high pressure. The discharge port 41c discharges the high-pressure refrigerant discharged from the high-stage side compression mechanism toward the outside of the housing.

Although this embodiment employs the compressor 41 accommodating the two compression mechanisms in one housing, the form of the compressor is not limited thereto. That is, as long as the intermediate-pressure refrigerant can flow from the intermediate pressure port 41b to be merged with the refrigerant being compressed from a low pressure to a high pressure, the compressor may be an electric compressor that accommodates within a housing, one fixed displacement compression mechanism, and an electric motor for rotatably driving the compression mechanism.

Alternatively, one two-stage pressurizing compressor 41 formed of both a low-stage side compressor and a high-stage side compressor may be used. In the one two-stage pressurizing compressor, the two compressors are connected in series. A suction port of the low-stage side compressor placed on a low-stage side is defined as the suction port 41a. A discharge port of the high-stage side compressor placed on a high-stage side is defined as the discharge port 41c. A connection portion for connecting a discharge port of the low-stage side compressor with a suction port of the high-stage side compressor includes the intermediate pressure port 41b.

In the refrigeration cycle device 10a, the sixth three-way joint 13f is connected to a refrigerant passage for connecting the second flow rate adjustment valve 14b to the third three-way joint 13c. The sixth three-way joint 13f is connected to the eighth three-way joint 13h via a fifth opening/closing valve 18e, the seventh three-way joint 13g, and the sixth opening/closing valve 18f. The eighth three-way joint 13h is disposed in a refrigerant passage leading from the third opening/closing valve 18c to the fifth three-way joint 13e.

The seventh three-way joint 13g is connected to the suction port 41a of the compressor 41. The fifth three-way joint 13e is connected to the intermediate pressure port 41b of the compressor 41 via a seventh opening/closing valve 18g. The fifth to seventh opening/closing valves 18e to 18g have the same basic structures as those of the first to third opening/closing valves 18a to 18c. The structures of other components of the refrigeration cycle device 10a except for the above points are the same as those of the refrigeration cycle device 10a in the first embodiment.

Now, the operation of the above-mentioned structure will be described. In this embodiment, like the first embodiment, switching is performed among the respective operation modes.

(a) Air Cooling Mode

In the air cooling mode, the air conditioning controller completely closes the first flow rate adjustment valve 14a, fully opens the second flow rate adjustment valve 14b, fully opens the third flow rate adjustment valve 14c, and fully opens the fourth flow rate adjustment valve 14d. Further, the air conditioning controller closes the first opening/closing valve 18a, closes the second opening/closing valve 18b, closes the third opening/closing valve 18c, closes the fifth opening/closing valve 18e, opens the sixth opening/closing valve 18f, and closes the seventh opening/closing valve 18g.

Thus, in the air cooling mode, the ejector refrigeration cycle is configured to allow the refrigerant to circulate therethrough as indicated by solid arrows in FIG. 12. At this time, since the seventh opening/closing valve 18g is closed, the compressor 41 functions in the same manner as the normal single-stage compression type compressor without allowing the refrigerant to flow into the compressor 41 from the intermediate pressure port 41b of the compressor 41. That is, in the air cooling mode of this embodiment, the same refrigerant circuit as that in the air cooling mode of the first embodiment is configured. The operations of other devices to be controlled are the same as those in the air cooling mode of the first embodiment.

Thus, in the air cooling mode, the air cooled by the interior evaporator 23 is blown into the vehicle interior, thereby enabling the air cooling of the vehicle interior, in the same manner as in the air cooling mode of the first embodiment.

(b) Weak Dehumidification-air Heating Mode

In the weak dehumidification-air heating mode, the air conditioning controller completely closes the first flow rate adjustment valve 14a, puts the second flow rate adjustment valve 14b into the throttled state, fully opens the third flow rate adjustment valve 14c, and fully opens the fourth flow rate adjustment valve 14d. Further, the air conditioning controller closes the first opening/closing valve 18a, closes the second opening/closing valve 18b, closes the third opening/closing valve 18c, closes the fifth opening/closing valve 18e, opens the sixth opening/closing valve 18f, and closes the seventh opening/closing valve 18g.

Thus, in the weak dehumidification-air heating mode, the ejector refrigeration cycle is configured to allow the refrigerant to circulate therethrough as indicated by the solid arrows of FIG. 12, and to cause the compressor 41 to act in the same manner as the normal single-stage compression type compressor. That is, in the weak dehumidification-air heating mode, the same refrigerant circuit as that in the weak dehumidification-air cooling mode of the first embodiment is configured. The operations of other devices to be controlled are the same as those in the weak dehumidification-air heating mode of the first embodiment.

Thus, in the weak dehumidification-air heating mode, like the weak dehumidification-air heating mode of the first embodiment, the air cooled and dehumidified by the interior evaporator 23 can be re-heated by the interior condenser 12 and blown into the vehicle interior to thereby perform the dehumidification and air-heating of the vehicle interior.

(c) Dehumidification-air Heating Mode

In the dehumidification-air heating mode, the air conditioning controller puts the first flow rate adjustment valve 14*a* into the throttled state, completely closes the second flow rate adjustment valve 14*b*, puts the third flow rate adjustment valve 14*c* into the throttled state, and fully opens the fourth flow rate adjustment valve 14*d*. Further, the air conditioning controller opens the first opening/closing valve 18*a*, opens the second opening/closing valve 18*b*, opens the third opening/closing valve 18*c*, opens the fifth opening/closing valve 18*e*, closes the sixth opening/closing valve 18*f*, and opens the seventh opening/closing valve 18*g*.

Thus, in the dehumidification air heating mode, the two-stage pressurizing type ejector refrigeration cycle is configured as indicated by solid arrows of FIG. 13 in the following way. Specifically, the refrigerant circulates through the discharge port 41*c* of the compressor 41, the interior condenser 12, the first flow rate adjustment valve 14*a*, the heating side ejector 15, the accumulator 16 (the third opening/closing valve 18*c*, and the seventh opening/closing valve 18*g*), and the intermediate pressure port 41*b* of the compressor 41 in this order. Further, the refrigerant circulates through the accumulator 16, the third flow rate adjustment valve 14*c*, the exterior heat exchanger 17 (the first opening/closing valve 18*a*), and the heating side refrigerant suction port 15*d* of the heating side ejector 1 in this order. Moreover, the refrigerant circulates through the accumulator 16, the third flow rate adjustment valve 14*c*, the exterior heat exchanger 17, (the fifth opening/closing valve 18*e*), and the suction port 41*a* of the compressor 41 in this order.

Simultaneously, an ejector refrigeration cycle is configured in the following way. Specifically, the refrigerant circulates through the discharge port 41*c* of the compressor 41, the interior condenser 12, (the second opening/closing valve 18*b*, the fourth flow rate adjustment valve 14*d*), the cooling side ejector 20, the cooling side gas-liquid separator 21, and the intermediate pressure port 41*b* of the compressor 11 in this order. Additionally, the refrigerant circulates through the cooling side gas-liquid separator 21, the fixed throttle 22, the interior evaporator 23, and the cooling side refrigerant suction port 20*d* of the cooling side ejector 20 in this order. The operations of other devices to be controlled are the same as those in the dehumidification-air heating mode of the first embodiment.

Figure 15:
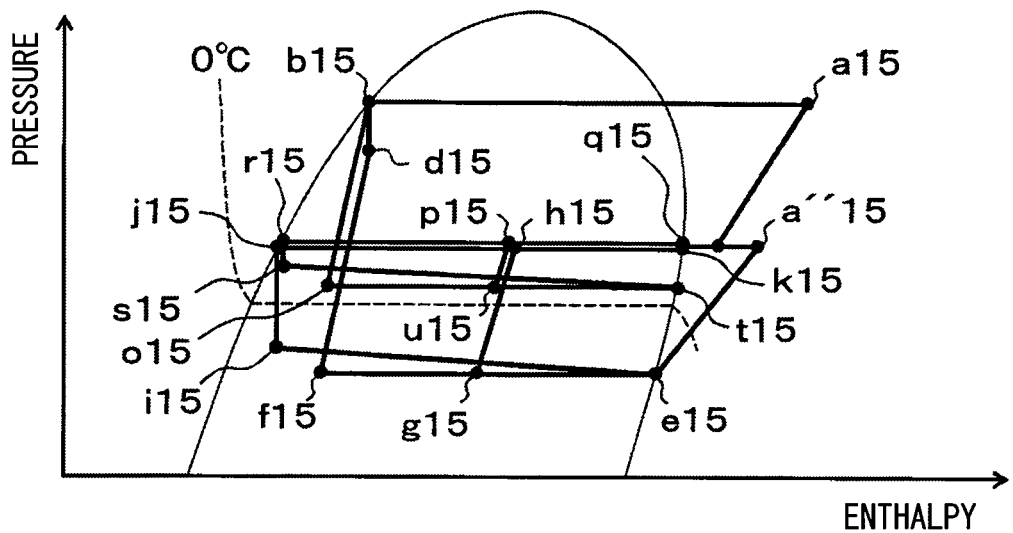
FIG. 15 is a Mollier chart showing the state of refrigerant in the dehumidification-air heating mode of the refrigeration cycle device in the fourth embodiment.

That is, as shown in the Mollier chart of FIG. 15, the refrigeration cycle device 10*a* in the dehumidification-air heating mode constitutes the refrigerant circuit in which the state of refrigerant changes in the substantially same manner as that in the dehumidification-air heating mode of the first embodiment. In other words, the refrigerant circuit is configured such that the heat absorbed in the refrigerant at both the exterior heat exchanger 17 and the interior evaporator 23 is dissipated into the air by the interior condenser 12.

Thus, in the dehumidification-air heating mode, like the dehumidification-air heating mode of the first embodiment, the air cooled and dehumidified by the interior evaporator 23 can be re-heated by the interior condenser 12 and blown into the vehicle interior to thereby perform the dehumidification-air heating of the vehicle interior.

Further, in the refrigerant circuit in the dehumidification-air heating mode, a part of the refrigerant flowing out of the exterior heat exchanger 17 (at a point e15 of FIG. 15) is drawn from the suction port 41*a* of the compressor 41 to be pressurized up to the intermediate-pressure refrigerant (as indicated from the point e15 to a point a"15 of FIG. 15). Thus, the pressure increasing amount of the refrigerant can be increased in the heating diffuser 15*g* of the heating side ejector 15.

Figure 16:
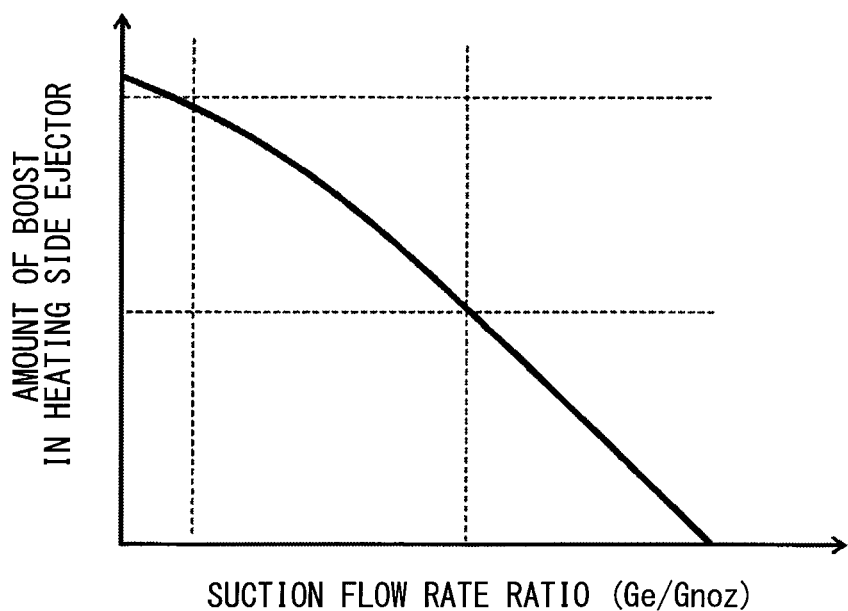
FIG. 16 is a graph showing a change in pressurizing amount by the ejector with respect to a change in a suction flow rate ratio.

In the general ejector, as shown in FIG. 16, provided that a suction flow rate ratio (Ge/Gnoz) of a refrigerant flow rate Ge (flow rate of the drawn flow) of the refrigerant drawn from the refrigerant suction port to a refrigerant flow rate Gnoz (flow rate of a driven flow) of the refrigerant flowing into the nozzle portion, as the suction flow rate ratio is decreased, the rate of conversion into the pressure energy among the recovered energy becomes larger. Therefore, the pressure increasing amount in the diffuser can increase with decreasing the suction flow rate ratio (Ge/Gnoz).

In this embodiment, the refrigerant flowing out of the exterior heat exchanger 17, that is, a part of the refrigerant drawn from the heating side refrigerant suction port 15*d* of the heating side ejector 15 is drawn from the suction port 41*a* of the compressor 41. In this way, the refrigerant flow rate Ge of the refrigerant drawn from the heating side refrigerant suction port 15*d* is decreased, while the pressure increasing amount in the heating side diffuser 15*g* is increased.

In the refrigerant circuit in the dehumidification-air heating mode, the gas-phase refrigerant flowing from the cooling side gas-liquid separator 21 (at a point q15 in FIG. 15) and the gas-phase refrigerant flowing from the accumulator 16 (at a point k15 in FIG. 15) flow into the intermediate pressure port 41*b* of the compressor 41 to be merged with the intermediate-pressure refrigerant pressurized by the low-stage side compression mechanism (as indicated from the points q15 and k15 to a point a'15, and from a point a"15 to the point a'15 in FIG. 15). Then, the merged refrigerant is pressurized up to a high-pressure refrigerant by the high-stage side compression mechanism (as indicated from the point a'15 to a point a15 in FIG. 15).

That is, the refrigerant circuit in the dehumidification-air heating mode raises the pressure of the refrigerant in multiple stages, and merges the intermediate-pressure gas-phase refrigerant of the cycle with the refrigerant discharged from the low-stage side compression mechanism, thereby causing the merged refrigerant to be drawn into the high-stage side compression mechanism, which is the so-called gas injection cycle (economizer refrigeration cycle).

(d) Air Heating Mode

In the air heating mode, the air conditioning controller puts the first flow rate adjustment valve 14*a* into the throttled state, completely closes the second flow rate adjustment valve 14*b*, puts the third flow rate adjustment valve 14*c* into the throttled state, and completely closes the fourth flow rate adjustment valve 14*d*. Further, the air conditioning controller opens the first opening/closing valve 18*a*, closes the second opening/closing valve 18*b*, opens the third opening/closing valve 18*c*, opens the fifth opening/closing valve 18*e*, closes the sixth opening/closing valve 18*f*, and opens the seventh opening/closing valve 18*g*.

Thus, in the air heating mode, the two-stage pressurizing type ejector refrigeration cycle is configured as indicated by solid arrows of FIG. 14 in the following way. Specifically, the refrigerant circulates through the discharge port 41*c* of the compressor 41, the interior condenser 12, the first flow rate adjustment valve 14*a*, the heating side ejector 15, the accumulator 16, (the third opening/closing valve 18*c*, and the seventh opening/closing valve 18*g*), and the intermediate pressure port 41*b* of the compressor 41 in this order. Further, the refrigerant circulates through the accumulator 16, the third flow rate adjustment valve 14*c*, the exterior heat exchanger 17, (the first opening/closing valve 18*a*), and the heating side refrigerant suction port 15*d* of the heating side ejector 15 in this order. Moreover, the refrigerant circulates through the accumulator 16, the third flow rate adjustment valve 14*c*, the exterior heat exchanger 17, (the fifth opening/closing valve 18*e*), and the suction port 41*a* of the compressor 41 in this order. The operations of other devices to be controlled are the same as those in the air heating mode of the first embodiment.

Figure 17:
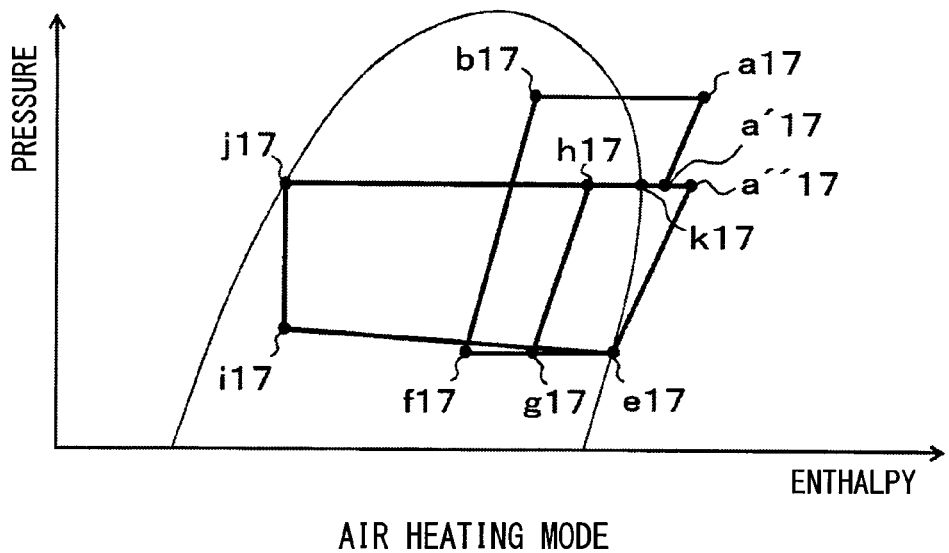
FIG. 17 is a Mollier chart showing the state of refrigerant in the air heating mode of the refrigeration cycle device in the fourth embodiment.

That is, as shown in the Mollier chart of FIG. 17, the refrigeration cycle device 10*a* in the air heating mode constitutes the refrigerant circuit in which the state of refrigerant changes in the substantially same manner as that in the air heating mode of the first embodiment. In other words, the refrigerant circuit can be configured such that the heat absorbed in the refrigerant at the exterior heat exchanger 17 is dissipated into the air by the interior condenser 12. FIG. 17 shows the change in state of the refrigerant during the high heating-capacity operation described in the first embodiment.

Therefore, in the air heating mode, like the air heating mode of the first embodiment, the air heated by the interior condenser 12 is blown into the vehicle interior, thereby enabling the air heating of the vehicle interior.

In the refrigerant circuit in the air heating mode, a part of the refrigerant flowing out of the exterior heat exchanger 17 (at a point e17 of FIG. 17) is drawn from the suction port 41*a* of the compressor 41 to be pressurized up to the intermediate pressure refrigerant (as indicated from the point e17 to a point a"17 in FIG. 17). Thus, like the dehumidification-air heating operation mode, the pressure increasing amount of the refrigerant can be increased in the heating side diffuser 15*g* of the heating side ejector 15.

In the refrigerant circuit in the air heating mode, the gas-phase refrigerant flowing from the accumulator 16 (at a point k17 in FIG. 17) flows into the intermediate pressure port 41*b* of the compressor 41 to be merged with the intermediate-pressure refrigerant pressurized by the low-stage side compression mechanism (as indicated from the point k17 to a point a'17, and from a point a"17 to the point a'17 in FIG. 17). Then, the merged refrigerant is compressed to a high-pressure refrigerant by the high-stage side compression mechanism (as indicated from the point a'17 to a point a17 in FIG. 17).

That is, the refrigerant circuit in the air heating mode constitutes a gas injection cycle, like the dehumidification-air heating operation mode.

As mentioned above, the vehicle air conditioner 1 can achieve the appropriate air conditioning of the vehicle interior in the same way as the first embodiment. The refrigeration cycle device 10*a* can obtain the same excellent effects as those in the first embodiment. The structure of the refrigeration cycle device 10*a* can also obtain the pressure increasing performance stabilizing effect and the pressure increasing performance improving effect of the heating side ejector 15 during the high heating-capacity operation in the air heating mode, like the first embodiment.

In the dehumidification-air heating mode and the air heating mode, the low-pressure refrigerant is drawn into the suction port 41*a* of the two-stage pressurizing type compressor 41, thereby drastically improving the pressure increasing amount by the heating side diffuser 15*g* of the heating side ejector 15.

Thus, this embodiment can reduce the refrigerant evaporation temperature in the exterior heat exchanger 17 as compared to the case where the single pressurizing type compressor 11 is employed like the first embodiment. In the dehumidification-air heating mode and the air heating mode, the amount of heat absorbed in the refrigerant from the outside air at the exterior heat exchanger 17 can be increased.

Further, a part (gas-phase refrigerant) of the refrigerant flowing out of the exterior heat exchanger 17 is drawn into the suction port 41*a* of the compressor 41, which can also increase the flow rate of the liquid-phase refrigerant supplied from the accumulator 16 to the exterior heat exchanger 17 via the third flow rate adjustment valve 14*c*. As a result, the amount of heat dissipation from the refrigerant at the interior condenser 12 can be increased to improve the heating capacity of the air.

In addition, the pressure of the intermediate-pressure refrigerant flowing from the heating side diffuser 15*g* of the heating side ejector 15 to the intermediate pressure port 41*b* of the compressor 41 can be increased to thereby increase the density of the intermediate-pressure refrigerant entering the intermediate pressure port 41*b*. As a result, the flow rate Gr of the refrigerant flowing into the interior condenser 12 can be increased to improve the heating capacity of the air.

The gas injection cycle is configured in the dehumidification-air heating mode and the air heating mode, thereby enabling the improvement of the mechanical efficiency (compression efficiency) of the compressor 41, and further improvement of the COP.

(Fifth Embodiment)

Figure 18:
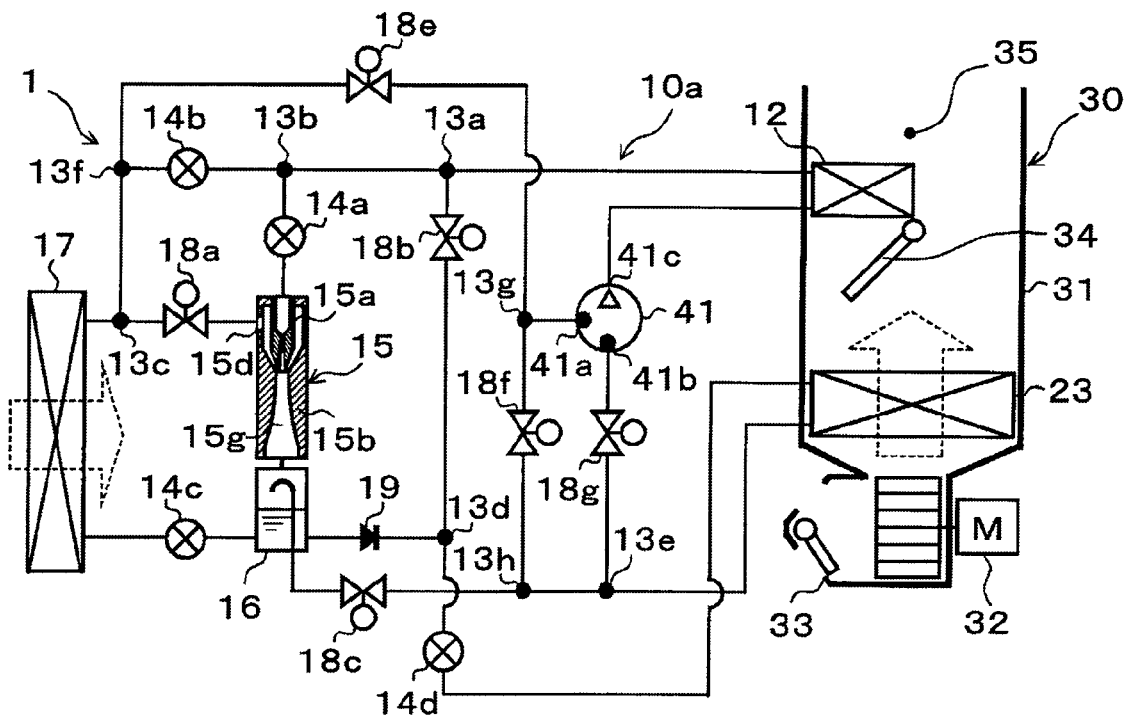
FIG. 18 is an entire configuration diagram of a refrigeration cycle device according to a fifth embodiment.

As shown in the entire configuration diagram of FIG. 18, this embodiment abolishes the cooling side ejector 20, the cooling side gas-liquid separator 21, and the fixed throttle 22 in the refrigeration cycle device 10, from the structure of the fourth embodiment. Additionally, the outlet side of the fourth flow rate adjustment valve 14*d* is connected to the refrigerant inlet side of the interior evaporator 23, and the refrigerant outlet side of the interior evaporator 23 is connected to the fifth three-way joint 13*e*.

That is, in the refrigeration cycle device 10*a*, the fourth flow rate adjustment valve 14*d* configures the cooling side decompressor. The structures of other components of the refrigeration cycle device 10*a* except for the above points are the same as those of the fourth embodiment. Now, the operation of the above-mentioned structure will be described. In this embodiment, like the first embodiment, switching is performed among the respective operation modes.

(a) Air Cooling Mode

In the air cooling mode, the air conditioning controller completely closes the first flow rate adjustment valve 14*a*, fully opens the second flow rate adjustment valve 14*b*, fully opens the third flow rate adjustment valve 14*c*, and puts the fourth flow rate adjustment valve 14*d* into the throttled state. Further, the air conditioning controller closes the first opening/closing valve 18*a*, closes the second opening/closing valve 18*b*, closes the third opening/closing valve 18*c*, closes the fifth opening/closing valve 18e, opens the sixth opening/closing valve 18f, and closes the seventh opening/closing valve 18g.

Thus, in the air cooling mode, the normal refrigeration cycle is configured such that the refrigerant circulates through the discharge port 41c of the compressor 41, the interior condenser 12, (the second flow rate adjustment valve 14b), the exterior heat exchanger 17, (the third flow rate adjustment valve 14c), the accumulator 16, (the check valve 19), the fourth flow rate adjustment valve 14d, the interior evaporator 23, and the suction port of the compressor 11 in this order.

The valve opening degree of the fourth flow rate adjustment valve 14d is determined in the air cooling mode such that the superheat degree of the refrigerant flowing out of the interior evaporator 23 is within a predetermined range. The operations except for those described above are the same as those in the air cooling mode of the fourth embodiment. Thus, in the air cooling mode, the air cooled by the interior evaporator 23 is blown into the vehicle interior, thereby enabling the air cooling of the vehicle interior.

(b) Weak Dehumidification-air Heating Mode

In the weak dehumidification-air heating mode, the air conditioning controller completely closes the first flow rate adjustment valve 14a, puts the second flow rate adjustment valve 14b into the throttled state, fully opens the third flow rate adjustment valve 14c, and puts the fourth flow rate adjustment valve 14d into the throttled state. Further, the air conditioning controller closes the first opening/closing valve 18a, closes the second opening/closing valve 18b, closes the third opening/closing valve 18c, closes the fifth opening/closing valve 18e, opens the sixth opening/closing valve 18f, and closes the seventh opening/closing valve 18g. Thus, in the weak dehumidification-air heating mode, the normal refrigeration cycle is configured to allow the refrigerant to circulate therethrough in the same order as in the air cooling mode.

The valve opening degree of the fourth flow rate adjustment valve 14d in the weak dehumidification-air heating mode is determined in the same manner as in the air cooling mode. The operations except for those described above are the same as those in the weak dehumidification-air heating mode of the fourth embodiment. Thus, also in the weak dehumidification-air heating mode, the air cooled by the interior evaporator 23 is heated again in the interior condenser 12 and blown into the vehicle interior, thereby enabling the dehumidification-air heating of the vehicle interior, like the fourth embodiment.

(c) Dehumidification-air Heating Mode

In the dehumidification-air heating mode, the air conditioning controller puts the first flow rate adjustment valve 14a into the throttled state, completely closes the second flow rate adjustment valve 14b, puts the third flow rate adjustment valve 14c into the throttled state, and puts the fourth flow rate adjustment valve 14d into the throttled state. Further, the air conditioning controller opens the first opening/closing valve 18a, opens the second opening/closing valve 18b, opens the third opening/closing valve 18c, opens the fifth opening/closing valve 18e, closes the sixth opening/closing valve 18f, and opens the seventh opening/closing valve 18g.

Thus, in the dehumidification-air heating mode, the two-stage pressurizing type ejector refrigeration cycle is configured in the following way. Specifically, the refrigerant circulates through the discharge port 41c of the compressor 41, the interior condenser 12, the first flow rate adjustment valve 14a, the heating side ejector 15, the accumulator 16, (the third opening/closing valve 18c, and the seventh opening/closing valve 18g), and the intermediate pressure port 41b of the compressor 41 in this order. Further, the refrigerant circulates through the accumulator 16, the third flow rate adjustment valve 14c, the exterior heat exchanger 17, (the fifth opening/closing valve 18a), and the heating-side refrigerant suction port 15d of the heating-side ejector 15 in this order. Moreover, the refrigerant circulates through the accumulator 16, the third flow rate adjustment valve 14c, the exterior heat exchanger 17, (the fifth opening/closing valve 18e), and the suction port 41a of the compressor in this order.

Simultaneously, the normal refrigeration cycle is configured such that the refrigerant circulates through the discharge port 41c of the compressor 41, the interior condenser 12, (the second opening/closing valve 18b), the fourth flow rate adjustment valve 14d, and the intermediate pressure port 41b of the compressor 41 in this order.

The valve opening degree of the fourth flow rate adjustment valve 14d in the dehumidification-air heating mode is determined in the same manner as in the air cooling mode. The operations except for those described above are the same as those in the dehumidification-air heating mode of the fourth embodiment. Thus, in the dehumidification-air heating mode, the air cooled by the interior evaporator 23 is heated again in the interior condenser 12 and blown into the vehicle interior, enabling the dehumidification-air heating of the vehicle interior.

(d) Air Heating Mode

In the air heating mode of this embodiment, the air conditioning controller puts the first flow rate adjustment valve 14a into the throttled state, completely closes the second flow rate adjustment valve 14b, puts the third flow rate adjustment valve 14c into the throttled state, and completely closes the fourth flow rate adjustment valve 14d. Further, the air conditioning controller opens the first opening/closing valve 18a, closes the second opening/closing valve 18b, opens the third opening/closing valve 18c, opens the fifth opening/closing valve 18e, closes the sixth opening/closing valve 18f, and opens the seventh opening/closing valve 18g. Thus, in the air heating mode, the same two-stage pressurizing ejector refrigeration cycle as that in the fourth embodiment is configured to enable the air heating of the vehicle interior in the same way as in the fourth embodiment.

As mentioned above, the vehicle air conditioner 1 can achieve the appropriate air conditioning of the vehicle interior in the same way as the first embodiment. The refrigeration cycle device 10a cannot obtain the effect of improving the COP by the pressurizing effect of the ejector in the air cooling mode as well as the weak dehumidification-air heating mode, but can simplify the structure of the cooling-side decompressor, obtaining the same effects as those in the fourth embodiment.

As mentioned above, the vehicle air conditioner 1 can achieve the appropriate air conditioning of the vehicle interior in the same way as the fourth embodiment. The refrigeration cycle device 10a can obtain the excellent effects described in the paragraphs (A) to (C) of the first embodiment. The structure of the refrigeration cycle device 10 can also obtain the pressure increasing performance stabilizing effect and the pressure increasing performance improving effect of the heating side ejector 15 during the high heating-capacity operation in the air heating mode, like the fourth embodiment.

(Sixth Embodiment)

Figure 19:
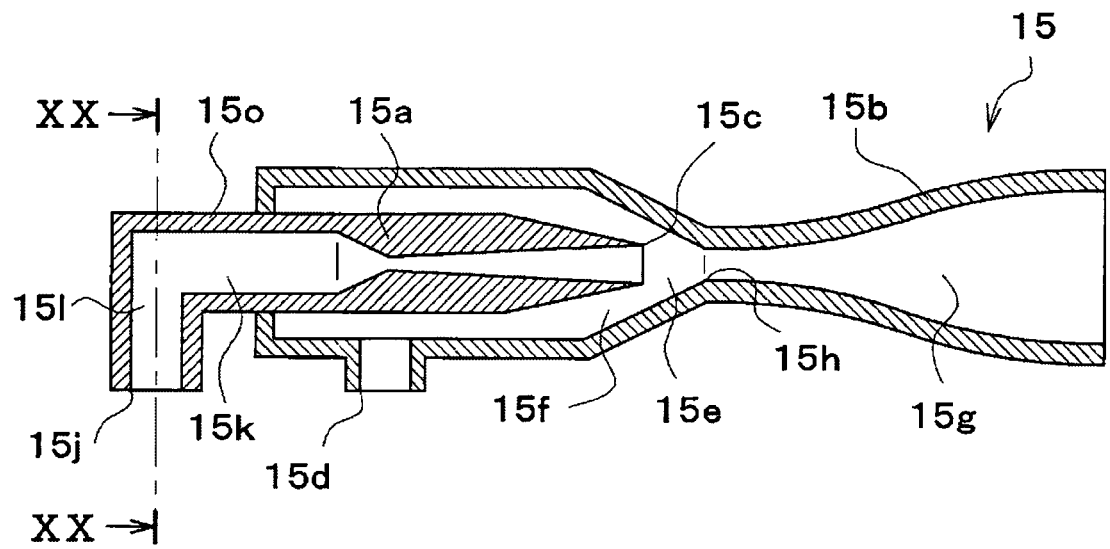
FIG. 19 is a cross-sectional view in an axial direction of the heating side ejector in a sixth embodiment.
Figure 20:
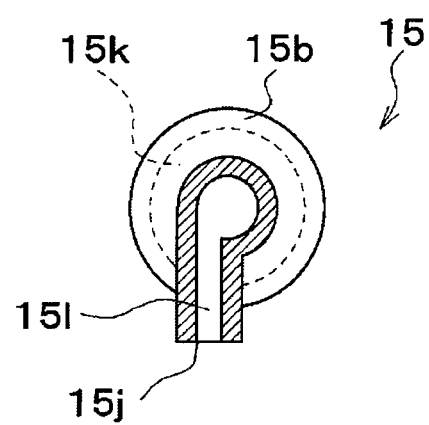
FIG. 20 is a cross-sectional view taken along the line XX-XX in FIG. 19.

In this embodiment, as shown in FIGS. 19 and 20, the structure of the heating side ejector 15 is changed by way of example, as compared to the first embodiment. Specifically, the heating side ejector 15 includes a swirling space 15k on the upstream side of the refrigerant flow rather than the throat portion (portion with the minimum passage area) in the refrigerant passage formed in the heating side nozzle portion 15a. The swirling space 15k allows the refrigerant flowing into the refrigerant inflow port 15j to turn around.

More specifically, the swirling space 15k is formed inside a cylindrical portion 15o provided on the upstream side of the refrigerant flow in the heating side nozzle portion 15a. Thus, the cylindrical portion 15o constitutes a swirling space formation member, whereby the swirling space formation member and the nozzle portion are integrally configured.

The swirling space 15k is formed in the shape of a rotor with its central shaft extending coaxially with respect to the heating side nozzle portion 15a. The shape of the rotor is a three-dimensional shape formed by rotating a plane figure about one straight line (central shaft) on the same plane. More specifically, the swirling space 15k is formed in the substantially cylindrical shape.

Referring to FIG. 20, as seen from the direction of the central shaft of the swirling space 15k, a refrigerant inflow passage 15I for connecting the refrigerant inflow port 15j with the swirling space 15k extends in the direction of a tangential line to the inner wall surface of the swirling space 15k. Thus, the refrigerant flowing from the refrigerant inflow port 15j into the swirling space 15k flows along the inner wall surface of the swirling space 15k, and turns around within the swirling space 15k.

Here, a centrifugal force acts on the refrigerant turning in the swirling space 15k, whereby the refrigerant pressure on the central shaft side of the swirling space 15k becomes lower than that on the outer peripheral side thereof. In this embodiment, during the normal operation in the dehumidification-air heating mode and the air heating mode, the refrigerant pressure on the central shaft side within the swirling space 15k is decreased to a pressure that generates a saturated liquid-phase refrigerant, or a pressure that causes the refrigerant to be decompressed and boiled (causing cavitation).

The adjustment of the refrigerant pressure on the central shaft side of the swirling space 15k can be achieved by adjusting the swirling flow velocity of the refrigerant swirling within the swirling space 15k. Further, the adjustment of the swirling flow velocity can be performed by adjusting a ratio of a passage sectional area of the refrigerant inflow passage 15I to a flow path sectional area as a sectional area vertical to the axial direction of the swirling space 15k, or by adjusting a valve opening degree of the first flow rate adjustment valve 14a disposed on the upstream side of the heating side nozzle portion 15a.

The swirling flow velocity means the flow velocity in the swirling direction of the refrigerant in the vicinity of the outermost periphery of the swirling space 15k. The structures and operations of other components of the refrigeration cycle device 10 and the heating side ejector 15 are the same as those of the first embodiment. Thus, the refrigeration cycle device 10 and the heating side ejector 15 can also obtain the same effects as those of the first embodiment.

During the normal operation in the dehumidification-air heating mode and the air-heating mode, the heating side ejector 15 rotates the refrigerant within the swirling space 15k, and can reduce the refrigerant pressure on the central shaft side of the swirling space 15k to a pressure that forms the saturated liquid-phase refrigerant, or a pressure that causes the refrigerant to be decompressed and boiled (causing the cavitation). As a result, the heating side ejector 15 can improve the nozzle efficiency of the heating side nozzle portion 15a.

More specifically, the heating side nozzle portion 15a promotes boiling of the refrigerant due to both wall-surface boiling occurring when the refrigerant swirling on the outer peripheral side within the swirling space 15k is removed from the wall surface on the outer peripheral side of the swirling space 15k, and interface boiling caused by boiling nucleation generated by cavitation of the refrigerant on the central shaft side of the swirling space 15k.

In this way, the refrigerant flowing into the throat portion of the heating side nozzle portion 15a can be converted to a homogenous gas-liquid mixed state of a gas-phase refrigerant and a liquid-phase refrigerant. Further, the flow of refrigerant in the gas-liquid mixed state is blocked (choked) in the vicinity of the throat portion, whereby the refrigerant in the gas-liquid mixed state reaching the sound velocity by the choking can be accelerated by the divergent part to be injected from the refrigerant injection port 15c.

That is, the heating side ejector 15 can promote the boiling by both the wall-surface boiling and the interface boiling, thereby effectively accelerating the refrigerant in the gas-liquid mixed state up to the sound velocity to improve the nozzle efficiency of the heating side nozzle portion 15a. Further, the COP of the refrigeration cycle device 10 can be further improved. The term "nozzle efficiency" as used herein means an energy conversion efficiency obtained when the pressure energy of the refrigerant is converted into the kinetic energy at the nozzle portion.

During the high heating-capacity operation in the air heating mode, the centrifugal force acts on the refrigerant swirling within the swirling space 15k, so that the liquid-phase refrigerant with a high density can be eccentrically located on the side of an inner peripheral wall surface of the refrigerant passage formed in the heating side nozzle portion 15a. Thus, the friction between the liquid-phase refrigerant and the inner peripheral wall surface of the refrigerant passage can promote the boiling of the liquid-phase refrigerant, thereby improving the nozzle efficiency.

(Seventh Embodiment)

Figure 21:
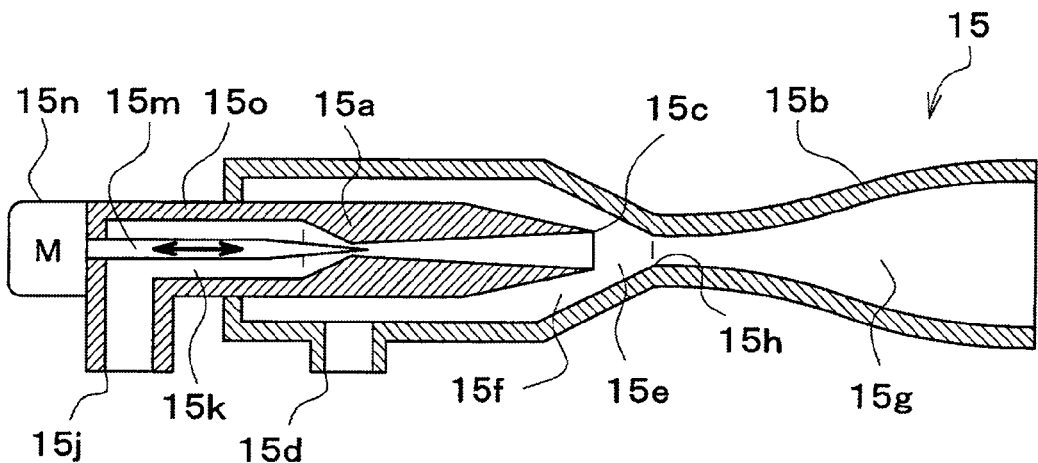
FIG. 21 is a cross-sectional view in an axial direction of the heating side ejector in a seventh embodiment.

Although the sixth embodiment has described a fixed nozzle portion with a fixed refrigerant passage area of the throat portion (a portion with the minimum passage area) as the heating side nozzle portion 15a of the heating side ejector 15 by way of example, this embodiment will describe a variable nozzle portion whose throttle passage area is variable as shown in FIG. 21.

Specifically, the heating side nozzle portion 15a includes a needle valve 15m disposed in the refrigerant passage of the heat side nozzle portion 15a and serving as a valve body for changing the refrigerant passage area of the throat portion, and a stepping motor 15n serving as a driving portion for displacing the needle valve 15m in the axial direction of the nozzle portion.

The needle valve 15m is formed in a needle shape to have its central shaft disposed coaxially to the central shaft of the heating side nozzle portion 15a. More specifically, the needle valve 15m is formed to have a tapered shape toward the downstream side of the refrigerant flow, and disposed to have the tapered tip end on the most downstream side protruding toward the downstream side of the refrigerant flow with respect to the refrigerant injection port 15c of the heating side nozzle portion 15a.

The stepping motor 15n is disposed on the side of the refrigerant inflow port 15j of the heating side nozzle portion 15a so as to displace the needle valve 15m in the axial direction of the heating side nozzle portion 15a. In this way, the displacement changes the area of the refrigerant passage with an annular section formed in between the inner peripheral wall surface of the heating side nozzle portion 15a and the outer peripheral wall surface of the needle valve 15m. The stepping motor 15n has its operation controlled by a control signal output from the controller.

The structures and operations of other components of the refrigeration cycle device 10 and the heating side ejector 15 are the same as those of the sixth embodiment.

Thus, the refrigeration cycle device 10 and the heating side ejector 15 can also obtain the same effects as those of the sixth embodiment. Further, the heating side ejector 15 employs the heating side nozzle portion 15a constituted of the variable nozzle, so that the refrigerant can be supplied to the heating side nozzle portion 15a of the heating side ejector 15 at an appropriate flow rate according to the load on the refrigeration cycle device 10.

During the high heating-capacity operation in the air heating mode, the heating side ejector 15 may serve as a dryness adjustment portion for adjusting the dryness x of the refrigerant flowing into the heating side nozzle portion 15a. The heating side nozzle portion 15a is constituted of the variable nozzle portion with the completely closing function that can close the throat portion by use of the needle valve 15m, so that the heating side ejector 15 can serve as the refrigerant circuit switch without abolishing the first flow rate adjustment valve 14a.

The heating side nozzle portion 15a shown in FIG. 21 employs the valve that is tapered toward the throat portion from the upstream side of the refrigerant flow with respect to the throat portion, as the needle valve 15m. Alternatively, in a modified example shown in FIG. 22, the heating side nozzle portion may employ one tapered toward the throat portion from the downstream side of the refrigerant flow of the throat portion. In this case, the tapered tip end on the most upstream side of the needle valve 15m may be disposed to protrude toward the tapered portion 15p rather than the injection portion 15q.

Figure 22:
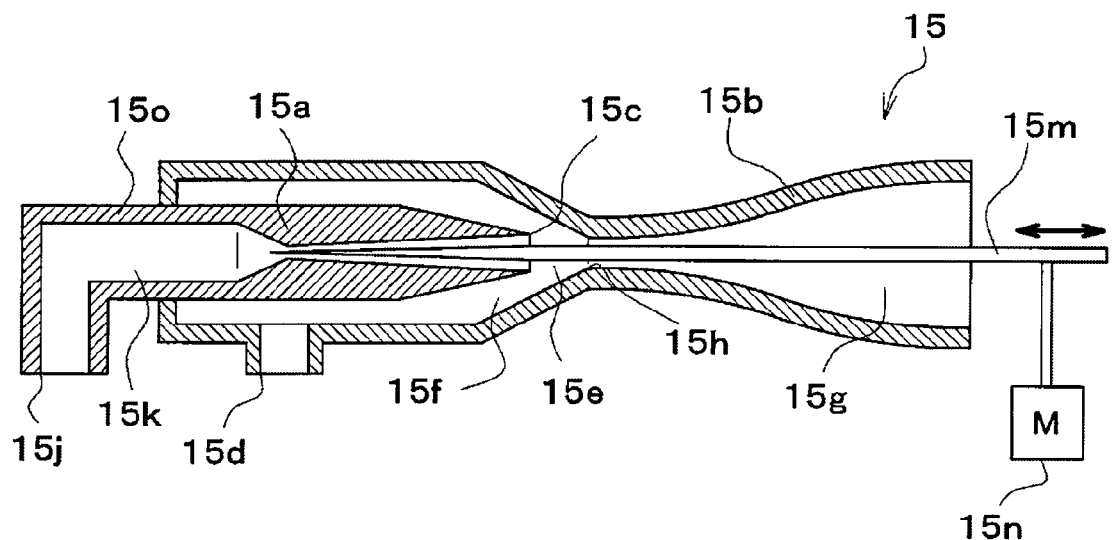
FIG. 22 is a cross-sectional view in an axial direction of the heating side ejector in a modified example of the seventh embodiment.

In a modified example shown in FIG. 22, since the needle valve 15m does not penetrate the swirling space, the refrigerant swirling within the swirling space 15k is not disturbed. Therefore, this embodiment can more effectively improve the nozzle efficiency of the heating side nozzle portion 15a.

(Eighth Embodiment)

Figure 23:
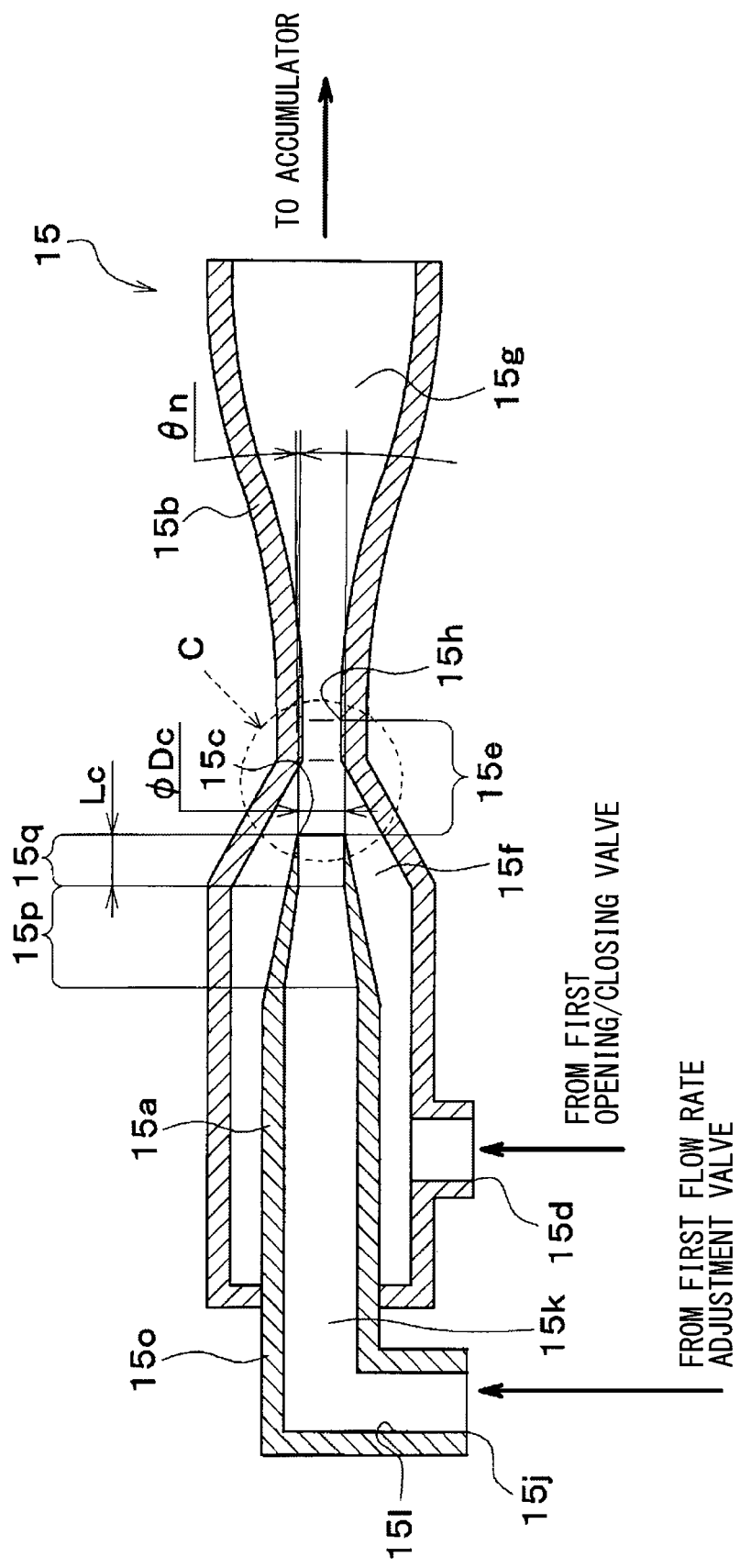
FIG. 23 is a cross-sectional view in an axial direction of the heating side ejector in an eighth embodiment.
Figure 24:
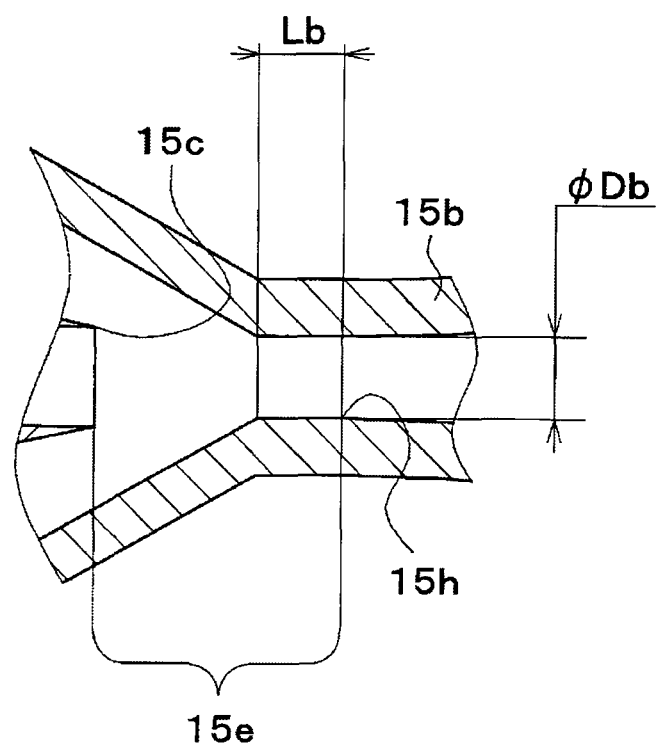
FIG. 24 is an enlarged view of a C part shown in FIG. 23.

In this embodiment, as shown in FIGS. 23 and 24, the structure of the heating side ejector 15 is changed by way of example, as compared to the first embodiment. Specifically, like the sixth embodiment, the heating side ejector 15 has a cylindrical portion 15o for forming the swirling space 15k, on the upstream side of the refrigerant flow of the heating side nozzle portion 15a.

The heating side nozzle portion 15a includes as a refrigerant passage formed therein, a tapered portion 15p having its refrigerant passage area gradually decreased toward the refrigerant injection port 15c, and an injection portion 15q for guiding the refrigerant from the tapered portion 15p to the refrigerant injection port 15c. That is, the heating side nozzle portion 15a is configured as the so-called tapered nozzle.

The injection portion 15q is formed on the most downstream side of the refrigerant passage formed in the heating side nozzle portion 15a. Thus, the injection shape or spreading direction of the injection refrigerant injected from the refrigerant injection port 15c can be changed depending on a spreading angle θn on the section of the injection portion 15q in the axial direction of the heating side nozzle portion 15a. That is, the injection portion 15q can be expressed as a space that defines the injection direction of the refrigerant injected from the refrigerant injection port 15c.

In this embodiment, the spreading angle θn of the injection portion 15q with respect to the section of the heating side nozzle portion 15a in the axial direction is set to 0°. That is, the injection portion 15q extends in the axial direction of the heating side nozzle portion 15a, and is formed by a cylindrical space with a certain refrigerant passage area. FIG. 23 illustrates a spreading angle θn of about 1° for clarifying the spreading angle θn.

As shown in FIG. 23, when Lc is a length in the axial direction of a part with the injection portion 15q formed therein in the refrigerant passage formed within the heating side nozzle portion 15a, and ϕDc is an equivalent diameter of an opening area of the refrigerant injection port 15c, the length Lc in the axial direction is determined to satisfy the following formula F7.

$$Lc/\phi Dc \leq 1 \qquad (F7)$$

In this embodiment, specifically, Lc/ϕDc=1.

The heating side nozzle portion 15a has the refrigerant passage formed therein as mentioned above, whereby the refrigerant injected from the refrigerant injection port 15c into the mixing portion 15e is flexibly expanded.

The mixing portion 15e is formed in the shape obtained by a combination of a truncated cone shape that gradually reduces a refrigerant passage area toward the downstream side of the refrigerant flow, and a cylindrical shape that has a certain refrigerant passage area.

More specifically, as shown in an enlarged diagram of FIG. 24, when Lb is a length of a cylindrical part of the mixing portion 15e in the axial direction of the heating side nozzle portion 15a, and ϕDb is a diameter of the cylindrical part (corresponding to the diameter of the inlet 15h of the heating side diffuser 15g), the length Lb is determined to satisfy the following formula F8.

$$Lb/\phi Db \leq 1 \qquad (F8)$$

Note that in this embodiment, specifically, Lb/ϕDb=1.

The structures and operations of other components of the refrigeration cycle device 15 and the refrigeration cycle device 10 are the same as those of the first embodiment. Thus, the refrigeration cycle device 10 and the heating side ejector 15 can also obtain the same effects as those of the sixth embodiment.

The injection portion 15q is provided in the heating side nozzle portion 15a, so that the heating side ejector 15 flexibly expands the refrigerant to be injected from the refrigerant injection portion 15c into the mixing portion 15e. Thus, the pressure increasing performance of the heating side diffuser 15g can be effectively suppressed from being reduced.

More specifically, as mentioned above, during the high heating-capacity operation in the air heating mode, the dryness x of the refrigerant flowing into the heating side nozzle portion 15a of the heating side ejector 15 becomes higher than that obtained during the normal operation in the dehumidification-air heating mode and the air heating mode. For this reason, during the high heating-capacity operation, the flow velocity of the refrigerant injected from the refrigerant injection port 15c of the heating side nozzle portion 15a tends to become higher, and the wall-surface friction between the refrigerant and the refrigerant passage formed in the heating side nozzle portion 15*a* also tends to increase.

In contrast, the heating side ejector 15 includes the injection portion 15*q* in the heating side nozzle portion 15*a* constituted of the tapered nozzle portion, thereby flexibly expanding the mixed refrigerant injected from the refrigerant injection port 15*c* into the mixing portion 15*e*. Thus, the heating side ejector 15 can accelerate the injection refrigerant by the mixing portion 15*e* without providing the divergent part, like a Laval nozzle portion.

That is, the heating side ejector can accelerate the refrigerant without causing the wall-surface friction between the refrigerant passage and the refrigerant that would be caused by the divergent part of the Laval nozzle portion when the refrigerant is accelerated at the ultrasonic velocity. Thus, the wall-surface friction between the refrigerant and the refrigerant passage can be reduced to suppress the loss of the kinetic energy included in the refrigerant flowing through the refrigerant passage.

As a result, even under the operation conditions that allow the refrigerant with the relatively high dryness x to flow into the heating side nozzle portion 15*a*, like the high heating-capacity operation or the like in the air heating mode, this embodiment can suppress the flow velocity of the injection refrigerant from being decreased, and can also suppress the pressure increasing performance of the heating side diffuser 15*g* from being reduced.

When the spreading angle θn is set to 0°, like the injection portion 15*q*, this embodiments takes the same structure as the straight portion 15*i* in the second embodiment, and thus can prevent the overexpansion of the refrigerant and suppress the occurrence of the oblique shock wave. Thus, this embodiment can suppress the reduction in pressure increasing performance of the heating side diffuser 15*g* due to the oblique shock wave.

Although in this embodiment, the spreading angle θn of the injection portion 15*q* is set to 0° by way of example, the spreading angle θn may be set to more than 0° as long as the refrigerant injected from the refrigerant injection port 15*c* can be flexibly expanded. That is, the injection portion 15*q* may be formed by the space with the truncated cone shape that gradually increases its refrigerant passage sectional area toward the refrigerant flow direction.

The studies of the inventors of the present disclosure have shown that the shape of the mixing portion 15*e* is formed by combining the truncated conical shape whose refrigerant passage area gradually decreases toward the downstream side of the refrigerant flow, and the cylindrical shape whose refrigerant passage area is constant, and the distance Lb is determined to satisfy the above-mentioned formula F8, whereby the flow velocity of the mixed refrigerant can be effectively decelerated.

Thus, the shock wave to be caused due to the transfer of the flow velocity of the two-phase refrigerant from the ultrasonic state to the subsonic state can be surely generated within the mixing portion 15*e* without being caused within the heating side diffuser 15*g*. As a result, the pressure increasing performance of the heating side diffuser 15*g* can be effectively preventing from becoming unstable.

In this embodiment, the shape of the mixing portion 15*e* is formed by combining the truncated conical shape and the cylindrical shape. This is because the shape of the heating side diffuser 15*g* is defined as one that gradually increases the refrigerant passage area toward the refrigerant flow direction. That is, the above-mentioned pressure increasing performance stabilizing effect can be obtained, even though a cylindrical space whose refrigerant passage area does not change is provided on the inlet side of the heating side diffuser 15*g*.

(Ninth Embodiment)

Figure 25:
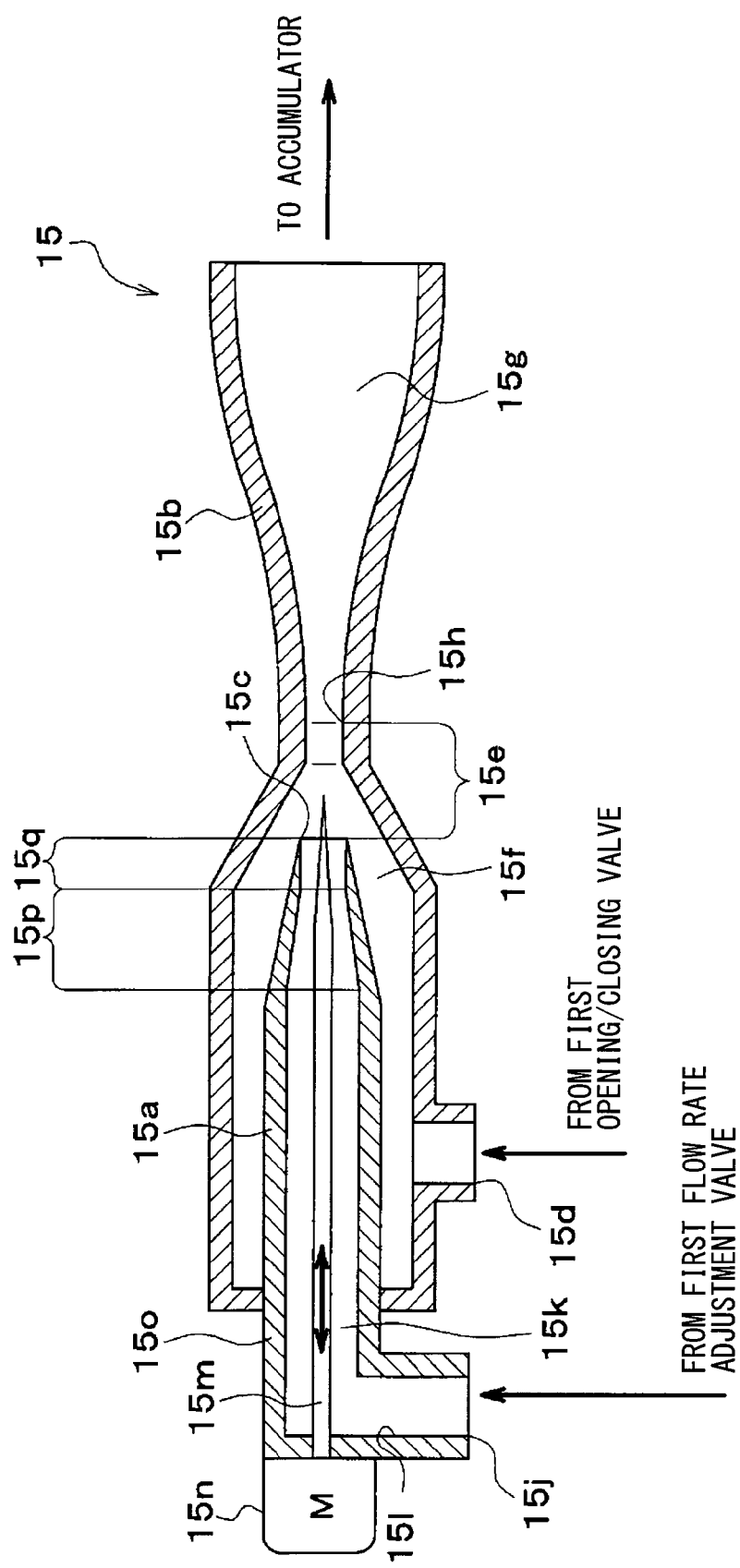
FIG. 25 is a cross-sectional view in an axial direction of the heating side ejector in a ninth embodiment.

The eighth embodiment has described the example in which the heating side nozzle portion 15*a* of the heating side ejector 15 is a fixed nozzle portion having a fixed refrigerant passage area of the minimum passage area portion formed at the inlet of the injection portion 15*q*. On the other hand, in this embodiment, as shown in FIG. 25, the variable nozzle portion is employed, like the seventh embodiment. That is, the heating side nozzle portion 15*a* is the so-called plug nozzle portion.

The structures and operations of other components of the refrigeration cycle device 10 and the heating side ejector 15 are the same as those of the eighth embodiment. Thus, the refrigeration cycle device 10 and the heating side ejector 15 can also obtain the same effects as those of the eighth embodiment. Further, the heating side ejector 15 uses the heating side nozzle portion 15*a* constituting the variable nozzle, so that the refrigerant can be supplied to the heating side nozzle portion 15*a* of the heating side ejector 15, like the seventh embodiment.

The heating side nozzle portion 15*a* serves as a plug nozzle portion, and thereby can inject the injection refrigerant from the refrigerant injection port 15*c* into the mixing portion 15*e* along the outer surface of the needle valve 15*m*. Thus, even though the flow rate of the refrigerant flowing into the heating side nozzle portion 15*a* is changed, the injection refrigerant can be easily expanded flexibly.

Figure 26:
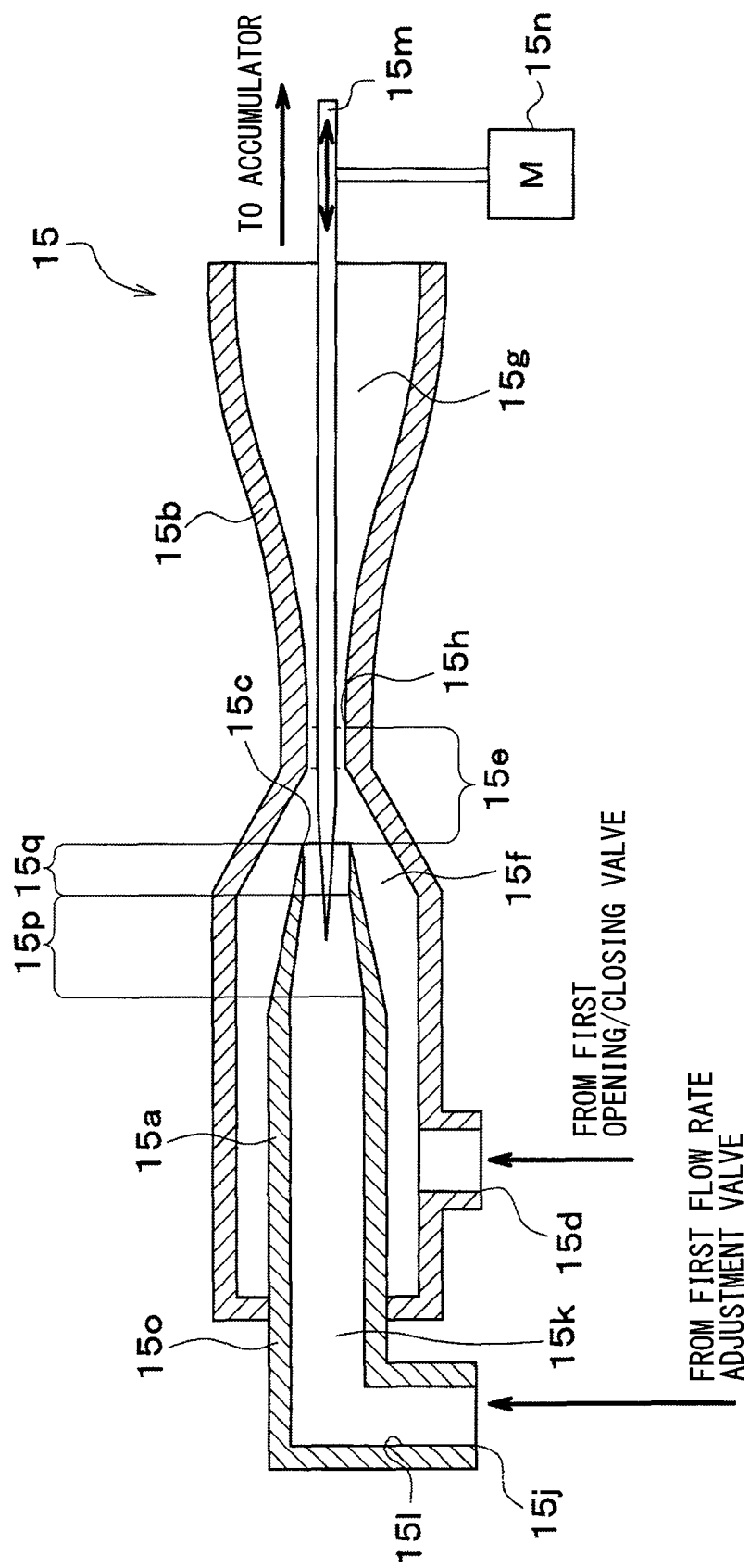
FIG. 26 is a cross-sectional view in an axial direction of the heating side ejector in a modified example of the ninth embodiment.

The heating side nozzle portion 15*a* shown in FIG. 25 employs the valve that is tapered toward the downstream side of the refrigerant flow, as the needle valve 15*m*. Alternatively, like the seventh embodiment, in a modified example shown in FIG. 26, the heating side nozzle portion may employ one tapered from the heating side diffuser 15*g* side toward the upstream side of the refrigerant flow.

(Other Embodiments)

The present disclosure is not limited to the above embodiments, and various modifications and changes can be made to those embodiments in the following way without departing from the scope of the present disclosure.

(1) Although in the above-mentioned embodiments, the refrigeration cycle devices 10 and 10*a* including the ejector according to the present disclosure are applied to an air conditioner for an electric vehicle, the application of the refrigeration devices 10 and 10*a* is not limited thereto.

For example, the refrigeration cycle device of the present disclosure may also be applied to air conditioners for a normal vehicle that obtains a driving force for traveling from an internal combustion engine (engine), and a hybrid vehicle that obtains a driving force for traveling from both an internal combustion engine and an electric motor for traveling. In applying the refrigeration cycle device of the present disclosure to the vehicle with the internal combustion engine, a heater core may be provided in the vehicle air conditioner 1, as an auxiliary air heater that heats air using a coolant of the internal combustion engine as heat source.

The refrigeration cycle devices 10 and 10*a* including the ejector (heating side ejector 15) according to the present disclosure is not limited to those dedicated for vehicles, and may be applied to a stationary air conditioner, a cooling storage, a liquid heating-cooling equipment, and the like.

(2) In the above-mentioned embodiments, the high-pressure refrigerant exchanges heat with air at the interior condenser 12, thereby heating the air. On the other hand, instead of the interior condenser 12, for example, a heat medium circulation circuit is provided for circulation of a heat medium. The heat medium circulation circuit may include a water-refrigerant heat exchanger that exchanges heat between the heat medium and a high-pressure refrigerant, as well as a heating heat exchanger that heats air by exchanging heat between the air and the heat medium heated by the water-refrigerant heat exchanger.

That is, air may be indirectly heated via the heat medium using the high-pressure refrigerant as a heat source. In applying the refrigeration cycle device of the invention to the vehicle with the internal combustion engine, the coolant of the internal combustion engine may circulate as the heat medium through the heat medium circulation circuit. In the electric vehicle, a coolant for cooling a battery or an electric device may circulate as the heat medium through the heat medium circulation circuit.

(3) In the refrigeration cycle devices 10 and 10a of the above-mentioned embodiments, a plurality of three-way joints, flow rate adjustment valves, and opening/closing valves can be used to switch among refrigerant circuits in various operation modes. However, the invention is not limited to this structure. The refrigeration cycle devices 10 and 10a can obtain the pressure increasing performance stabilizing effect and the pressure increasing performance improving effect exhibited by the ejector of the present disclosure as long as the operation corresponding to at least the high heating-capacity operation in the above-mentioned air heating mode can be carried out.

The structures of the refrigeration cycle devices 10 and 10a are not limited to those described in the above-mentioned embodiments. Various modifications and changes can be made to the embodiments as long as a cycle with the same effects can be configured.

For example, the first three-way joint 13a and the second three-way joint 13b may be integrated together to form a four-way joint structure. Similarly, in the fourth embodiment and the like, the third three-way joint 13c and the sixth three-way joint 13f may be integrated together. Alternatively, the fifth three-way joint 13e and the eighth three-way joint 13h may be integrated together.

Further, the first flow rate adjustment valve 14a, the second flow rate adjustment valve 14b, and the second three-way joint 13b may be integrated together to form an electric three-way-type flow rate adjustment valve. Instead of the check valve 19, the electric opening/closing valve may be used. The electric opening/closing valve may be opened in the air cooling mode and the weak humidification-air heating mode, and may be closed in the dehumidification-air heating mode and the air heating mode.

In the above-mentioned embodiments, for example, the first flow rate adjustment valve 14a employs the variable throttle mechanism with the fully opening function. However, the flow rate adjustment valve is not limited to this mechanism. The first flow rate adjustment valve 14a may be constituted by a throttle mechanism (including a fixed throttle) without having the fully opening function, a bypass passage for bypassing the throttle mechanism, and an opening/closing valve for opening/closing the bypass passage. The same goes for other flow rate adjustment valves with the fully opening function.

For example, the first flow rate adjustment valve 14a employs a variable throttle mechanism with the completely closing function. Alternatively, the first flow rate adjustment valve may be constituted of a throttle mechanism (including a fixed throttle) without the completely closing function, and an opening/closing valve for opening and closing a refrigerant passage connected in series to the throttle mechanism. The same goes for other flow rate adjustment valves with the completely closing function.

Further, the accumulator 16 may be integrated with the outlet side of the heating side diffuser 15g of the heating side ejector 15. Alternatively, the cooling side gas-liquid separator 21 may be integrated with the outlet side of the cooling side diffuser 20g of the cooling side ejector 20.

In the above-mentioned embodiment, a component of the ejector, such as a body, is formed of metal by way of example. As long as the respective components can exhibit their own functions, materials for the components are not limited. That is, these components may be formed of resin.

Although in the above-mentioned embodiments, the electric compressor is employed as the compressor 11 by way of example, the type of the compressor is not limited thereto. For example, a fixed displacement compression mechanism or variable displacement compression mechanism may employ an engine driven compressor that is rotatably driven by an engine.

(4) The interior evaporator 23 of each of the refrigeration cycle devices 10 and 10a in the above-mentioned respective embodiments may have on its refrigerant outlet side, an evaporation pressure adjustment valve for setting a refrigerant pressure of the interior evaporator 23 to a predetermined value or more.

Specifically, this kind of evaporation pressure adjustment valve includes a valve body for adjusting the opening degree of the refrigerant passage formed therein, and an elastic member for applying a load to the valve body so as to urge the valve body to close the refrigerant passage. Further, the adjustment valve can employ a valve body or the like having a structure for increasing the valve opening, together with an increase in a difference in pressure that is obtained by subtracting an outside air pressure applied to the elastic member from the inlet side refrigerant pressure of the refrigerant passage.

(5) In the dehumidification-air heating mode of the above-mentioned embodiments, the valve opening degree of the first flow rate adjustment valve 14a is adjusted to thereby change a ratio between the flow rate of the refrigerant flowing from the first three-way joint 13a into the heating side nozzle portion 15a, and the flow rate of the refrigerant flowing from the first three-way joint 13a into the cooling side nozzle portion 20a. In this way, the refrigerant evaporation pressure in the interior evaporator 23 is adjusted. However, the adjustment of the refrigerant evaporation pressure of the interior evaporator 23 is not limited thereto.

For example, the valve opening degree of the fourth flow rate adjustment valve 14d disposed on the upstream side of the cooling side nozzle portion 20a may be adjusted to change the flow rate ratio, thereby adjusting the refrigerant evaporation pressure of the interior evaporator 23. The valve opening degrees of both the first and fourth flow rate adjustment valves 14a and 14d may be adjusted to change the flow rate ratio, thereby adjusting the refrigerant evaporation pressure of the interior evaporator 23.

(6) During the high heating-capacity operation in the air heating mode in the above-mentioned embodiments, the valve opening degree of the first flow rate adjustment valve 14a is adjusted based on the refrigerant discharge capacity of the compressor 11 by way of example. However, the adjustment of the valve opening degree of the first flow rate adjustment valve 14a is not limited thereto. For example, a dryness sensor is provided for detecting the dryness of the refrigerant on the outlet side of the interior condenser 12. The valve opening degree of the first flow rate adjustment valve 14a may be adjusted such that a detected value from the dryness sensor is not less than 0.5 nor more than 0.8.

(7) Although in the above-mentioned fourth to seventh embodiments, the fifth opening/closing valve 18e is opened, a part of the refrigerant drawn from the heating side refrigerant suction port 15d of the heating side ejector 15 is drawn from the suction port 41a of the compressor 41 by way of example. Alternatively, the fifth opening/closing valve 18e may be formed of the flow rate adjustment valve that is the same as the first flow rate adjustment valve 14a or the like. The valve opening degree of the flow rate adjustment valve may be adjusted to thereby adjust the flow rate of the refrigerant drawn from the suction port 41a of the compressor 41, controlling the pressure increasing amount in the heating side ejector 15.

(8) In the above-mentioned third and seventh embodiments, the auxiliary heating bypass passage 24 and the fourth opening/closing valve 18d are added to the structure of each of the refrigeration cycle devices 10 and 10a of the first and fourth embodiments, thereby enabling the operation in a strong air heating mode. On the other hand, for example, the same structure as described above may be added to the refrigeration cycle devices 10 and 10a of the second, fifth, and sixth embodiments, thereby performing an operation in the strong air heating mode.

(9) In the above-mentioned respective embodiments, an air conditioning control program is executed to switch among respective operating modes by way of example. However, the switching among the respective operation modes is not limited thereto. Specifically, an operation-mode setting switch is provided on the operation panel to set each operation mode. According to an operation signal from the operation-mode setting switch, switching may be performed among the air cooling mode, the weak dehumidification-air heating mode, the dehumidification-air heating mode, and the air heating mode.

(10) The examples disclosed in the above respective embodiments may be appropriately combined within the feasible range. Specifically, the heating side ejector 15 described in each of the second, sixth, and seventh embodiments may be applied to the refrigeration cycle devices 10 and 10a described in the respective third to fifth embodiments.

The refrigerant passage of the heating side nozzle portion 15a of the heating side ejector 15 described in the sixth and seventh embodiments may be provided with the straight portion 15i which is the same as that in the second embodiment. The needle valve 15m and the stepping motor 15n as a driving portion, which are described in the seventh embodiment may be applied to the heating side ejector 15 described in the first or second embodiment.

(11) In the above seventh and ninth embodiments, the variable nozzle portion is used as the heating side nozzle portion 15a of the heating side ejector 15 by way of example. Alternatively, a valve body may be one serving as a valve body with a conical shape that extends from the refrigerant passage formed in the heating side nozzle portion 15a toward the inside of the heating side diffuser 15g. The refrigerant passage area of the heating side diffuser 15g may be changed together with the throat portion (portion with the minimum passage area) of the heating side nozzle portion 15a. It is obviously that the variable nozzle portion may be employed as the cooling side nozzle portion 20a of the cooling side ejector 20.

(12) Although in the above-mentioned embodiments, R134a or R1234yf can be employed as the refrigerant by way of example, the refrigerant is not limited thereto. For example, the refrigerants, such as R600a, R410A, R404A, R32, R1234yfxf, or R407C can be used. Alternatively, a mixed refrigerant including a mixture of a plurality of refrigerants among these refrigerants may be employed.

Now, the details of the studies performed by the inventors of the present application to make the present application will be described.

The inventors of the present application have studied about the improvement of the heating capacity $Qc$ of air (fluid to be heat-exchanged) in the interior condenser (heating heat exchanger) so as to achieve the appropriate air heating of the space to be air-conditioned by sufficiently heating the air even at the low outside air temperature or the like.

Specifically, in the cycle structure that is designed to dissipate heat absorbed by the refrigerant from the outside air at the exterior heat exchanger, into the fluid to be heat-exchanged in the heating heat exchanger, the heating capacity $Qc$ of the fluid to be heat-exchanged in the heating heat exchanger is defined by the following formula F1, like the air heating mode in the related art.

$$Qc = \Delta i cond \times Gr \quad (F1)$$

where the term $\Delta i cond$ is an enthalpy difference determined by subtracting an enthalpy of the refrigerant on the outlet side of the heating heat exchanger from an enthalpy of the refrigerant on the inlet side thereof, and $Gr$ is a flow rate of the refrigerant flowing into the heating heat exchanger.

Figure 27:
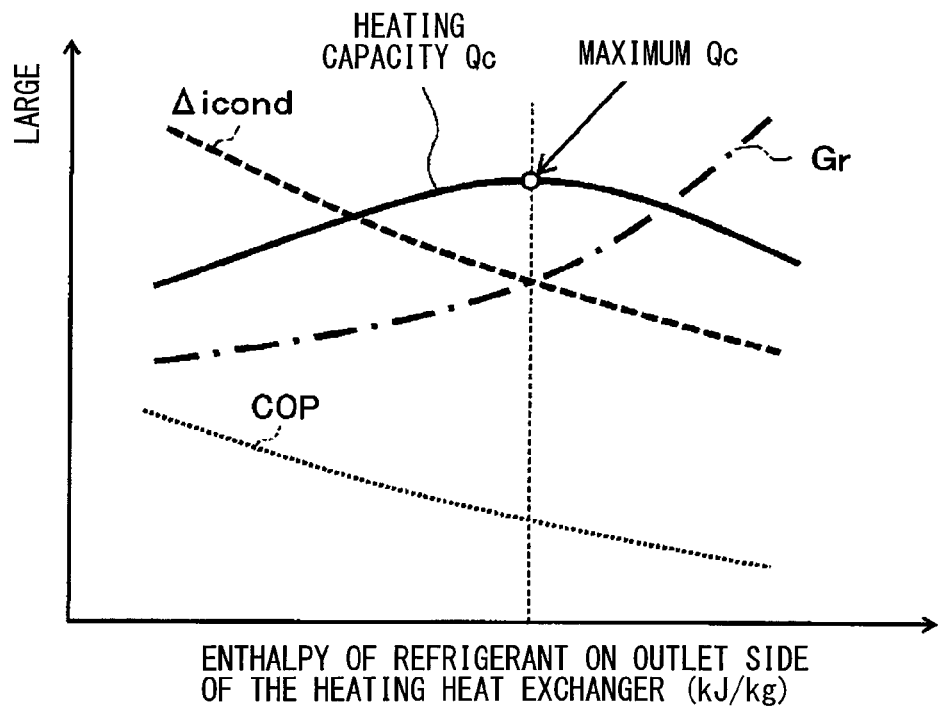
FIG. 27 is a graph showing a change in heating capacity Qc with respect to a change in enthalpy of the refrigerant on the outlet side of an interior condenser.

As indicated by thick dashed lines of FIG. 27, the enthalpy difference $\Delta i cond$ of the above-mentioned formula F1 can be increased by decreasing the enthalpy of the refrigerant on the outlet side of the heating heat exchanger. Further, in the general ejector refrigeration cycle, when the enthalpy of the refrigerant on the outlet side of the heating heat exchanger is decreased, the dryness $x$ of the refrigerant flowing into the nozzle portion of the ejector is reduced.

This kind of ejector draws the fluid from a fluid suction port by the suction effect of the injection refrigerant injected from the nozzle portion, thereby recovering the loss of the kinetic energy when the fluid is decompressed by the nozzle portion. Thus, the dryness $x$ of the refrigerant flowing into the nozzle portion is enhanced to thereby increase the compression of the fluid (refrigerant), which can increase the amount of recovered energy.

Conversely, when the dryness $x$ of the refrigerant flowing into the nozzle portion is reduced in order to increase the enthalpy difference $\Delta i cond$, the amount of recovered energy might be reduced to decrease the pressure increasing amount in the pressure-increasing portion. When the density of the refrigerant drawn into the compressor is reduced together with the decreasing the pressure increasing amount, the flow rate $Gr$ of the refrigerant discharged from the compressor and flowing into the heating heat exchanger might be reduced.

That is, as indicated by a thick dotted line of FIG. 27, the flow rate $Gr$ of the refrigerant flowing into the heating heat exchanger is reduced with decreasing enthalpy of the refrigerant on the outlet side of the heating heat exchanger. This means that as indicated by thick solid lines of FIG. 27, the heating capacity $Qc$ has the maximum value (peak value) with a change in enthalpy of the refrigerant on the outlet side of the heating heat exchanger (that is, a change in dryness $x$ of the refrigerant flowing into the nozzle portion of the ejector).

For this reason, the inventors of the present application have studied that the fluid to be heat-exchanged is sufficiently heated even at the low outside air temperature or the like by bringing the heating capacity Qc to the maximum value.

As a result, it has shown that the ejector refrigeration cycle is operated such that the dryness x of the refrigerant flowing into the nozzle portion of the ejector satisfies the following formula F2, which can easily bring the heating capacity Qc to the maximum value, thereby sufficiently heating the fluid to be heat-exchanged even at a low outside air temperature.

$$0.5 \leq x \leq 0.8 \tag{F2}$$

However, when the ejector refrigeration cycle is operated such that the dryness x of the refrigerant flowing into the nozzle portion of the ejector satisfies the above formula F2, the fluid to be heat-exchanged can be sufficiently heated, while the pressure increasing performance in the pressure-increasing portion of the ejector might be made unstable, thus reducing the pressure increasing performance in the pressure-increasing portion in some cases.

Then, the inventors of the present application have examined the reason for this. The reason is that the shock wave is caused within the pressure-increasing portion when the dryness x of the refrigerant flowing into the nozzle portion of the ejector is set to a relatively high value so as to satisfy the above formula F2. The shock wave occurs when the flow velocity of the two-phase fluid in the gas-liquid two-phase state is transferred from a value more than the two phase sound velocity αh (ultrasonic velocity state) to another value lower than the two phase sound velocity αh (subsonic velocity state).

The two phase sound velocity αh is a sound velocity of the fluid in the gas-liquid mixed state of a gas-phase fluid and a liquid-phase fluid, and defined by the following formula F3:

$$\alpha h = [P/\{\alpha \times (1-\alpha) \times \rho l\}]^{0.5} \tag{F3}$$

where α in the formula F3 is a void fraction, which indicates a fraction of the volume of voids (air bubble) per unit volume.

In more detail, the void fraction α is defined by the following formula F4.

$$\alpha = x/\{x + (\rho g/\rho l) \times (1-x)\} \tag{F4}$$

where ρg in the formulas 3 and 4 is the density of the gas-phase fluid, ρl is the density of the liquid-phase fluid, and P is the pressure of the two-phase fluid.

Figure 28:
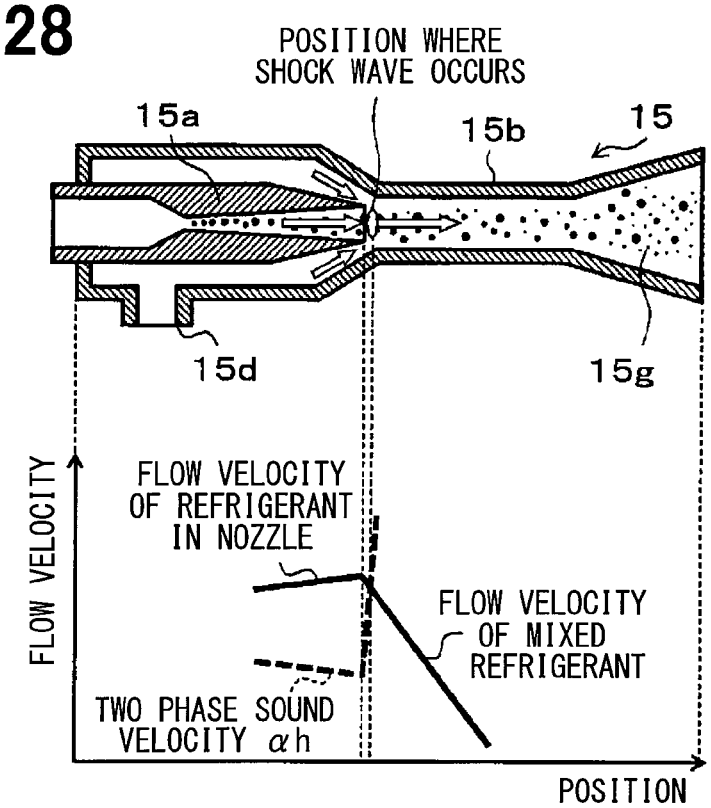
FIG. 28 is an explanatory diagram for explaining a position where a shock wave occurs within the ejector when a general ejector refrigeration cycle operates.

Subsequently, the cause for making the pressure increasing performance of the pressure-increasing portion in the ejector unstable due to the occurrence of the above-mentioned shock wave will be described in more detail using FIGS. 28 and 29. The upper part of each of FIGS. 28 and 29 exemplarily shows the structure of the general ejector. For clarifying the figures, the parts having the same or equivalent functions as those of the components of the heating side ejector 15 in the embodiments to be described later are designated by the same reference numerals as those in the heating side ejector 15.

In order to improve the COP, in many cases, the general ejector refrigeration cycle is operated in such a manner that the enthalpy of the refrigerant on the outlet side of the heating heat exchanger is reduce so as to enlarge the enthalpy difference Δicond, and that the refrigerant flowing into the nozzle portion becomes a liquid-phase refrigerant with a supercool degree, or a gas-liquid two-phase refrigerant with an excessively small dryness x.

Thus, the dryness x of the refrigerant is smaller than 0.5 immediately before being injected from the refrigerant injection port 15c of the nozzle portion 15a in the ejector 15. The injection refrigerant injected from the refrigerant injection port 15c of the nozzle portion 15a is mixed with the suction refrigerant in a gas-phase state, thereby drastically increasing its dryness x, while reducing its flow velocity. Thus, as indicated by a thick dashed line in FIG. 28, the two phase sound velocity αh of the mixture of the injection refrigerant and the suction refrigerant is also drastically increased.

As a result, while the general ejector refrigeration cycle is operating, the flow velocity of the refrigerant directly after being injected from the nozzle portion 15a is equal to or less than the two phase sound velocity αh. The shock wave occurs in the extreme vicinity of the refrigerant injection port 15c of the nozzle portion 15a when the flow velocity of the two-phase refrigerant changes from the ultrasonic velocity state to the subsonic velocity state. Thus, the shock wave has a little influence on the pressure increasing performance of the pressure-increasing portion 15g.

Next, when the ejector refrigeration cycle is operated to satisfy the above-mentioned formula F2, the dryness x of the refrigerant is 0.5 or more directly before being injected from the nozzle portion. At this time, the degree of increase in dryness x of the injection refrigerant becomes small as compared to when the general ejector refrigeration cycle is operated. Thus, as shown in FIG. 29, the degree of increase in two phase sound velocity αh of the mixture of the injection refrigerant and the suction refrigerant is also decreased.

As a result, a position (a position where the shock wave occurs) where the flow velocity of the mixed refrigerant is lower than the two phase sound velocity αh tends to depart from the refrigerant injection port 15c as compared to when the general ejector refrigeration cycle is operated.

When the position where the shock wave occurs departs from the refrigerant injection port 15c to move to the vicinity of the inlet of the pressure-increasing portion 15g, or into the pressure-increasing portion 15g, the flow velocity of the refrigerant circulating through the pressure-increasing portion 15g becomes unstable due to the action of the shock wave, which destabilizes the pressure increasing performance of the pressure-increasing portion 15g, thereby reducing the pressure increasing performance.

When the dryness x of the refrigerant flowing into the nozzle portion of the ejector is set to the relatively high value to satisfy the above formula F2, the amount of energy recovered at the nozzle portion can be increased. The recovered energy amount corresponds to an enthalpy difference Δiej between the enthalpy of the refrigerant on the inlet side of the nozzle portion and the enthalpy of the refrigerant on the outlet side of the nozzle portion when the refrigerant is isentropically decompressed by the nozzle portion.

Thus, the maximum value of the flow velocity V of the injection refrigerant directly after the refrigerant is injected from the refrigerant injection port of the nozzle portion can be represented by the following formula F5:

$$V = V0 + (2 \times \Delta iej)^{0.5} \tag{F5}$$

where V0 is an initial velocity of the refrigerant flowing into the nozzle portion.

That is, in the general ejector, as the dryness x of the refrigerant flowing into the nozzle portion becomes higher, the flow velocity V of the injection refrigerant tends to be higher, and the wall-surface friction between the refrigerant and the refrigerant passage formed in the nozzle portion also tends to be increased.

When the gas-liquid two-phase refrigerant with a high gas-liquid density ratio (for example, the gas-liquid two-phase refrigerant with a gas-liquid density ratio of 200 or more) flows at high velocity through the refrigerant passage formed in the nozzle portion, the wall-surface friction between the refrigerant and the refrigerant passage is significantly increased, which might lead to a loss of the kinetic energy included in the refrigerant. Such a loss of the kinetic energy leads to reduction in flow velocity of the injection refrigerant, thereby reducing the pressure increasing performance of the pressure-increasing portion.

The phrase "a spreading angle ($\theta n$) on a section of an injection portion (15q) in an axial direction is equal to or more than 0°" as used in the accompanying claims means that when a spreading angle ($\theta n$) is more than 0°, the injection portion (15q) has a shape that gradually enlarges its refrigerant passage sectional area toward the refrigerant flow direction (for example, a truncated conical shape), and that when a spreading angle ($\theta n$) is 0°, the injection portion (15q) has a shape with a certain refrigerant passage sectional area (for example, a cylindrical shape)

What is claimed is:

1. An ejector to be used for a vapor compression refrigeration cycle device, the ejector comprising:
    a nozzle portion that decompresses a refrigerant and injects the refrigerant from a refrigerant injection port; and
    a body portion including a refrigerant suction port drawing a refrigerant by a suction effect of the injection refrigerant injected from the nozzle portion at high velocity, and a pressure-increasing portion pressurizing a mixed refrigerant including the injection refrigerant and the suction refrigerant drawn from the refrigerant suction port, wherein
    a dryness of the refrigerant flowing into the nozzle portion is adjusted in the refrigeration cycle device,
    the body portion is provided with a mixing portion that mixes the injection refrigerant and the suction refrigerant, in a range of an internal space of the body portion from the refrigerant injection port of the nozzle portion to an inlet of the pressure-increasing portion,
    the mixing portion has a truncated cone part of which a refrigerant passage area decreases toward a downstream side in a refrigerant flow direction and a cylindrical part having a fixed diameter,
    the cylindrical part has a length in an axial direction, the diameter and the length of the cylindrical part being set to satisfy a formula given by:

$$Lb/\phi Db \leq 1$$

Lb represents the length of the cylindrical part in the axial direction and $\phi Db$ represents the diameter of the cylindrical part, and
    a refrigerant passage area of the inlet of the pressure-increasing portion is set smaller than that of the refrigerant injection port of the nozzle portion, without utilizing a needle valve.

2. The ejector according to claim 1, wherein a straight portion with a certain refrigerant passage area is provided on a most downstream side area of a refrigerant passage provided in the nozzle portion.

3. The ejector according to claim 2, wherein a length of the straight portion in the refrigerant flow direction is substantially equal to an equivalent diameter of the refrigerant injection port.

4. The ejector according to claim 1, further comprising: a swirling space formation member that forms a swirling space for swirling the refrigerant flowing into the nozzle portion about an axis of the nozzle portion.

5. The ejector according to claim 1, further comprising a valve body that changes a refrigerant passage area of the nozzle portion.

6. The ejector according to claim 1, wherein a flow velocity of the refrigerant flowing into the inlet of the pressure-increasing portion is lower than a two phase sound velocity.

7. The ejector according to claim 1, wherein a refrigerant inlet port of the nozzle portion is located outside the body portion.

8. The ejector according to claim 1, wherein the refrigerant flows into the ejector in a direction parallel to a direction from which the refrigerant is injected from the refrigerant injection port.

9. An ejector to be used for a refrigeration cycle device, the refrigeration cycle device including a compressor that compresses and discharges a refrigerant, and a heating heat exchanger that heats a fluid to be heat-exchanged using a high-pressure refrigerant discharged from the compressor as a heat source, the ejector comprising:
    a nozzle portion that decompresses a refrigerant and injects the refrigerant from a refrigerant injection port; and
    a body portion including a refrigerant suction port drawing a refrigerant by a suction effect of the injection refrigerant injected from the nozzle portion at high velocity, and a pressure-increasing portion pressurizing a mixed refrigerant including the injection refrigerant and the suction refrigerant drawn from the refrigerant suction port, wherein
    the refrigeration cycle device is adapted to adjust a dryness of the refrigerant flowing into the nozzle portion in such a manner that a heating capacity of the fluid approaches a maximum value,
    the heating capacity is calculated by a formula given by:

$$Qc = \Delta icond \times Gr$$

$\Delta icond$ represents an enthalpy difference obtained by subtracting an enthalpy of the refrigerant on an outlet side of the heating heat exchanger from an enthalpy of the refrigerant on an inlet side of the heating heat exchanger, Gr represents a flow rate of the refrigerant flowing into the heating heat exchanger, and Qc represents the heating capacity,
    the body portion is provided with a mixing portion that mixes the injection refrigerant and the suction refrigerant, in a range of an internal space of the body portion from the refrigerant injection port of the nozzle portion to an inlet of the pressure-increasing portion,
    the mixing portion has a truncated cone part of which a refrigerant passage area decreases toward a downstream side in a refrigerant flow direction and a cylindrical part having a fixed diameter,
    the cylindrical part has a length in an axial direction, the diameter and the length of the cylindrical part being set to satisfy a formula given by:

$$Lb/\phi Db \leq 1$$

Lb represents the length of the cylindrical part in the axial direction and $\phi Db$ represents the diameter of the cylindrical part, and a refrigerant passage area of the inlet of the pressure-increasing portion is set smaller than that of the refrigerant injection port of the nozzle portion, without utilizing a needle valve.

10. The ejector according to claim 9, further comprising:
a swirling space formation member that forms a swirling space for swirling the refrigerant flowing into the nozzle portion about an axis of the nozzle portion.

11. The ejector according to claim 9, wherein
a flow velocity of the refrigerant flowing into the inlet of the pressure-increasing portion is lower than a two phase sound velocity.

12. A refrigerant cycle device having the ejector of claim 9, the refrigerant cycle device comprising:
a dryness adjustment portion that adjusts the heating capacity to approach the maximum value; and
a joint in which a flow of the refrigerant flowing out of the heating heat exchanger is branched into a flow of refrigerant flowing to an exterior heat exchanger and a flow of refrigerant flowing to the ejector, wherein
the dryness adjustment portion is located downstream of the joint and directly connected to the nozzle portion.

13. An ejector to be used for a vapor compression refrigeration cycle device, the ejector comprising:
a nozzle portion that decompresses a refrigerant and injects the refrigerant from a refrigerant injection port; and
a body portion including a refrigerant suction port drawing a refrigerant by a suction effect of the injection refrigerant injected from the nozzle portion at high velocity, and a pressure-increasing portion pressurizing a mixed refrigerant including the injection refrigerant and the suction refrigerant drawn from the refrigerant suction port, wherein
a dryness of the refrigerant flowing into the nozzle portion is adjusted in the refrigeration cycle device,
a mixing portion that mixes the injection refrigerant and the suction refrigerant is provided in a range of an internal space of the body portion from the refrigerant injection port to an inlet of the pressure-increasing portion,
a refrigerant passage formed in the nozzle portion includes a tapered portion in which a refrigerant passage area gradually decreases toward a refrigerant downstream side, and an injection portion that guides the refrigerant from the tapered portion to the refrigerant injection port,
the nozzle portion is provided to flexibly expand the injection refrigerant to be injected into the mixing portion by setting a spreading angle on a section of the injection portion in an axial direction to 0° or more,
a refrigerant passage area of the inlet of the pressure-increasing portion is set smaller than that of the refrigerant injection port of the nozzle portion, without utilizing a needle valve,
the mixing portion has a truncated cone part of which a refrigerant passage area decreases toward a downstream side in a refrigerant flow direction and a cylindrical part having a fixed diameter, and
the cylindrical part has a length in an axial direction, the diameter and the length of the cylindrical part being set to satisfy a formula given by:

$$Lb/\phi Db \leq 1$$

Lb represents the length of the cylindrical part in the axial direction and φDb represents the diameter of the cylindrical part.

14. The ejector according to claim 13, further comprising:
a swirling space formation member that forms a swirling space for swirling the refrigerant flowing into the nozzle portion about an axis of the nozzle portion.

15. The ejector according to claim 13, wherein
a flow velocity of the refrigerant flowing into the inlet of the pressure-increasing portion is lower than a two phase sound velocity.

16. An ejector to be used for a refrigeration cycle device, the refrigeration cycle device including a compressor that compresses and discharges a refrigerant, and a heating heat exchanger that heats a fluid to be heat-exchanged using a high-pressure refrigerant discharged from the compressor as a heat source, the ejector comprising:
a nozzle portion that decompresses a refrigerant and injects the refrigerant from a refrigerant injection port; and
a body portion including a refrigerant suction port drawing a refrigerant by a suction effect of the injection refrigerant injected from the nozzle portion at high velocity, and a pressure-increasing portion pressurizing a mixed refrigerant including the injection refrigerant and the suction refrigerant drawn from the refrigerant suction port, wherein
the refrigeration cycle device is adapted to adjust a dryness of the refrigerant flowing into the nozzle portion in such a manner that a heating capacity of the fluid approaches a maximum value,
the heating capacity is calculated by a formula given by:

$$Qc = \Delta icond \times Gr$$

Δicond represents an enthalpy difference obtained by subtracting an enthalpy of the refrigerant on an outlet side of the heating heat exchanger from an enthalpy of the refrigerant on an inlet side of the heating heat exchanger, Gr represents a flow rate of the refrigerant flowing into the heating heat exchanger, and Qc represents the heating capacity,
a mixing portion that mixes the injection refrigerant and the suction refrigerant is provided in a range of an internal space of the body portion from the refrigerant injection port to an inlet of the pressure-increasing portion,
a refrigerant passage formed in the nozzle portion includes a tapered portion in which a refrigerant passage area gradually decreases, and an injection portion that guides the refrigerant from the tapered portion to the refrigerant injection port,
the nozzle portion is provided to flexibly expand the injection refrigerant to be injected into the mixing portion by setting a spreading angle on a section of the injection portion in an axial direction to 0° or more,
a refrigerant passage area of the inlet of the pressure-increasing portion is set smaller than that of the refrigerant injection port of the nozzle portion, without utilizing a needle valve,
the mixing portion has a truncated cone part of which a refrigerant passage area decreases toward a downstream side in a refrigerant flow direction and a cylindrical part having a fixed diameter, and
the cylindrical part has a length in an axial direction, the diameter and the length of the cylindrical part being set to satisfy a formula given by:

$$Lb/\phi Db \leq 1$$

Lb represents the length of the cylindrical part in the axial direction and ϕDb represents the diameter of the cylindrical part.

17. The ejector according to claim 16, further comprising:
a swirling space formation member that forms a swirling space for swirling the refrigerant flowing into the nozzle portion about an axis of the nozzle portion.

18. The ejector according to claim 16, wherein
a flow velocity of the refrigerant flowing into the inlet of the pressure-increasing portion is lower than a two phase sound velocity.

19. A refrigerant cycle device having the ejector of claim 16, the refrigerant cycle device comprising:
a dryness adjustment portion that adjusts the heating capacity to approach the maximum value; and
a joint in which a flow of the refrigerant flowing out of the heating heat exchanger is branched into a flow of refrigerant flowing to an exterior heat exchanger and a flow of refrigerant flowing to the ejector, wherein
the dryness adjustment portion is located downstream of the joint and directly connected to the nozzle portion.

* * * * *